(12) United States Patent
Kondo et al.

(10) Patent No.: US 7,760,156 B2
(45) Date of Patent: Jul. 20, 2010

(54) TRANSMITTING APPARATUS, TRANSMITTING METHOD, RECEIVING APPARATUS, RECEIVING METHOD, TRANSMITTING AND RECEIVING APPARATUS, TRANSMITTING AND RECEIVING METHOD, RECORD MEDIUM, AND SIGNAL

(75) Inventors: Tetsujiro Kondo, Tokyo (JP); Naoki Kobayashi, Kanagawa (JP); Masanori Kanemaru, Kanagawa (JP)

(73) Assignee: Sony Corporation, Tokyo (JP)

( * ) Notice: Subject to any disclaimer, the term of this patent is extended or adjusted under 35 U.S.C. 154(b) by 883 days.

(21) Appl. No.: 11/590,554

(22) Filed: Oct. 30, 2006

(65) Prior Publication Data

US 2007/0103387 A1 May 10, 2007

Related U.S. Application Data

(60) Division of application No. 11/125,781, filed on May 10, 2005, now Pat. No. 7,486,253, which is a continuation of application No. 09/807,114, filed as application No. PCT/JP00/05319 on Aug. 9, 2000, now Pat. No. 7,009,579.

(30) Foreign Application Priority Data

| Aug. 9, 1999 | (JP) | ................................. 11-225020 |
| Apr. 24, 2000 | (JP) | ............................. 2000-127657 |
| Jul. 14, 2000 | (JP) | ............................. 2000-214237 |

(51) Int. Cl.
    *G09G 5/00* (2006.01)
(52) U.S. Cl. ............................. 345/1.2; 345/2.3; 455/73
(58) Field of Classification Search .................. 345/1.2, 345/2.1–2.3; 455/426.1, 426.2, 561, 562.1, 455/73, 82, 83, 88, 546.6
See application file for complete search history.

(56) References Cited

U.S. PATENT DOCUMENTS

| 4,347,618 A | 8/1982 | Kavouras et al. |
| 5,684,715 A | 11/1997 | Palmer |
| 5,831,666 A | 11/1998 | Palmer et al. |

(Continued)

FOREIGN PATENT DOCUMENTS

| JP | 62-108686 | 5/1987 |
| JP | 7 288806 | 10/1995 |
| JP | 9-18852 | 1/1997 |

(Continued)

OTHER PUBLICATIONS

Bocheck P; Cambell A T; Shih-Fu Chang; Liao R R -F; "Utility-based network adaptation for MPEG-4 systems" Proceedings of the 9$^{th}$ International Workshop on Network and Operating System Support for Digital Audio and Video, Jul. 23, 1999, pp. 279-288, XP002397210.

Hiroshi Inoue: "MPEG98/3839: IPMPS with back channels" ISO/IEC JTC1/SC29/WG11, Jul. 1998, XP002397211.

(Continued)

*Primary Examiner*—Kimnhung Nguyen
(74) *Attorney, Agent, or Firm*—Frommer Lawrence & Haug LLP; William S. Frommer; Thomas F. Presson

(57) ABSTRACT

On the transmission side, a background picture and objects #1 to #3 are transmitted at a transmission rate R/4 each. On the reception side, a picture composed of the objects #1 to #3 and the background picture is displayed with a particular spatial resolution and a particular temporal resolution. Thus, on the reception side, when the object #1 is dragged at particular time t1, on the transmission side, the transmission of the background picture and the objects #2 and #3 is stopped. Only the object #1 is transmitted at the transmission rate R of the transmission path. Therefore, a picture of which the spatial resolution of the object #1 dragged is improved is displayed at the sacrifice of the temporal resolution of the picture.

64 Claims, 55 Drawing Sheets

U.S. PATENT DOCUMENTS

| | | | |
|---|---|---|---|
| 5,913,170 A * | 6/1999 | Wortham | 455/457 |
| 6,313,864 B1 | 11/2001 | Tabata et al. | |
| 6,456,840 B1 | 9/2002 | Uda | |
| 6,476,821 B2 | 11/2002 | Sawada et al. | |
| 6,556,129 B1 | 4/2003 | Katada | |
| 6,567,985 B1 | 5/2003 | Ishii | |
| 6,694,136 B2 | 2/2004 | Uda | |
| 6,700,587 B1 | 3/2004 | Hasegawa et al. | |
| 2001/0046863 A1 | 11/2001 | Rinne et al. | |
| 2002/0000995 A1 | 1/2002 | Sawada et al. | |
| 2002/0077115 A1 * | 6/2002 | Ruutu et al. | 455/456 |
| 2004/0224719 A1 | 11/2004 | Nounin et al. | |

FOREIGN PATENT DOCUMENTS

| | | |
|---|---|---|
| JP | 9-37259 | 2/1997 |
| JP | 9-37260 | 2/1997 |
| JP | 10-112856 | 4/1998 |
| JP | 11-187371 | 7/1999 |
| WO | WO 98 41021 | 9/1998 |

OTHER PUBLICATIONS

Doenges P K et al: "Audio/video and synthetic graphics/audio for mixed media" Signal Processing. Image Communication, Elsevier Science Publishers, Amsterdam, NL, vol. 9, No. 4, May 1997, pp. 433-463, XP004075338 ISSN: 0923-5965.

Correia P et al: "The Role of Analysis in Content-Based Video coding and Indexing—Image Communication" Signal Processing, Elsevier Science Publishers B.V. Amsterdam, NL, vol. 66, No. 2, Apr. 30, 1998, pp. 125-142, XP004129637 ISSN: 0165-1684.

R. Ohm: "Digitale Bildcodierung" 1995, Springer Verlag, Berlin, XP002386496.

"Multimedia Hypervideo Links for Full Motion Videos" IBM Technical Disclosure Bulletin, IBM Corp. New York, U.S., vol. 37, No. 4A, Apr. 1, 1994, p. 95.

Victoria Burrill et al. "Time-Varying Sensitive Regions in Dynamic Multimedia Objects: A Pragmatic Approach to Content Based Retrieval from Video", Information and Software Technology, Elsevier, Amsterdam, NL, vol. 36, No. 4, Jan. 4, 1994, pp. 213-223.

A. Eleftheriadis "MPEG-4 Systems: Archictecturing Object-Based Audio-Visual Content", IEEE Workshop on Multimedia Signal Processing. Proceedings of Signal Processing Society Workshop on Multimedia Signal Processing, Dec. 7, 1998, pp. 535-540.

Itaru Kaneko, "MPEG98/M3539: A Proposal on IPMP", ISO/IEC JTCl/SC29/WG11, Jul. 1998, pp. 1-16.

Jack Lacey et al, "MPEG-4 Intellectual Property Management & Protection: Overview & Applications", ISO/IEC JTC1/SC29/WG11, Dec. 1998, pp. 1-8.

Hiroshi Inoue, "MPEG98/3839 IPMPS with Back Channels", ISO/IEC JTC1/SC29/WG11, Jul. 1998, pp. 1-7.

Peter K. Doegnes, "Audio/Video and Synthetic Graphics/Audio for Mixed Media", Signal Processing. Image Communication, Elsevier Science Publishers, Amsterdam, NL, vol. 9, No. 4, May 1997, pp. 433-463.

Paul Bocheck et al., "Utility-Based Network Adaptation for MPEG-4 Systems", Proceedings of the $9^{th}$ International Workshop on Network and Operating System Support for Digital Audio and Video, Jul. 23, 1999, pp. 279-288.

* cited by examiner

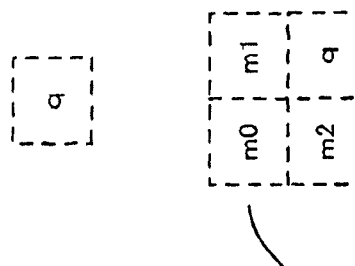
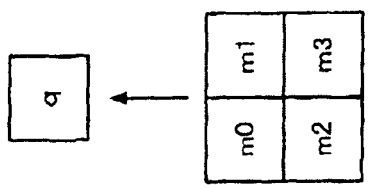
Fig. 9A  Fig. 9B  Fig. 9C
THIRD HIERARCHICAL LEVEL (HIGHEST HIERARCHICAL LEVEL)
SECOND HIERARCHICAL LEVEL
FIRST HIERARCHICAL LEVEL (LOWEST HIERARCHICAL LEVEL)
PIXEL

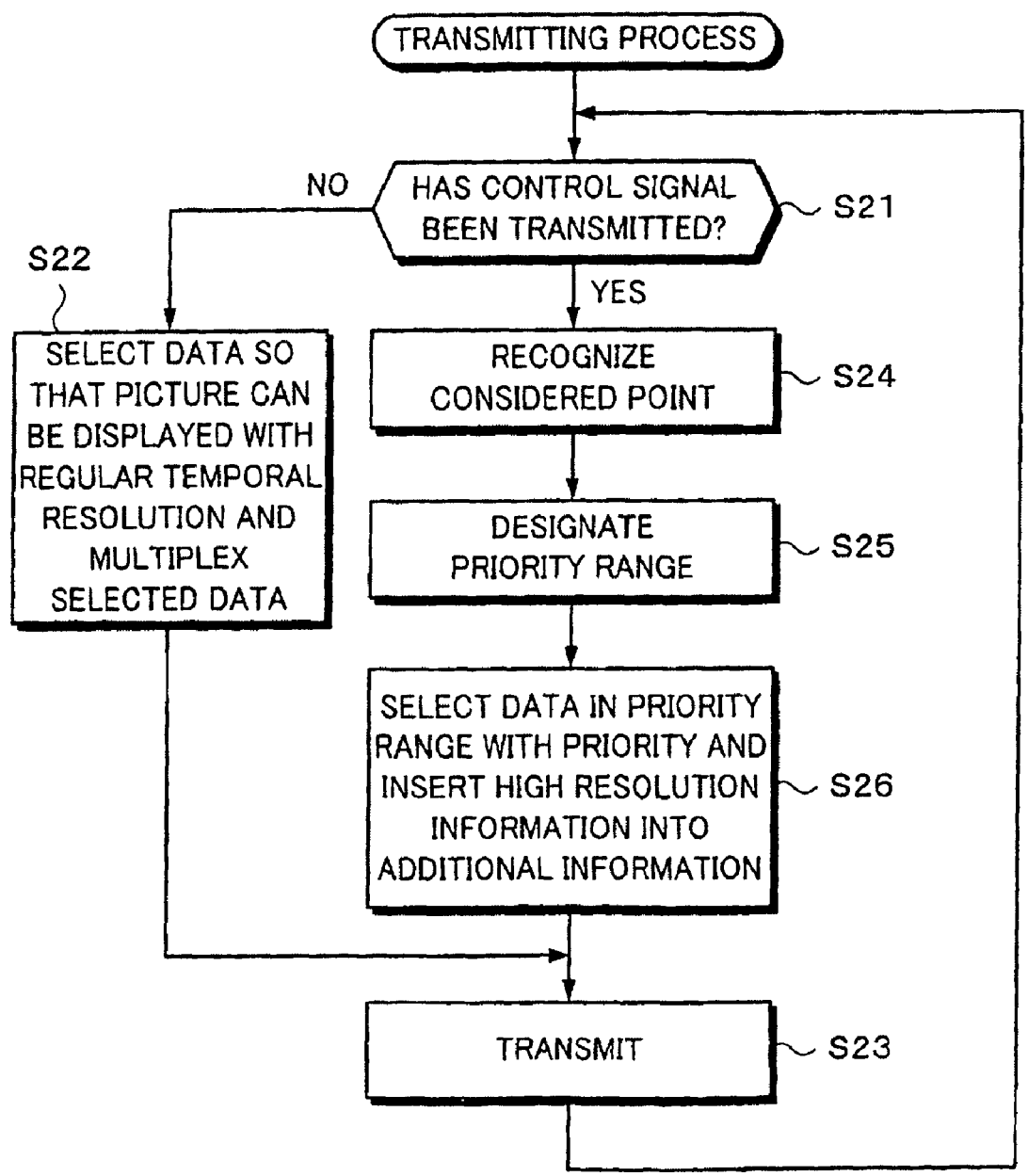

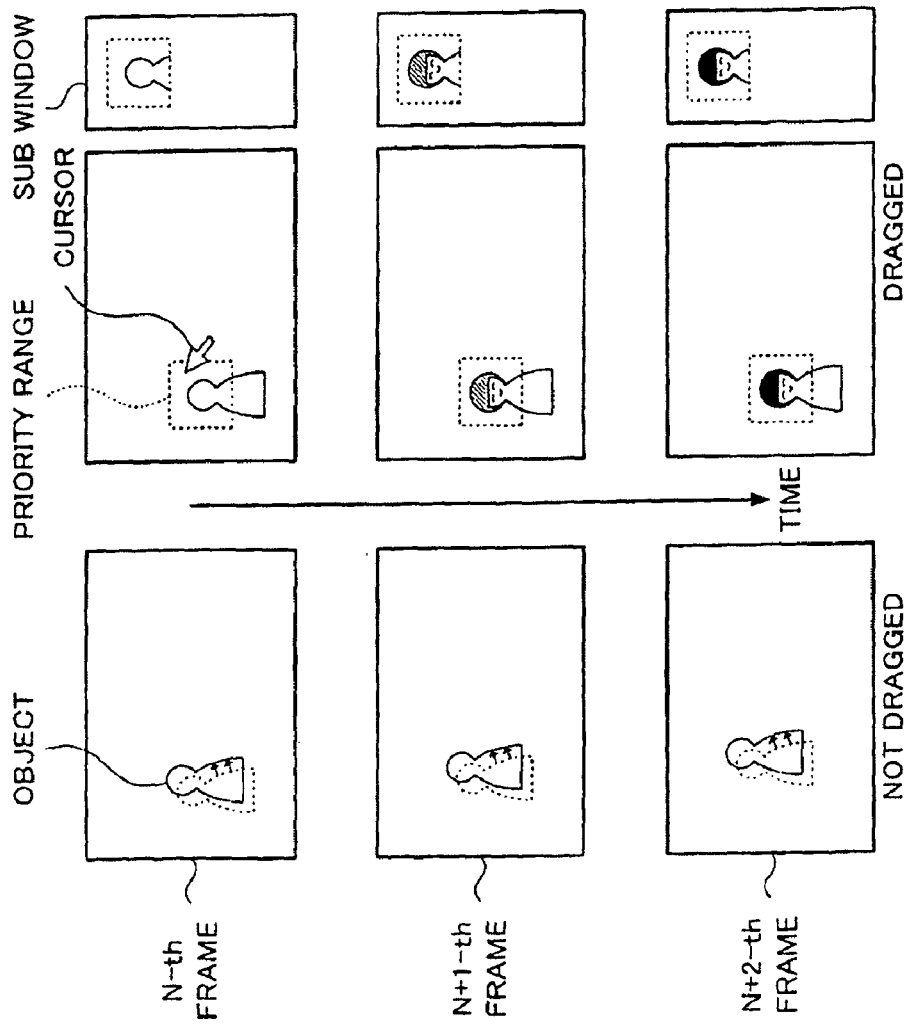

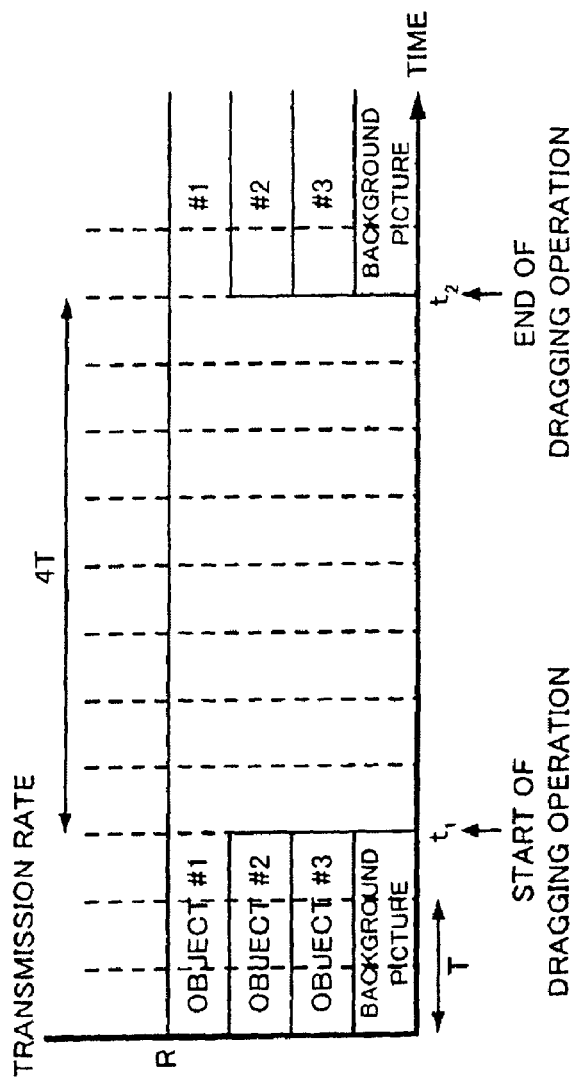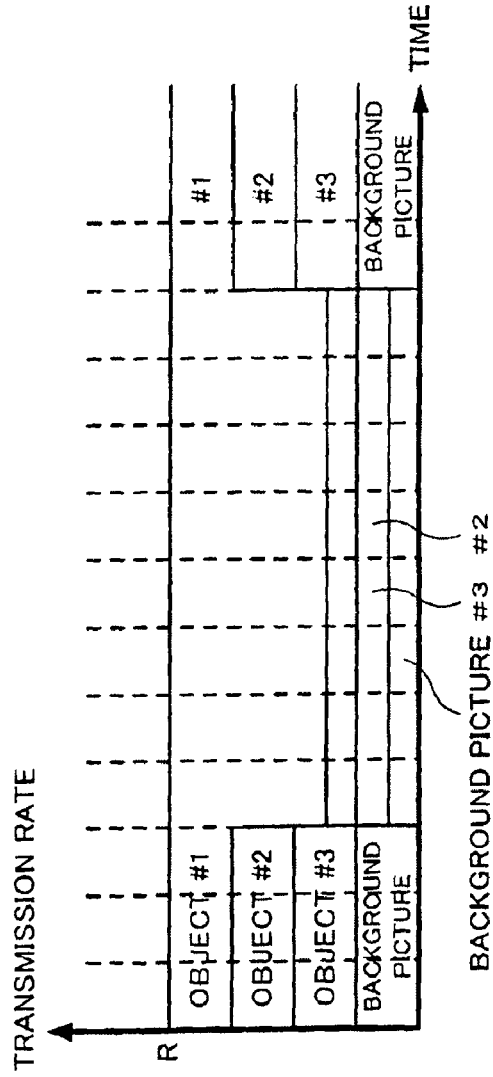

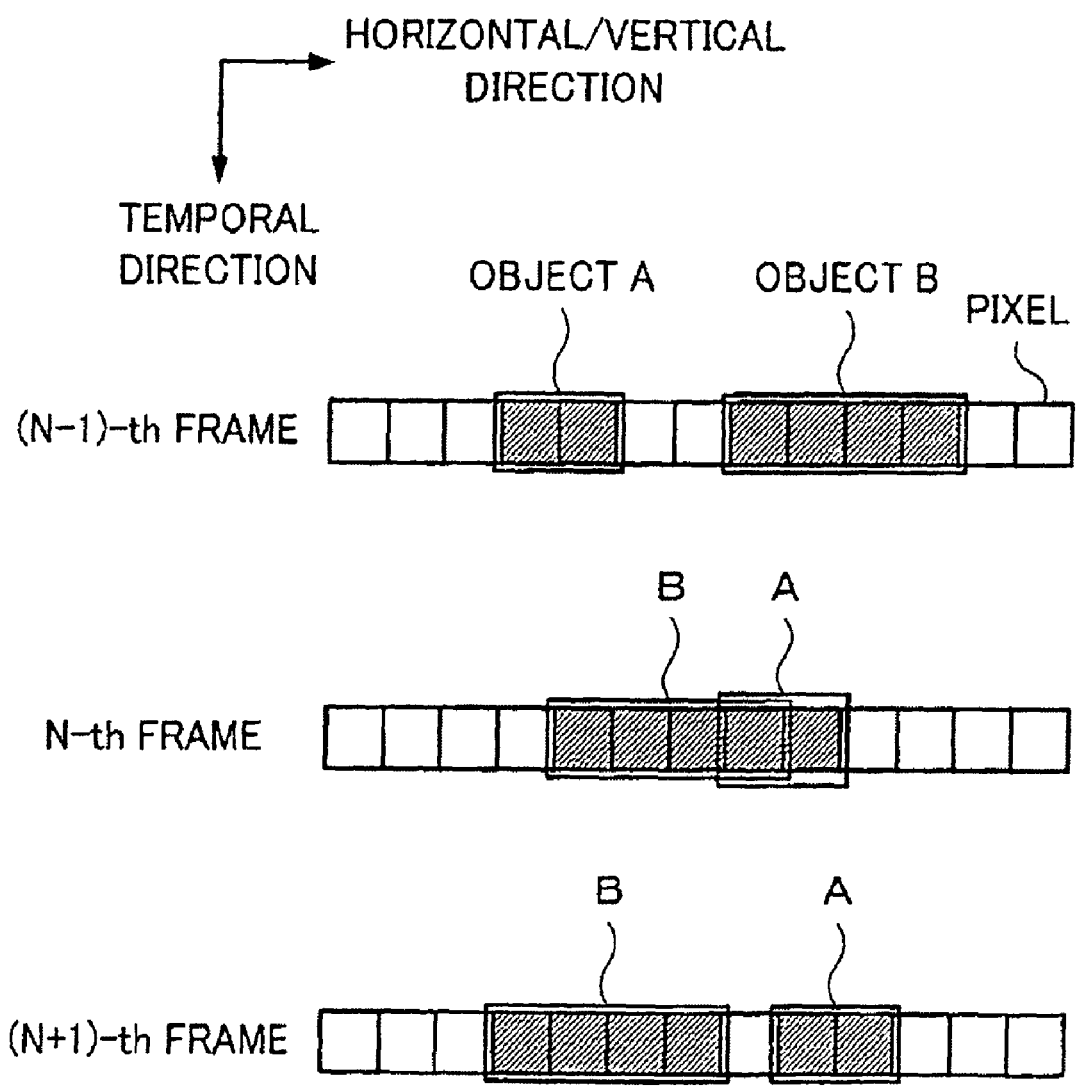

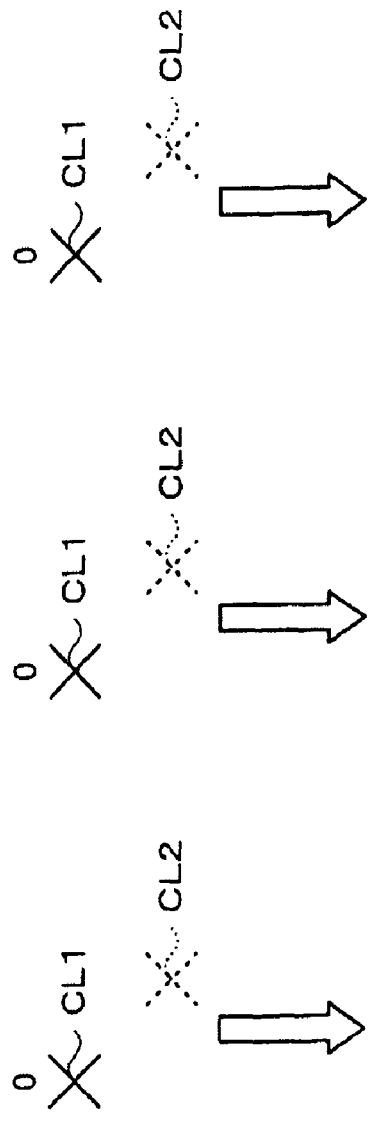
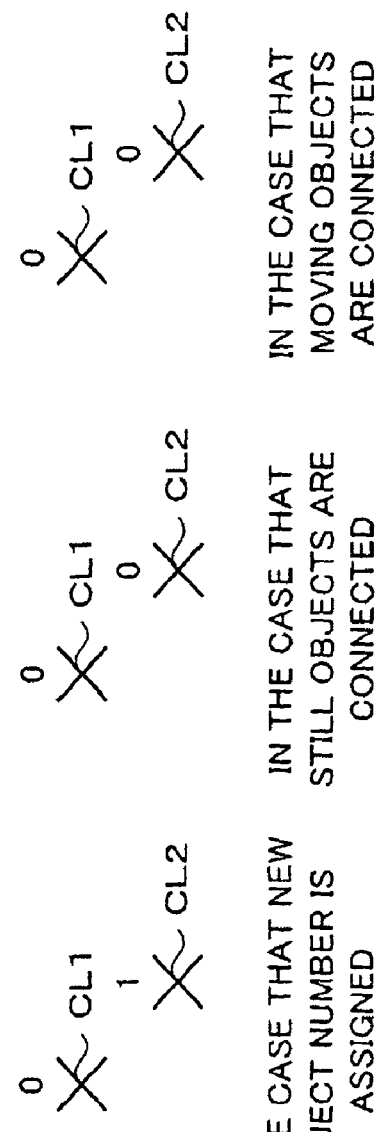

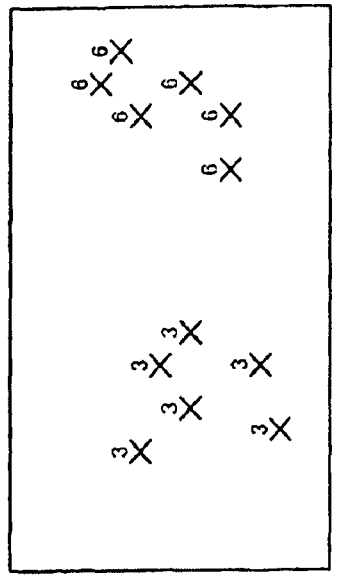
Fig. 46C
DISTRIBUTION OF MOVING CLICKS
(AFTER MOTION COMPENSATED)
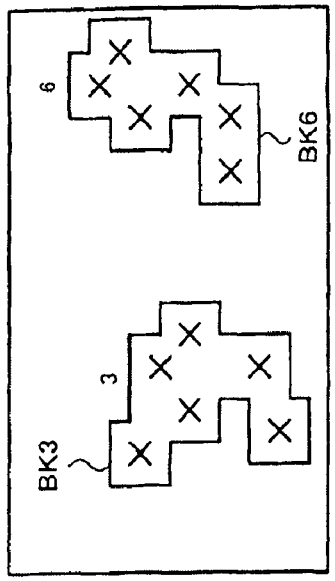
Fig. 46D
EXTRACTED RESULT (MOVING)
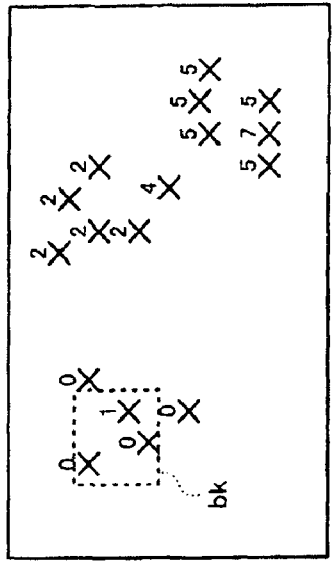
Fig. 46A
DISTRIBUTION OF STILL CLICKS
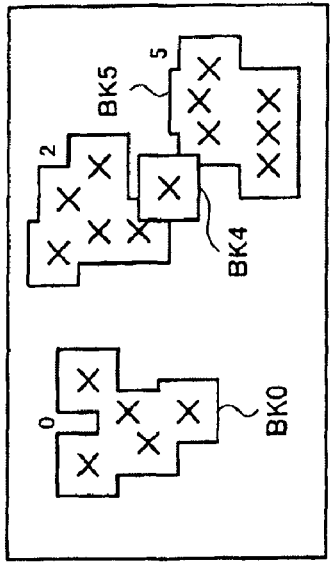
Fig. 46B
EXTRACTED RESULT (STILL)
Fig. 46E
OBJECT NUMBER WITH HIGHEST FREQUENCY IN BLOCK
CALCULATION FOR ALL PIXELS

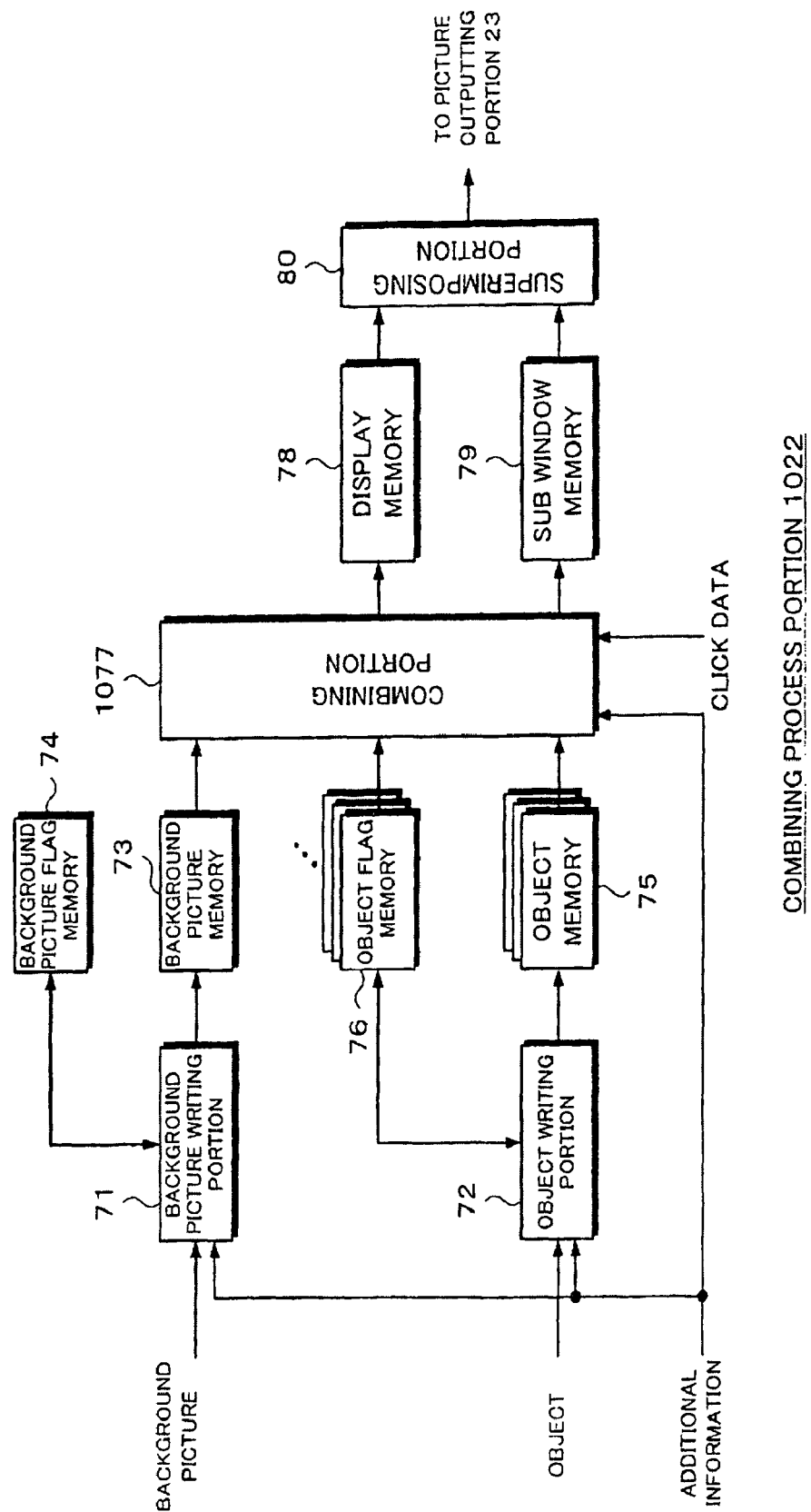

TRANSMITTING APPARATUS, TRANSMITTING METHOD, RECEIVING APPARATUS, RECEIVING METHOD, TRANSMITTING AND RECEIVING APPARATUS, TRANSMITTING AND RECEIVING METHOD, RECORD MEDIUM, AND SIGNAL

This is a division of application Ser. No. 11/125,781, filed May 10, 2005 now U.S. Pat. No. 7,486,253, which is a continuation of application Ser. No. 09/807,114, filed Jun. 15, 2001 pursuant to 35USC 371 as a National Phase Application of International Application PCT/JP00/05319, now U.S. Pat. No. 7,009,579, which is entitled to the priority filing date of Japanese Applications 11-225020 filed in Japan on Aug. 9, 1999, 2000-127657 filed in Japan on Apr. 24, 2000 and 2000-21437 filed in Japan on Jul. 14, 2000, the entirety of which are incorporated herein by reference.

TECHNICAL FIELD

The present invention relates to a transmitting apparatus, a transmitting method, a receiving apparatus, a receiving method, a transmitting and receiving apparatus, a transmitting and receiving method, a record medium, and a signal. In particular, the present invention relates to a transmitting apparatus, a transmitting method, a receiving apparatus, a receiving method, a transmitting and receiving apparatus, a transmitting and receiving method, a record medium, and a signal that allow for example picture data to be transmitted at a limited transmission rate (with a limited transmission band) and a picture with a high spatial resolution to be displayed.

RELATED ART

For example, a related art reference of Japanese Patent Laid Open Publication No. HEI 10-112856 discloses a picture transmitting apparatus. In the picture transmitting apparatus, a transmission side transmits picture data of a particular area of a picture and picture data of the other area of the picture are transmitted with different information amounts corresponding to a command issued by a reception side. The reception side displays the picture in the area that contains a designated point with a higher spatial resolution (the resolution in the spatial direction) and the picture in the other area with a lower spatial resolution.

In other words, when the transmission side transmits picture data to the reception side through a transmission path, the transmission side cannot transmit picture data at a higher data rate than that of the transmission path. Thus, when the reception side displays a picture on a real time basis, the transmission side should transmit picture data to the reception side at a transmission rate corresponding to the transmission path. As a result, if the transmission rate is not sufficient, the spatial resolution in the spatial direction of a picture displayed on the reception side totally deteriorates.

To solve such a problem, in the picture transmitting apparatus of Japanese Patent Laid Open Publication No. HEI 10-112856, picture data in one area of a picture and picture data in other area of the picture are transmitted with different information amounts. The picture in the area that contains a designated point and the picture in the other area are displayed with a high spatial resolution and a low spatial resolution, respectively, on the reception side.

In other words, in the picture transmitting apparatus of Japanese Patent Laid Open Publication No. HEI 10-112856, the spatial resolution of a portion that the user wants to see in detail is improved at the sacrifice of the spatial resolution of the other portion.

However, in the picture transmitting apparatus of Japanese Patent Laid Open Publication No. HEI 10-112856, since the spatial resolution of the portion that the user wants to see in detail is improved at the sacrifice of the spatial resolution of the other portion, the spatial resolution of the portion that the user wants to see in detail is improved for only the sacrificed special resolution.

In addition, when the transmission rate of the transmission path is very low, if the spatial resolution of the portion that the user wants to see in detail is improved at the sacrifice of the spatial resolution of the other portion, the spatial resolution of the other portion terribly deteriorates. In the worst case, the user cannot clearly see the other portion.

The present invention is made from the above-described point of view. An object of the present invention is to allow the spatial resolution of a picture to be more improved corresponding to a preference of the user.

DISCLOSURE OF THE INVENTION

A first transmitting apparatus of the present invention is a transmitting apparatus for transmitting data to a receiving apparatus, comprising a receiving means for receiving control information transmitted from the receiving apparatus, a controlling means for controlling the resolutions in at least two directions of the temporal direction, the spatial direction, and the level direction of the data transmitted to the receiving apparatus corresponding to the control information, and a transmitting means for transmitting the data of which the resolutions in at least two directions have been controlled corresponding to the control information to the receiving apparatus.

A receiving apparatus of the present invention is a receiving apparatus for receiving data transmitted from a transmitting apparatus, comprising a transmitting means for transmitting control information to the transmitting apparatus that controls resolutions in at least two directions of the temporal direction, the spatial direction, and the level direction of the data corresponding to the control information, a receiving means for receiving the data transmitted from the transmitting apparatus, the resolutions of the data having been controlled in at least two directions of the data, and an outputting means for outputting the data received by the receiving means.

A transmitting and receiving apparatus of the present invention is a transmitting and receiving apparatus having a transmitting apparatus for transmitting data and a receiving apparatus for receiving the data, wherein the transmitting apparatus comprises a control information receiving means for receiving control information transmitted from the receiving apparatus, a controlling means for controlling the resolutions in at least two directions of the temporal direction, the spatial direction, and the level direction of the data transmitted to the receiving apparatus corresponding to the control information, and a data transmitting means for transmitting the data of which the resolutions in at least two directions have been controlled corresponding to the control information to the receiving apparatus, and wherein the receiving apparatus comprises a control information transmitting means for transmitting the control information, a data receiving means for receiving the data transmitted from the transmitting apparatus, the resolutions of the data having been controlled in at least two directions of the data, and an outputting means for outputting the data received by the data receiving means.

A second transmitting apparatus of the present invention is a transmitting apparatus for transmitting data to a receiving apparatus, comprising a receiving means for receiving control information transmitted from the receiving apparatus, a categorizing means for categorizing the data corresponding to the control information, and a transmitting means for transmitting the data to the receiving apparatus corresponding to the categorized result of the data.

A first transmitting method of the present invention is a transmitting method for transmitting data to a receiving apparatus, comprising the steps of receiving control information transmitted from the receiving apparatus, controlling the resolutions in at least two directions of the temporal direction, the spatial direction, and the level direction of the data transmitted to the receiving apparatus corresponding to the control information, and transmitting the data of which the resolutions in at least two directions have been controlled corresponding to the control information to the receiving apparatus.

A receiving method of the present invention is a receiving method for receiving data transmitted from a transmitting apparatus, comprising the steps of transmitting control information to the transmitting apparatus that controls resolutions in at least two directions of the temporal direction, the spatial direction, and the level direction of the data corresponding to the control information, receiving the data transmitted from the transmitting apparatus, the resolutions of the data having been controlled in at least two directions of the data, and outputting the data received at the receiving step.

A transmitting and receiving method of the present invention is a transmitting and receiving method having a process of a transmitting apparatus for transmitting data and a process of a receiving apparatus for receiving the data, wherein the process of the transmitting apparatus comprises the steps of receiving control information transmitted from the receiving apparatus, controlling the resolutions in at least two directions of the temporal direction, the spatial direction, and the level direction of the data transmitted to the receiving apparatus corresponding to the control information, and transmitting the data of which the resolutions in at least two directions have been controlled corresponding to the control information to the receiving apparatus, and wherein the process of the receiving apparatus comprises the steps of transmitting the control information, receiving the data transmitted from the transmitting apparatus, the resolutions of the data having been controlled in at least two directions of the data, and outputting the data received at the data receiving step.

A second transmitting method of the present invention is a transmitting method for transmitting data to a receiving apparatus, comprising the steps of receiving control information transmitted from the receiving apparatus, categorizing the data corresponding to the control information, and transmitting the data to the receiving apparatus corresponding to the categorized result of the data.

A first record medium of the present invention is a record medium for recording a program that causes a computer to perform a transmitting process for transmitting data to a receiving apparatus, the transmitting process comprising the steps of receiving control information transmitted from the receiving apparatus, controlling the resolutions in at least two directions of the temporal direction, the spatial direction, and the level direction of the data transmitted to the receiving apparatus corresponding to the control information, and transmitting the data of which the resolutions in at least two directions have been controlled corresponding to the control information to the receiving apparatus.

A second record medium of the present invention is a record medium for recording a program that causes a computer to perform a receiving process for receiving data transmitted from a transmitting apparatus, the receiving process comprising the steps of transmitting control information to the transmitting apparatus that controls resolutions in at least two directions of the temporal direction, the spatial direction, and the level direction of the data corresponding to the control information, receiving the data transmitted from the transmitting apparatus, the resolutions of the data having been controlled in at least two directions of the data, and outputting the data received at the receiving step.

A third record medium of the present invention is a record medium for recording a program that causes a computer to perform a transmitting process of a transmitting apparatus for transmitting data and a receiving process of a receiving apparatus for receiving the data, wherein the transmitting process of the transmitting apparatus comprises the steps of receiving control information transmitted from the receiving apparatus, controlling the resolutions in at least two directions of the temporal direction, the spatial direction, and the level direction of the data transmitted to the receiving apparatus corresponding to the control information, and transmitting: the data of which the resolutions in at least two directions have been controlled corresponding to the control information to the receiving apparatus, and wherein the receiving process of the receiving apparatus comprises the steps of transmitting the control information, receiving the data transmitted from the transmitting apparatus, the resolutions of the data having been controlled in at least two directions of the data, and outputting the data received at the data receiving step.

A fourth record medium of the present invention is a record medium for recording a program that causes a computer to perform a transmitting process for transmitting data to a receiving apparatus, the transmitting process comprising the steps of receiving control information transmitted from the receiving apparatus, categorizing the data corresponding to the control information, and transmitting the data to the receiving apparatus corresponding to the categorized result of the data.

A first signal of the present invention is a signal for containing a program that causes a computer to perform a transmitting process for transmitting data to a receiving apparatus, the transmitting process comprising the steps of receiving control information transmitted from the receiving apparatus, controlling the resolutions in at least two directions of the temporal direction, the spatial direction, and the level direction of the data transmitted to the receiving apparatus corresponding to the control information, and transmitting the data of which the resolutions in at least two directions have been controlled corresponding to the control information to the receiving apparatus.

A second signal of the present invention is a signal for containing a program that causes a computer to perform a receiving process for receiving data transmitted from a transmitting apparatus, the receiving process comprising the steps of transmitting control information to the transmitting apparatus that controls resolutions in at least two directions of the temporal direction, the spatial direction, and the level direction of the data corresponding to the control information, receiving the data transmitted from the transmitting apparatus, the resolutions of the data having been controlled in at least two directions of the data, and outputting the data received at the receiving step.

A third signal of the present invention is a signal for containing a program that causes a computer to perform a transmitting process of a transmitting apparatus for transmitting data and a receiving process of a receiving apparatus for receiving the data, wherein the transmitting process of the transmitting apparatus comprises the steps of receiving control information transmitted from the receiving apparatus, controlling the resolutions in at least two directions of the temporal direction, the spatial direction, and the level direction of the data transmitted to the receiving apparatus corresponding to the control information, and transmitting the data of which the resolutions in at least two directions have been controlled corresponding to the control information to the receiving apparatus, and wherein the receiving process of the receiving apparatus comprises the steps of transmitting the control information, receiving the data transmitted from the transmitting apparatus, the resolutions of the data having been controlled in at least two directions of the data, and outputting the data received at the data receiving step.

A fourth signal of the present invention is a signal for containing a program that causes a computer to perform a transmitting process for transmitting data to a receiving apparatus, the transmitting process comprising the steps of receiving control information transmitted from the receiving apparatus, categorizing the data corresponding to the control information, and transmitting the data to the receiving apparatus corresponding to the categorized result of the data.

According to the first transmitting apparatus, the first transmitting method, the first record medium, and the first signal of the present invention control information transmitted from a receiving apparatus is received. Corresponding to the control information, the resolutions in at least two directions of the temporal direction, the spatial direction, and the level direction are controlled. Data of which the resolutions in at least two directions have been controlled corresponding to the control information is transmitted to the receiving apparatus.

According to the receiving apparatus, the receiving method, the second record medium, and the second signal of the present invention, control information is transmitted to a transmitting apparatus that controls the resolutions in at least two directions of the temporal direction, the spatial direction, and the level direction corresponding to the control information. In addition, data of which the resolutions in at least two directions have been controlled corresponding to the control information is transmitted from the transmitting apparatus, received, and output.

According to the transmitting and receiving apparatus, the transmitting and receiving method, the third record medium, and the third signal, a transmitting apparatus receives control information transmitted from a receiving apparatus. Corresponding to the control information, the resolutions in at least two directions of the temporal direction, the spatial direction, and the level direction are controlled. Data of which the resolutions in at least two directions have been controlled corresponding to the control information is transmitted to the receiving apparatus. In addition, the receiving apparatus transmits control signal to the transmitting apparatus. Data of which the resolutions in at least two directions have been controlled corresponding to the control information is transmitted from the transmitting apparatus, received, and output.

According to the second transmitting apparatus, the second transmitting method, the fourth record medium, and the fourth signal of the present invention, control signal transmitted from a receiving a apparatus is received. Corresponding to the control information, data is categorized. Corresponding to the categorized result of the data, data is transmitted to the receiving apparatus.

BRIEF DESCRIPTION OF DRAWINGS

FIG. 9 is a schematic diagram for explaining hierarchical encoding/decoding.

FIG. 10 is a flow chart for explaining a transmitting process of a transmitting process portion 16 shown in FIG. 7.

FIG. 15 is a schematic diagram showing an example of a display of a picture of a picture outputting portion 23 shown in FIG. 5.

FIG. 16 is a schematic diagram for explaining the relation between the spatial resolution and the temporal resolution of a picture transmitted from the transmitting apparatus 1 to the receiving apparatus 2 shown in FIG. 1.

FIG. 20 is a schematic diagram for explaining the processes of a merged area process portion 85 and a separated area process portion 86 shown in FIG. 17.

FIG. 42 is a schematic diagram for explaining an object number assigning method.

FIG. 46 is a schematic diagram for explaining an object extracting method.

FIG. 47 is a block diagram showing an example of another structure of the combining process portion 1022 shown in FIG. 31.

BEST MODES FOR CARRYING OUT THE INVENTION

Figure 1:
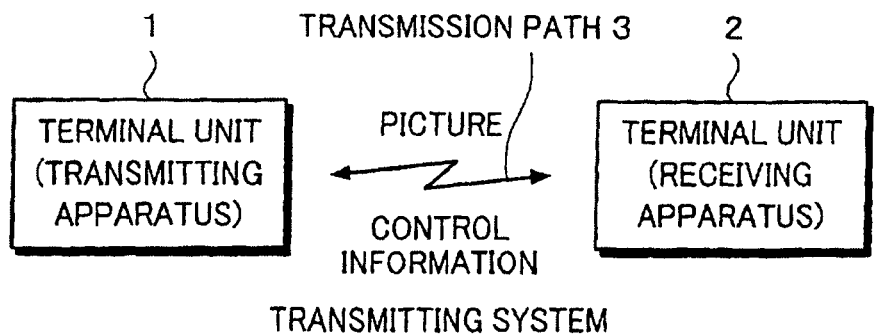
FIG. 1 is a schematic diagram showing an example of the structure of a transmitting system according to an embodiment of the present invention.

FIG. 1 shows the structure of a picture transmitting system (the system is a substance as a logical set of a plurality of devices regardless of whether or not each device is disposed in one housing) according to an embodiment of the present invention.

The transmitting system is composed of at least two terminal units 1 and 2. In the relation between the terminal units 1 and 2, one is a transmitting apparatus and the other is a receiving apparatus. A picture (picture data) is transmitted from the transmitting apparatus to the receiving apparatus through a transmission path 3.

According to the embodiment of the present invention, for example, it is assumed that the terminal unit 1 is a transmitting apparatus and the terminal unit 2 is a receiving apparatus and that picture data is transmitted and received therebetween. Hereinafter, the terminal unit 1 or 2 may be referred to as transmitting apparatus 1 or receiving apparatus 2, respectively.

In this case, the transmitting apparatus 1 transmits picture data to the receiving apparatus 2 through the transmission path 3. The receiving apparatus 2 receives picture data from the transmitting apparatus 1. The picture data is displayed on a picture outputting portion 23 (see FIG. 5) that will be described later. The picture outputting portion 23 is composed of for example a liquid crystal display or a CRT (Cathode Ray Tube). In addition, the receiving apparatus 2 transmits control information for controlling the spatial resolution in the spatial direction and the temporal resolution in the temporal direction of the picture displayed by the picture outputting portion 23 to the transmitting apparatus 1 through the transmission path 3.

The transmitting apparatus 1 receives the control information from the receiving apparatus 2 and controls the transmission of the picture data corresponding to the control information so that the spatial resolution and the temporal resolution of the picture displayed by the receiving apparatus 2 are changed while a predetermined condition is satisfied.

As the transmitting apparatus 1 and the receiving apparatus 2, terminal units such as PHS (Personal Handy-phone System) (trademark) units and portable terminal units such as portable telephone units can be used. When the PHS units are used, the transmission path 3 has a frequency band of 1895.1500 to 1905.9500 MHz and the transmission rate thereof is 128 kbps (Bit Per Second).

Figure 2:
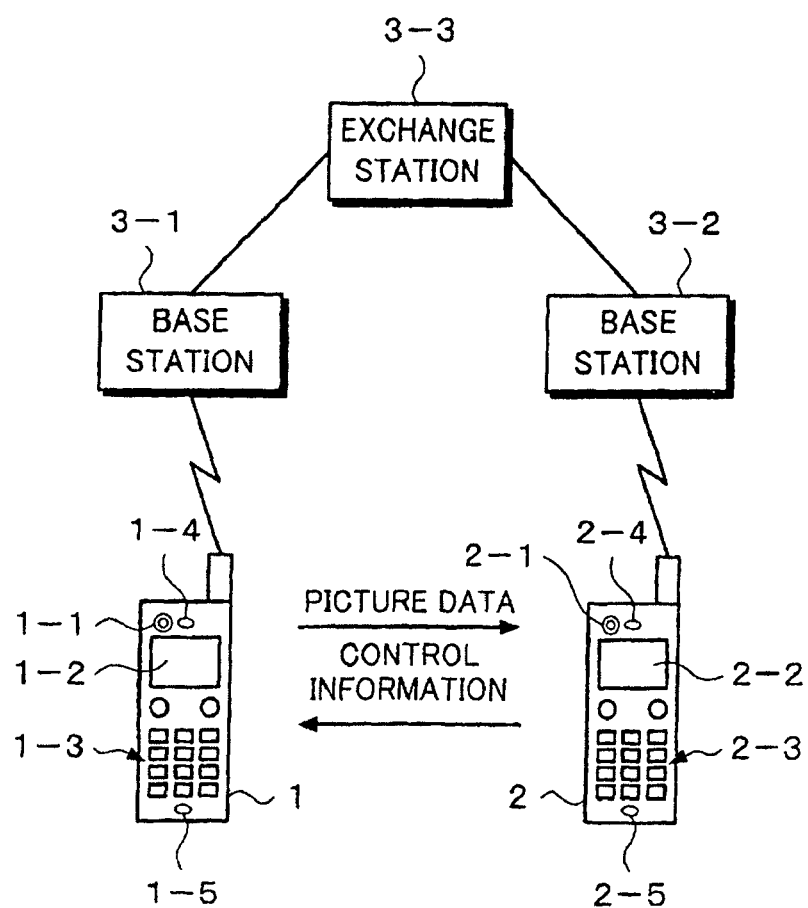
FIG. 2 is a detailed schematic diagram showing an example of a first structure of the transmitting system shown in FIG. 1.

FIG. 2 shows an example of a first structure of the picture transmitting system shown in FIG. 1 in the case that portable terminal units such as PHS units and portable telephone units are used as the transmitting apparatus 1 and the receiving apparatus 2 shown in FIG. 1.

According to the embodiment shown in FIG. 2, the transmission path 3 shown in FIG. 1 is composed of a radio base station 3-1 or 3-2 and an exchange station 3-3 that is for example a telephone station that connects the radio base stations 3-1 and 3-2. The radio base station 3-1 or 3-2 transmits and receives a radio signal to/from the terminal unit 1 or 2. Between the terminal units 1 and 2, each of them can transmit a signal to the other through the transmission path 3 composed of the radio base stations 3-1 and 3-2 the charging server 4, and so forth and receive a signal from the other. The type of the base station 3-1 may be the same as or different from the type of the base station 3-2.

Referring to FIG. 2, the terminal unit 1 comprises a video camera portion 1-1, a displaying portion 1-2, a key portion 1-3, a speaker 1-4, and a microphone 1-5. The video camera portion 1-1 has an image pickup device and an optical system that can photograph a moving picture. The displaying portion 1-2 can display characters, symbols, pictures, and so forth. The key portion 1-3 is operated when a telephone number, a character, a command, or the like is input. The speaker 1-4 outputs a sound. The microphone 1-5 inputs a sound. Likewise, the terminal unit 2 comprises a video camera portion 2-1, a displaying portion 2-2, a key portion 2-3, a speaker 2-4, and a microphone 2-5 that have the same structures as the video camera portion 1-1, the displaying portion 1-2, the key portion 1-3, the speaker 1-4, and the microphone 1-5, respectively.

Between the terminal units 1 and 2, audio signals collected by the microphones 1-5 and 1-6 are transmitted and received. In addition, picture data photographed by the video camera portions 1-1 and 2-1 can be transmitted and received. Thus, the displaying portion 1-2 of the terminal unit 1 can display picture data obtained by the video camera portion 2-1 of the terminal unit 2. Likewise, the displaying portion 2-2 of the terminal unit 2 can display picture data obtained by the video camera portion 1-1 of the terminal unit 1.

In other words, along with necessary information such as a frame rate, picture data photographed by the video camera portion 1-1 of the transmitting apparatus 1 is transmitted to the receiving apparatus 2 through the transmission path 3 composed of the base stations 3-1 and 3-2 and the exchange station 3-3. The receiving apparatus 2 receives picture data from the transmitting apparatus 1 and displays (a picture corresponding to) the received picture data on the displaying portion 2-1 composed of for example a liquid crystal display. On the other hand, the receiving apparatus 2 transmits control information for controlling the spatial resolution and the temporal resolution of a picture displayed on the displaying portion 2-1 to the transmitting apparatus 1 through the transmission path 3. The transmitting apparatus 1 receives control information from the receiving apparatus 2 and controls the transmission of the picture data corresponding to the control information so that the spatial resolution and the temporal resolution of the picture displayed by the receiving apparatus 2 are changed while a predetermined condition is satisfied.

Figure 3:
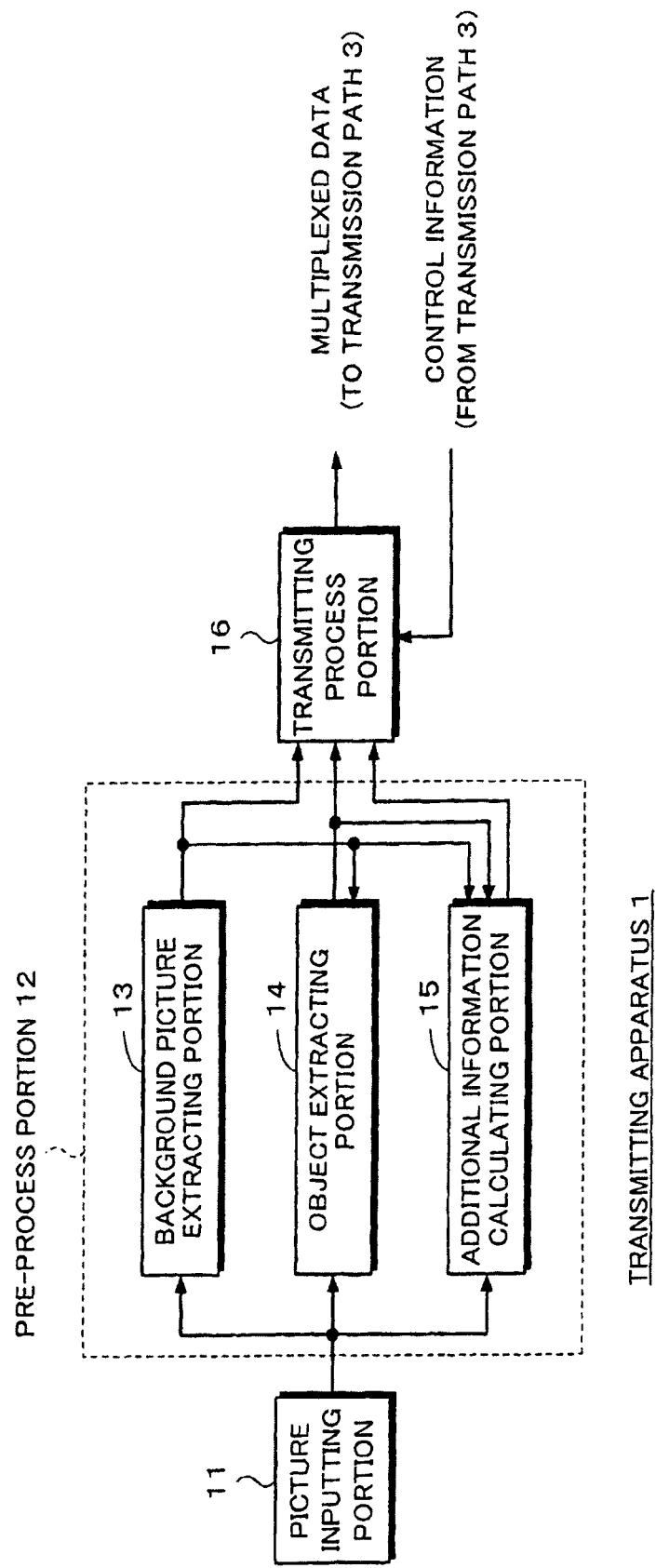
FIG. 3 is a block diagram showing an example of the structure of a transmitting apparatus (terminal unit) 1 shown in FIG. 1.

Next, FIG. 3 shows an example of the structure of the transmitting apparatus 1 shown in FIG. 2.

A picture inputting portion 11 corresponds to the video camera portion 1-1 shown in FIG. 2. The picture inputting portion 11 photographs a particular object and outputs the picture thereof to a pre-process portion 12. The pre-process portion 12 is composed of a background picture extracting portion 13, an object extracting portion 14, and an additional information calculating portion 15. The pre-process portion 12 performs the pre-process for the picture that is input from the picture inputting portion 11 and supplies the resultant picture to a transmitting process portion 16.

In other words, the background picture extracting portion 13 extracts a so-called background picture from the picture supplied from the picture inputting portion 11 and supplies the extracted background picture to the transmitting process portion 16. In addition, the background picture extracted by the background picture extracting portion 13 is also supplied to the object extracting portion 14 and the additional information calculating portion 15.

As a method for extracting the background picture, the appearance frequencies of pixel values of pixels at the same spatial position of a plurality of successive frames (for example, the current frame and the past 10 frames) are obtained. A pixel value with the highest frequency may be treated as a background picture at the position. Alternatively, the average value (moving average value) of pixel values at the same position of a plurality of frames may be obtained as a background picture at the position.

The object extracting portion 14 performs for example a subtraction of the background picture extracted by the background picture extracting portion 13 from the picture supplied from the picture inputting portion 11, obtains a so-called foreground picture, and supplies the foreground picture to the transmitting process portion 16. When a picture that is input from the picture inputting portion 11 contains a plurality of substances as foreground pictures, the object extracting portion 14 extracts the foreground picture corresponding to each substance and supplies the extracted foreground picture to the transmitting process portion 16. In addition, the foreground picture extracted by the object extracting portion 14 is also supplied to the additional information calculating portion 15. Hereinafter, a foreground picture corresponding to each substance may be referred to as object.

The additional information calculating portion 15 detects a background picture moving vector and an object moving vector. The background picture moving vector represents the motion of a background picture extracted by the background picture extracting portion 13 (the motion of a background picture corresponds to the motion of the photographing direction of the picture inputting portion 11). The object moving vector represents the motion of an object extracted by the object extracting portion 14. In addition, the additional information calculating portion 15 supplies position information and so forth of an object in a frame as additional information supplied from the object extracting portion 14 to the transmitting process portion 16. In other words, when the object extracting portion 14 extracts an object, the object extracting portion 14 also extracts information about the object such as position information and so forth of the object and supplies the information to the additional information calculating portion 15. The additional information calculating portion 15 also outputs the position information and so forth as additional information.

The transmitting process portion 16 multiplexes the background picture extracted by the background picture extracting portion 13, the object extracted by the object extracting portion 14, and the additional information obtained by the additional information calculating portion 15 and transmits the resultant multiplexed data to the receiving apparatus 2 through the transmission path 3 at a data rate thereof. The transmitting process portion 16 receives control information transmitted from the receiving apparatus 2 through the transmission path 3 and controls the transmission of the background picture, the object, and the additional information corresponding to the control information so that the spatial resolution and the temporal resolution of the picture displayed by the receiving apparatus 2 are changed while a predetermined conditions is satisfied.

Figure 4:
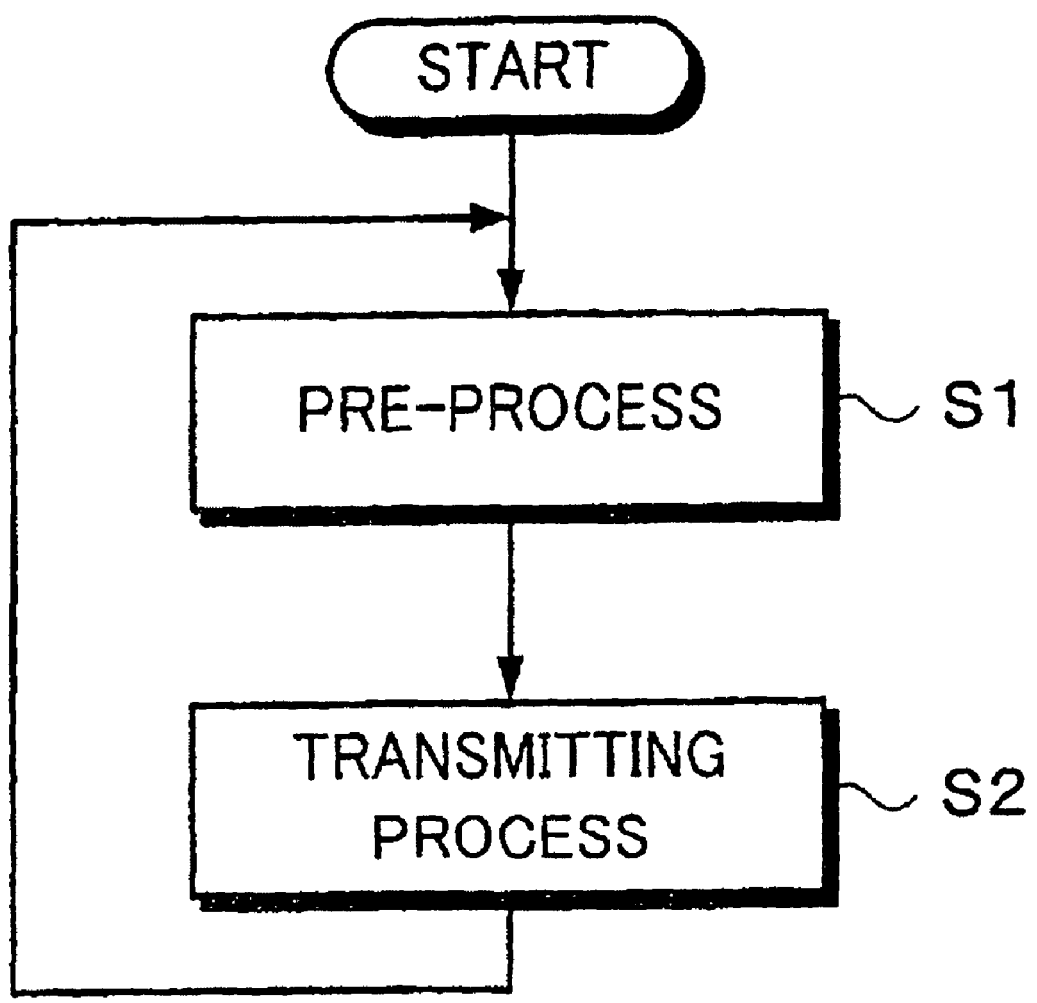
FIG. 4 is a flow chart for explaining the process of the transmitting apparatus shown in FIG. 3.

Next, with reference to a flow chart shown in FIG. 4, the process of the transmitting apparatus 1 shown in FIG. 3 will be described in brief.

A picture that is output from the picture inputting portion 11 is supplied to the pre-process portion 12. At step S1, the pre-process portion 12 performs the pre-process for the picture. In other words, at step S1, the background picture extracting portion 13 or the foreground picture extracting portion 14 extracts a background picture or an object from the picture that is input from the picture inputting portion 11, respectively, and supplies the extracted background picture or the extracted object to the transmitting process portion 16. In addition, at step S1, the additional information calculating portion 15 obtains the above-described additional information from the picture that is input from the picture inputting portion 11 and supplies the obtained additional information to the transmitting process portion 16. The transmitting process portion 16 transmits the background picture, the foreground picture, and the additional information through the transmission path 3. Thereafter, the flow returns to step S1. Thereafter, the transmitting apparatus 1 repeats the similar process.

Figure 5:
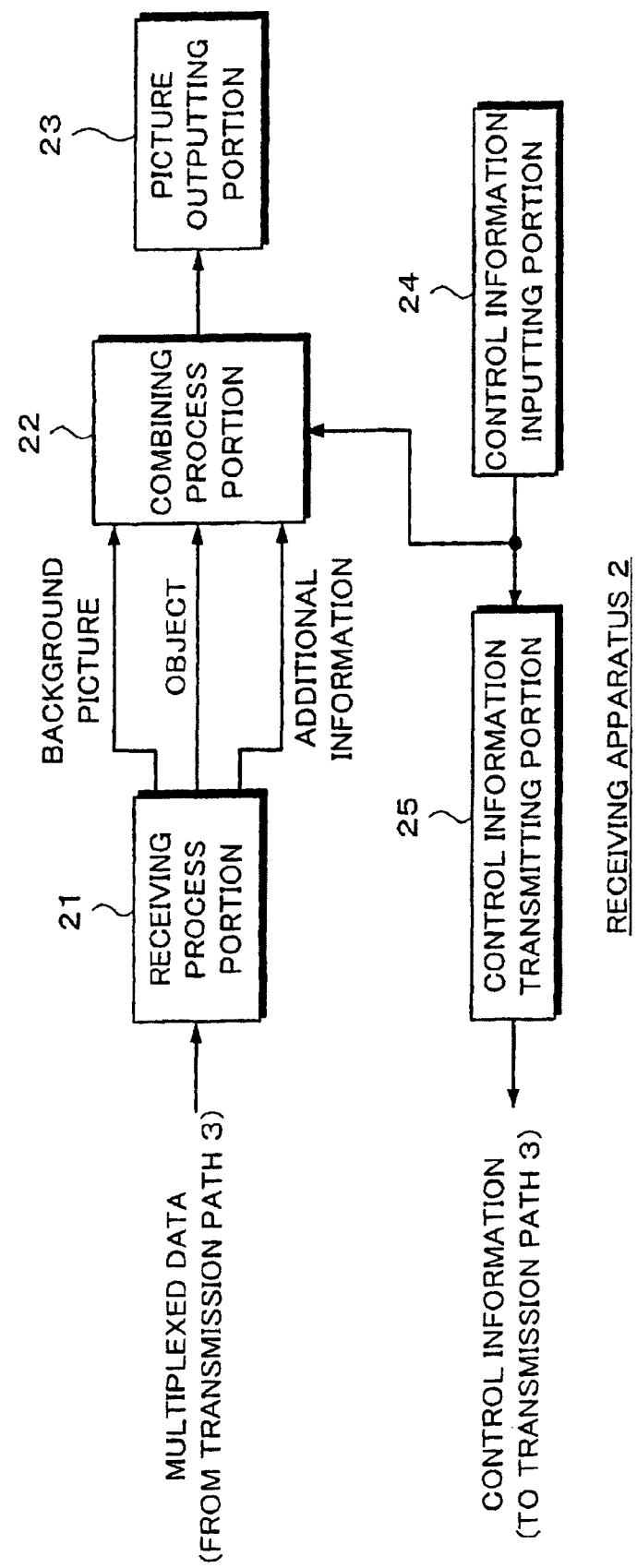
FIG. 5 is a block diagram showing an example of the structure of a receiving apparatus (terminal unit) 2 shown in FIG. 1.

FIG. 5 shows an example of the structure of the receiving apparatus 2 shown in FIG. 2.

Multiplexed data is transmitted from the transmitting apparatus 1 through the transmission path 3. The multiplexed data is received by the receiving process portion 21. The receiving process portion 21 separates the multiplexed data into a background picture, an object, and additional information and supplies them to the combining process portion 22.

The combining process portion 22 combines the background picture, the object, and the additional information received from the receiving process portion 21 into the original picture and supplies the combined picture to the picture outputting portion 23. The combining process portion 22 changes the spatial resolution and the temporal resolution of the picture that is combined corresponding to high resolution information and so forth that will be described later.

The picture outputting portion 23 is composed of for example a liquid crystal display or a CRT. The picture outputting portion 23 displays a picture that is output from the combining process portion 22.

A control information inputting portion 24 outputs control information to the combining process portion 22 and a control information transmitting portion 25. In other words, the control information inputting portion 24 composes the key portion 2-3. The control information inputting portion 24 is composed of for example a pointing device such as a track ball. When the user designates a particular position of a picture displayed by the picture outputting portion 23 with the control information inputting portion 24, it detects the position as a considered point that the user is considering, places the coordinates of the considered point in the control information, and outputs the resultant control information. Alternatively, the control information inputting portion 24 is composed of for example a video camera. When the user photographs and recognizes a picture, the control information inputting portion 24 detects a point that the user is considering as a considered point, places the coordinates of the considered point in the control information, and outputs the resultant control information. The control information inputting portion 24 may be structured so that the user can directly input the spatial resolution and the temporal resolution of a picture displayed by the picture outputting portion 23 as control information.

When the control information transmitting portion 25 receives the control information from the control information inputting portion 24, the control information transmitting portion 25 transmits the control information to the transmitting apparatus 1 through the transmission path 3.

Figure 6:
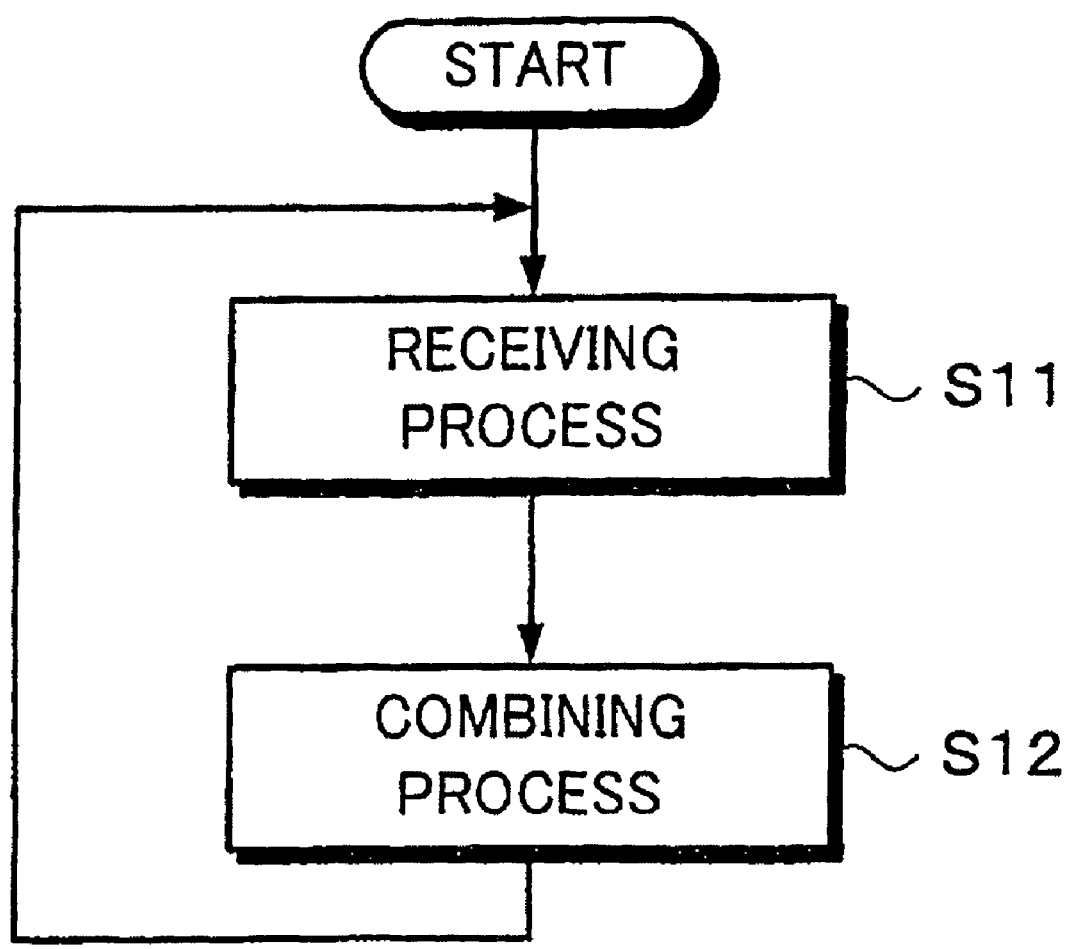
FIG. 6 is a flow chart for explaining the process of the receiving apparatus 2 shown in FIG. 5.

Next, with reference to a flow chart shown in FIG. 6, the process of the receiving apparatus 2 shown in FIG. 5 will be described in brief.

In the receiving apparatus 2, the receiving process portion 21 receives multiplexed data from the transmitting apparatus 1 through the transmission path 3. At step S11, the receiving process portion 21 performs a receiving process for separating the multiplexed data into a background picture, an object, and additional information. The receiving process portion 21 supplies the background picture, the object, and the additional information as the result of the receiving process to the combining process portion 22. At step S12, the combining process portion 22 combines the background picture, the object, and the additional information to the original picture and supplies the combined picture to the picture outputting portion 23. The picture outputting portion 23 displays the combined picture. Thereafter, the flow returns to step S11. Thereafter, the receiving apparatus repeats the similar process.

In the receiving apparatus 2, when the user designates a considered point of a picture displayed by the picture outputting portion 23 with the control information inputting portion 24, the coordinates of the considered point are placed in the control information. The resultant control information is supplied to the control information transmitting portion 25. The control information transmitting portion 25 transmits the control information to the transmitting apparatus 1 through the transmission path 3. When the transmitting apparatus 1 receives the control information, as was described above, the transmitting process portion 16 controls the transmission of the background picture, the object, and the additional information so that the spatial resolution and the temporal resolution of the picture displayed by the receiving apparatus 2 can be changed while a predetermined condition is satisfied. Thus, thereafter, since the background picture, the object, and the additional information that have been controlled are transmitted from the transmitting apparatus 1 to the receiving apparatus 2, a picture of which the spatial resolution and the temporal resolution have been changed while a predetermined condition has been satisfied is displayed by the receiving apparatus 2.

Figure 7:
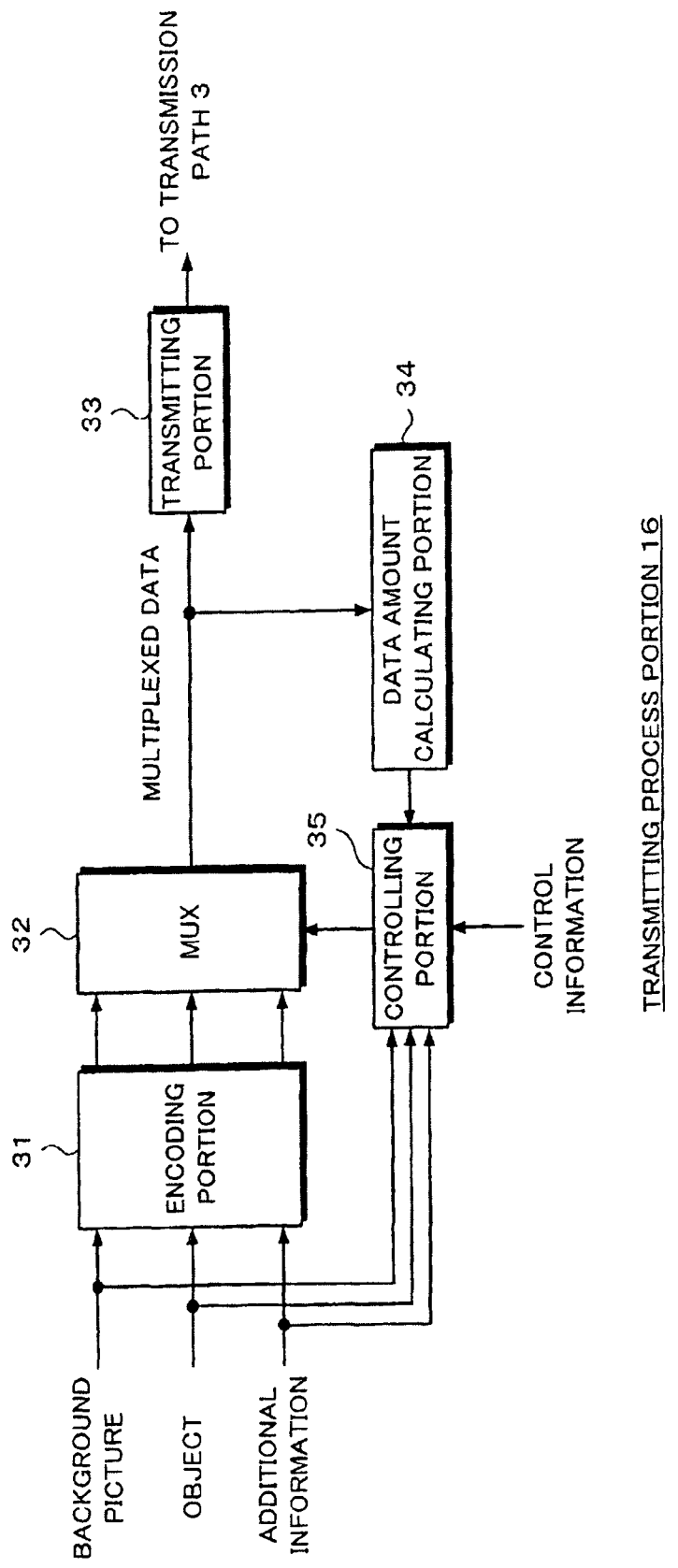
FIG. 7 is a block diagram showing an example of the structure of a transmitting process portion 16 shown in FIG. 3.

Next, FIG. 7 shows an example of the structure of the transmitting process portion 16 of the transmitting apparatus 1 shown in FIG. 3.

A background picture, an object, and additional information are supplied from the pre-process portion 12 (see FIG. 3) to the encoding portion 31 and the controlling portion 35. The encoding portion 31 encodes the background picture, the object, and the additional information and supplies the resultant encoded data to an MUX (multiplexer) 32. The MUX 32 selects encoded data of the background picture, the object, and the additional information received from the encoding portion 31 under the control of the controlling portion 35 and supplies the selected encoded data as multiplexed data to a transmitting portion 33. The transmitting portion 33 modulates the multiplexed data received from the MUX 32 and transmits the modulated data to the receiving apparatus 2 through the transmission path 3. A data amount calculating portion 34 monitors the multiplexed data that the MUX 32 outputs to the transmitting portion 33, calculates the data rate of the multiplexed data, and supplies the calculated data rate to the controlling portion 35.

The controlling portion 35 controls the output of the multiplexed data of the MUX 32 so that the data rate of the data amount calculating portion 34 does not exceed the transmission rate of the transmission path 3. In addition, the controlling portion 35 receives the control information transmitted from the receiving apparatus 2 through the transmission path 3 and controls the selection of the encoded data of the MUX 32 corresponding to the control information.

Figure 8:
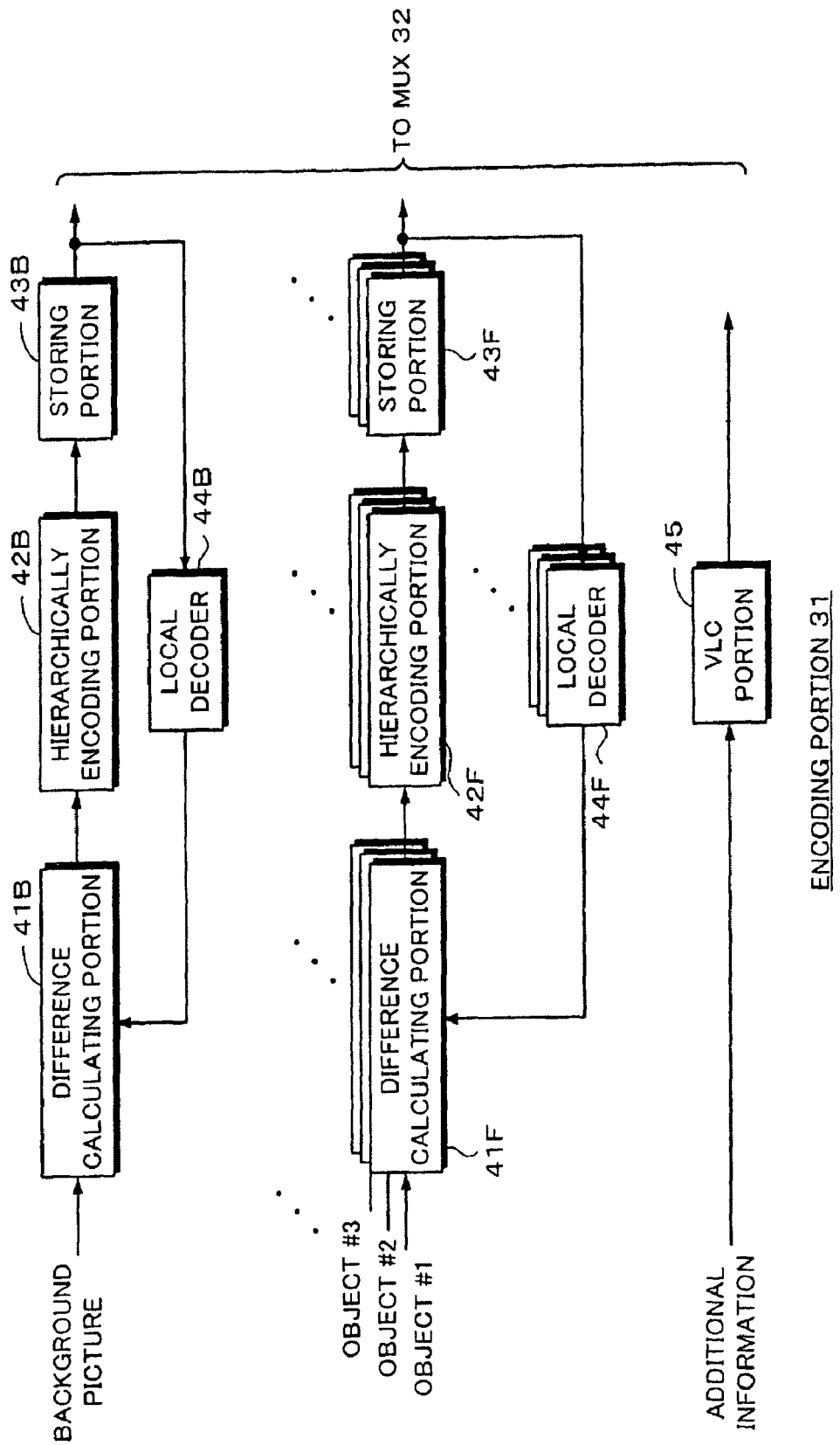
FIG. 8 is a block diagram showing an example of the structure of an encoding portion 31 shown in FIG. 7.

FIG. 8 shows an example of the structure of the encoding portion 31 shown in FIG. 7.

A background picture is supplied to a difference calculating portion 41B. The difference calculating portion 41 subtracts a background picture of the immediately preceding frame that has been processed from a background picture of the current frame that is processed (hereinafter, this frame may be referred to as considered frame) and supplies difference data of the background pictures as the subtracted result to a hierarchically encoding portion 42B. The hierarchically encoding portion 42B hierarchically encodes the difference data of the background pictures received from the difference calculating portion 41B and supplies the encoded result to a storing portion 43B. The storing portion 43B temporarily stores the hierarchically encoded result received from the hierarchically encoding portion 42. The hierarchically encoded result stored in the storing portion 43B is supplied as encoded data of background pictures to the MUX 32 (see FIG. 7).

The hierarchically encoded result stored in the storing portion 43B is supplied to a local decoder 44B. The local decoder 44B decodes the hierarchically encoded result to the original background picture and supplies the decoded background picture to the difference calculating portion 41B. The background picture decoded by the local decoder 44B is used by the difference calculating portion 41B. The difference calculating portion 41B uses the decoded background picture to obtain the difference data of a background picture of the next frame.

An object is supplied to a difference calculating portion 41F. The difference calculating portion 41F, a hierarchically encoding portion 42F, a storing portion 43F, and a local decoder 44F perform the same processes as the above-described difference calculating portion 41B, the hierarchically encoding portion 42B, the storing portion 43B, and the local decoder 44B. Thus, in the same manner as the background picture the object is hierarchically encoded and supplied to the MUX 32 (see FIG. 7). When there are a plurality of objects, the difference calculating portion 41F, the hierarchically encoding portion 42F, the storing portion 43F, and the local decoder 44F hierarchically encode the plurality of objects in the above-described manner.

Additional information is supplied to a VLC (Variable Length Coding) portion 45. The VLC portion 45 encodes the additional information corresponding to variable length code encoding method and supplies the encoded additional information to the MUX 32 (see FIG. 7).

Next, with reference to FIG. 9, hierarchical encoding/decoding performed by the encoding portion 31 shown in FIG. 8 will be described.

Now, it is assumed that the average value of four pixels of 2×2 pixels (horizontal×vertical) of a lower hierarchy is treated as a pixel (pixel value) of a higher hierarchy and that in three hierarchical levels, a picture is encoded. In this case, as a picture in the lowest hierarchical level, considering 8×8 pixels as shown in FIG. 9 (A), the average value m0 of four pixels h00, h01, h02, and h03 of an upper left portion of 2×2 pixels is calculated. The average value m0 is treated as one pixel of an upper left portion of the second hierarchical level. The average value m1 of four pixels h10, h11, h12, and h13 of an upper right portion of the lowest hierarchical level is calculated. The average value m2 of four pixels h20, h21, h22, and h23 of a lower left portion of the lowest hierarchical level is calculated. The average value m3 of four pixels h30, h31, h32, and h33 of a lower right portion of the lowest hierarchical level is calculated. The average values m1, m2, and m3 are treated as pixels at an upper right portion, a lower left portion, and a lower right portion of the second hierarchical level, respectively. In addition, the average value q of four pixels m0, m1, m2, and m3 of 2×2 pixels of the second hierarchical level is calculated. The average value q is treated as a pixel of the third hierarchical level that is the highest hierarchical level.

According to the above-described hierarchical encoding, the spatial resolution of a picture in the highest hierarchical level is the lowest. The spatial resolution of a picture is inversely proportional to the hierarchical level. In other words, the spatial resolution of a picture in the lowest hierarchical level is the highest.

The data amount in the case that all the pixels h00 to h03, h10 to h13, h20 to h23, h30 to h33, m0 to m3, and q are transmitted is larger than the data amount in the case that only a picture of the lowest hierarchical level is transmitted by the pixels m0 to m3 and q of the higher hierarchical levels.

Thus, as shown in FIG. 9 (B), the pixel q of the third hierarchical level is transmitted instead of for example the pixel m3 at a lower right position of the pixels m0 to m3 of the second hierarchical level.

In addition, as shown in FIG. 9 (C), the pixel m0 of the second hierarchical level is transmitted instead of the pixel h03 at a lower right position of the lowest hierarchical level. Likewise, the remaining pixels m1, m2, and q of the second hierarchical level are transmitted instead of the pixels h13, h23, and h33 of the first hierarchical level. Although the pixel q is not a pixel of the second hierarchical level, it is transmitted instead of the pixel m3 directly obtained from the pixels h30 to h33. Thus, the pixel q is transmitted instead of the pixel m3 instead of the pixel h33.

Thus, as shown in FIG. 9 (C), the number of pixels that are transmitted becomes 4×4 pixels=16 pixels. Thus, the number of pixels that are transmitted is the same as the case that only pixels of the lowest hierarchical level shown in FIG. 9 (A) are transmitted. Thus, in this case, the amount of data that is transmitted can be prevented from increasing.

The pixel m3 transmitted instead of the pixel q and the pixels h03, h13, h23, and h33 transmitted instead of the pixels m0 to m3 can be decoded in the following manner.

In other words, since q is the average value of m0 to m3, the expression q=(m0+m1+m2+m3)/4 is satisfied. Thus, the pixel m3 of the second hierarchical level can be obtained (decoded) with the pixel q of the third hierarchical level and the pixels m0 to m2 of the second hierarchical level corresponding to the expression m3=4×q−(m1+m1+m2).

In addition, since m0 is the average value of h00 to h03, the expression m0=(h00+h01+h02+h03)/4 is satisfied. Thus, corresponding to the expression h03=4×m0−(h00+h01+h02), the pixel h03 of the first hierarchical level can be obtained with the pixel m0 of the second hierarchical level and the pixels h00 to h02 of the first hierarchical level. In the same manner, h13, h23, and h33 can be obtained.

Thus, a pixel that is not transmitted in a particular hierarchical level can be decoded with pixels that are transmitted in the particular hierarchical level and a pixel of the immediately higher hierarchical level.

Next, with reference to a flow chart shown in FIG. 10, the transmitting process of the transmitting process portion 16 shown in FIG. 7 will be described.

At step S21, in the transmitting process portion 16, the controlling portion 35 determines whether or not a control signal has been transmitted from the receiving apparatus 2. When the determined result at step S21 represents that the control signal has not been transmitted from the receiving apparatus 2' (namely, the controlling portion 35 has not received the control signal), the flow advances to step S22. The controlling portion 35 controls the MUX 32 to select encoded data of a background picture, an object, and additional information and multiplex them so that the receiving apparatus 2 can display a picture with a regular temporal resolution (for example, a default temporal resolution).

When the regular temporal resolution is for example 30 frames/sec, the MUX 32 selects encoded data of a background picture, an object, and additional information, multiplex the encoded data, and outputs the multiplexed data so that the picture is displayed with the maximum spatial resolution of which the multiplexed data is transmitted at the transmission rate of the transmission path 3.

In reality, for example, in the case that hierarchical encoding is performed in three hierarchical levels, when data of only the third hierarchical level is transmitted at the transmission rate of the transmission path 3, encoded data of a background picture, an object, and additional information is selected so that a picture of the third hierarchical level is displayed. Thus, in this case, the receiving apparatus 2 displays a picture with a spatial resolution that is ¼ times (in the horizontal direction and the vertical direction each) lower than that of the original picture (of the first hierarchical level) and a temporal resolution of 30 frames/sec.

Thereafter, the flow advances to step S23. At step S23, the transmitting portion 33 transmits the multiplexed data that is output from the MUX 32 through the transmission path 3. Thereafter, the flow returns to step S21.

When the determined result at step S21 represents that a control signal has been transmitted from the receiving apparatus 2 (namely, the controlling portion 35 has received the control signal), the flow advances to step S24. The controlling portion 35 operates the control information inputting portion 24 (see FIG. 5) corresponding to the control signal and thereby recognizes a designated considered point. Thereafter, the flow advances to step S25.

At step S25, the controlling portion 35 designates an area such as a rectangle having a predetermined size around a considered point (the rectangle has parallel sides in the horizontal direction and the vertical direction of a frame and has the considered point at the center of gravity thereof) as a priority range in which the spatial resolution is improved with priority and detects a background picture, an object, and additional information that compose the picture in the priority range.

Thereafter, the flow advances to step S26. At step S26, the controlling portion 35 controls the MUX 32 to select and multiplex encoded data of a background picture, an object, and additional information and multiplex the selected encoded data so that the receiving apparatus 2 can display the picture in the priority range with a higher spatial resolution.

In other words, when the controlling portion 35 receives a control signal from the receiving apparatus 2, the controlling portion 35 controls the MUX 32 to improve the spatial resolution of the picture in the priority range at the sacrifice of the temporal resolution.

Thus, the MUX 32 selects encoded data of a background picture, an object, and additional information necessary for displaying a picture of the third hierarchical level and a picture of the second hierarchical level with priority, multiplexes the selected encoded data, and outputs the multiplexed data.

In addition, at step S26, the controlling portion 35 controls the MUX 32 to insert information of the position of the priority range, the size thereof, and so forth (hereinafter may be referred to as high resolution information) into the additional information selected as multiplexed data. Thereafter, the flow advances to step S23.

At step S23, as was described above, the transmitting portion 33 transmits the multiplexed data that is output from the MUX 32 through the transmission path 3. Thereafter, the flow returns to step S21.

For simplicity, assuming that encoded data of a background picture, an object, and additional information for displaying a picture of the third hierarchical level is continuously selected for a picture of the third hierarchical level as a picture in the non-priority region at step S26, the data amount of the multiplexed data is larger than that in the case at step S22 by the data of the second hierarchical level for the picture in the priority range. According to the embodiment of the present invention, as was described above, to display a picture at 30 frames/second, data of only the third hierarchical level is transmitted at the transmission rate of the transmission path 3. Thus, the multiplexed data obtained at step S26 cannot be transmitted so that the picture is displayed at 30 frames/second. Thus, at step S23, in the extreme case, the multiplexed data obtained at step S26 is transmitted with a temporal resolution of 0 frames/sec.

Thus, in this case, for a picture in the priority range, the receiving apparatus 2 displays a picture of which the spatial resolution in each of the horizontal direction and the vertical direction is ½ as low as that of the original picture (of the first hierarchical level). In other words, the receiving apparatus 2 displays a picture (of the second hierarchical level) of which the spatial resolution in each of the horizontal direction and the vertical direction is twice as high as that of a picture of the third hierarchical level. However, the temporal resolution is 0 frame/second. In other words, the receiving apparatus 2 displays a still picture.

After data of the second hierarchical level is transmitted for a picture in the priority range, when the determined result at step S21 represents that the control signal has been transmitted again from the receiving apparatus 2 (namely, the user continues to operate the control information inputting portion 24 and designates the same considered point), the flow advances to step S24. At step S24, the controlling portion 35 recognizes the same considered point. Thereafter, the flow advances to step S25. At step S25, the controlling portion 35 designates the same priority range. Thereafter, the flow advances to step S26.

At step S26, the controlling portion 35 controls the MUX 32 to select encoded data of a background picture, an object, and additional information and multiplexes the selected encoded data so that the receiving apparatus 2 can display the picture in the priority range with a higher spatial resolution.

In this case, for a picture in the priority range, encoded data of a background picture, an object, and additional information of the third hierarchical level and the second hierarchical level is selected with priority. In this case, encoded data of a background picture, an object, and additional information of the first hierarchical level is selected with priority and output as multiplexed data. In addition, at step 26, as was described above, high resolution information is inserted into the additional information. Thereafter, the flow advances to step S23. At step S23, the transmitting portion 33 transmits the multiplexed data that is output from the MUX 32 through the transmission path 3. Thereafter, the flow returns to step S21.

Thus, in this case, for a picture in the priority range, the receiving apparatus 2 displays a picture with a spatial resolution that is the same as that of the original picture (of the first hierarchical level). In other words, the receiving apparatus 2 displays a picture (of the first hierarchical level) with a spatial resolution (in each of the horizontal direction and the vertical direction) that is four times higher than that of the picture of the third hierarchical level. However, the temporal resolution is for example 0 frames/second. In other words, the receiving apparatus 2 displays a still picture.

Thus, when the user continues to operate the control information inputting portion 24 and designate the same considered point, for a picture in the priority range that contains the considered point, data for improving a spatial resolution is transmitted with priority at the sacrifice of the temporal resolution of the picture. Thus, although the temporal resolution of the picture deteriorates, the spatial resolution of the picture in the priority range that contains the considered point gradually improves. Thus, the picture in the priority range is more clearly displayed. In other words, the picture of the portion that the user is considering is more clearly displayed.

Thus, the transmission of picture data is controlled so that the spatial resolution and the temporal resolution of a picture in a particular priority range that contains a considered point are changed in the range of a resolution of picture data transmitted at the transmission rate of the transmission path 3. In other words, the transmission of picture data is controlled so that the spatial resolution of a picture in the priority range improves and the temporal resolution of the picture deteriorates. Thus, the improved spatial resolution and the deteriorated temporal resolution is obtained with picture data transmitted at the transmission rate of the transmission path 3. As a result, at a limited transmission rate, the spatial resolution of a picture displayed by the receiving apparatus 2 can be more improved.

Figure 11:
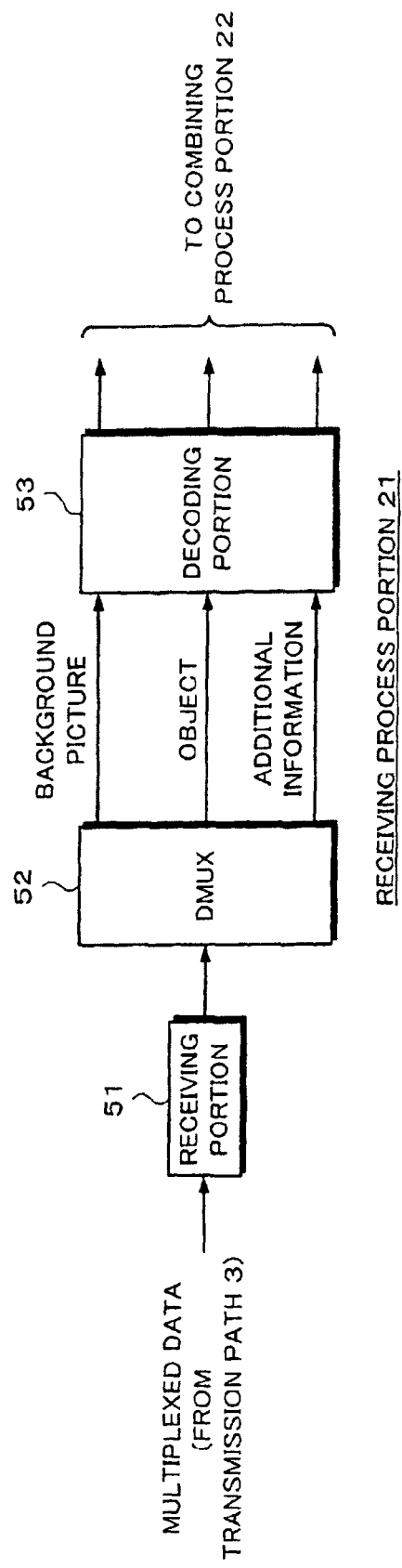
FIG. 11 is a block diagram showing an example of the structure of a receiving process portion 21 shown in FIG. 5.

Next, FIG. 11 shows an example of the structure of the receiving process portion 21 shown in FIG. 5.

Multiplexed data is received by a receiving, portion 51 through the transmission path 3. After the multiplexed data is demodulated, it is supplied to a DMUX (demultiplexer) 52. The DMUX 52 separates the multiplexed data received from the receiving portion 51 into encoded data of a background picture, an object, and additional information and supplies the separated data to a decoding portion 53. The decoding portion 53 decodes the encoded data of the background picture, the object, and the additional information into their original data and outputs them to the combining process portion 22 (see FIG. 5).

Figure 12:
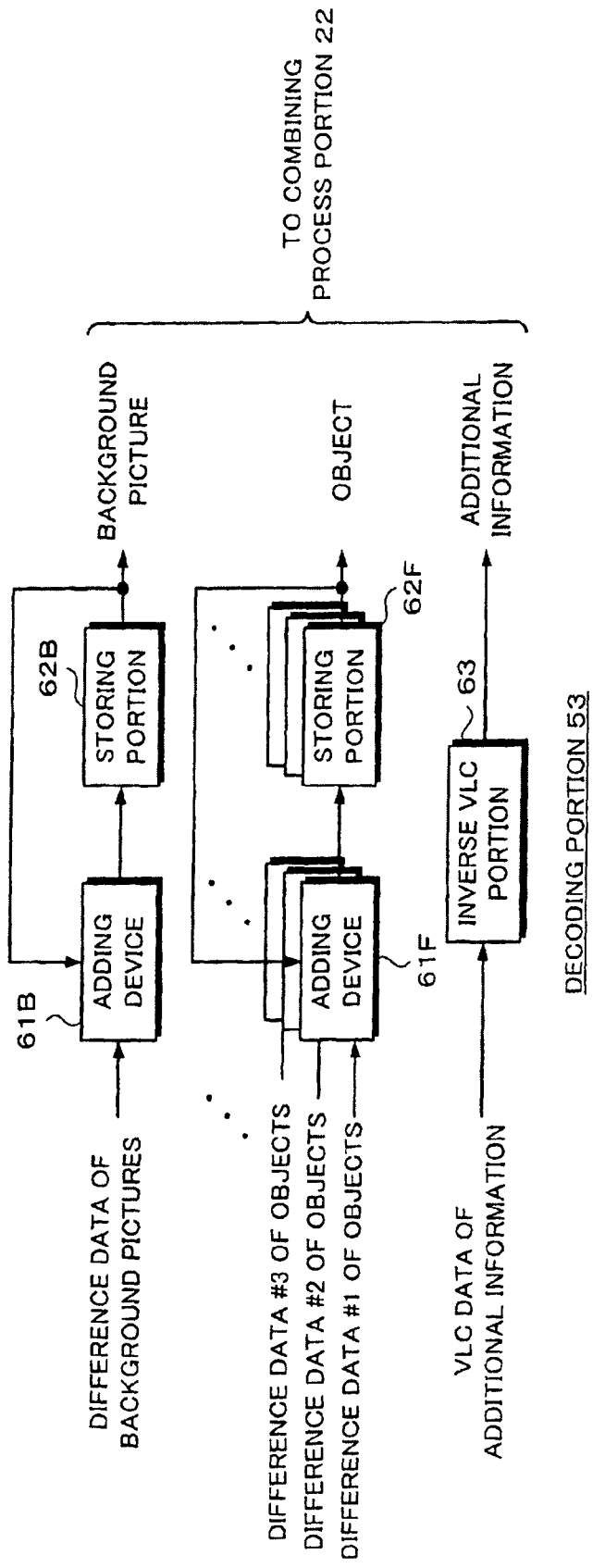
FIG. 12 is a block diagram showing an example of the structure of a decoding portion 53 shown in FIG. 11.

In other words, FIG. 12 shows an example of the structure of the decoding portion 53 shown in FIG. 11.

Hierarchically encoded difference data as encoded data of a background picture is supplied to an adding device 61B. In addition, a background picture of the immediately preceding frame that has been decoded and stored in a storing portion 62B is supplied to the adding device 61B. The adding device 61B adds the difference data of background pictures and the background picture of the immediately preceding frame received from the storing portion 62B so as to decode a background picture of a desired hierarchical level. The decoded background picture is supplied to the storing portion 62B. The storing portion 62B stores the background picture received from the adding device 61B. The decoded background picture is supplied to the adding device 61B and the combining process portion 22 (see FIG. 5).

Hierarchically encoded difference data as encoded data of an object is supplied to an adding device 61F. The adding device 61F and a storing portion 62F perform the similar processes to those of the adding device 61B and the storing portion 62B. Thus, in the same manner as the background picture, the difference data of objects is decoded to an object of a desired hierarchical level and then supplied to the combining process portion 22 (see FIG. 5). When there are a plurality of objects, the adding device 61F and the storing portion 62F decode (hierarchically decode) the difference data of the plurality of objects.

Additional information that has been encoded with variable length code as encoded data of additional information is supplied to an inverse VLC portion 63. The inverse VLC portion 63 decodes the additional information with variable length code. Thus, the original additional information is obtained and supplied to the combining process portion 22.

The local decoder 44B shown in FIG. 8 is structured as the adding device 61B and the storing portion 62B. Likewise, the local decoder 44F is structured as the adding device 61F and the storing portion 62F.

Figure 13:
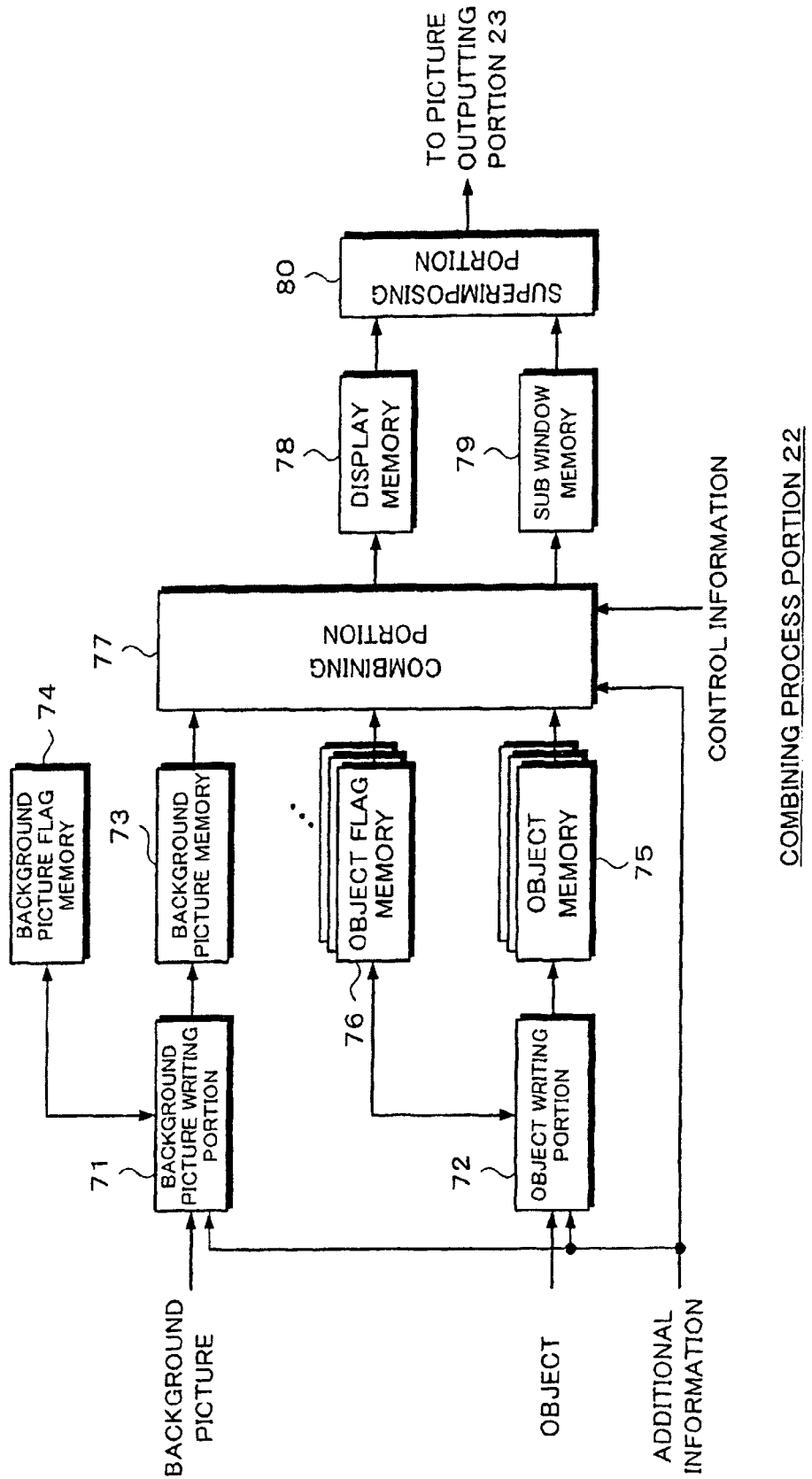
FIG. 13 is a block diagram showing an example of the structure of a combining process portion 22 shown in FIG. 5.

Next, FIG. 13 shows an example of the structure of the combining process portion 22 shown in FIG. 5.

A background picture that is output from the decoding portion 53 (see FIG. 1) is supplied to a background picture writing portion 71. An object that is output from the decoding portion 53 is supplied to an object writing portion 72. Additional information that is output from the decoding portion 53 is supplied to the background picture writing portion 71, the object writing portion 72, and a combining portion 77.

The background picture writing portion 71 successively writes background pictures to a background picture memory 73. When a picture is photographed while the video camera is panned or tilted, a background picture is moved. At that point, the background picture writing portion 71 aligns the background picture and then writes the aligned background picture to the background picture memory 73. Thus, the background picture memory 73 can store a picture that is spatially wider than a picture of one frame. The background picture is aligned corresponding to a background picture moving vector contained in the additional information.

When the background picture writing portion 71 writes a background picture with a high spatial resolution to the background picture memory 73, the background picture writing portion 71 changes the value of a background picture flag stored at an address of a background picture flag memory 74 corresponding to the pixel of the background picture from 0 to 1. When the background picture writing portion 71 writes a background picture to the background picture memory 73, the background picture writing portion 71 references the background picture flag memory 74. The background picture writing portion 71 does not write a background picture with a low spatial resolution to a pixel whose background picture flag is 1 that represents that the pixel storing a background picture with a high spatial resolution. Thus, basically, whenever a background picture is supplied to the background picture writing portion 71, it is written to the background picture memory 73. However, the background picture writing portion 71 does not write a background picture with a low spatial resolution to a pixel that stores a background picture with a high spatial resolution. As a result, whenever a background picture with a high spatial resolution is supplied to the background picture writing portion 71, the range of a high spatial resolution becomes wide in the background picture memory 73.

The object writing portion 72 successively writes supplied objects to an object memory 75. When there are a plurality of objects, the object writing portion 72 writes each object to the object memory 75. When the object writing portion 72 writes the same object (assigned the same label) to the object memory 75, the object writing portion 72 substitutes the old object with the new object (that is newly supplied to the object writing portion 72).

In addition, when the object writing portion 72 writes an object with a high spatial resolution to the object memory 75, the object writing portion 72 changes a background picture flag stored at an address of an object flag memory 76 corresponding to the pixel of the object from 0 to 1. When the object writing portion 72 writes an object to the object memory 75, the object writing portion 72 references the object flag memory 76. The object writing portion 72 does not write an object with a low spatial resolution to the object memory 75 that stores an object with a high spatial resolution (object flag=1). Thus, in the same manner as the background picture memory 73, whenever an object is supplied to the object writing portion 72, the object is written to the object writing portion 72. However, the object writing portion 72 does not write an object with a low spatial resolution to a pixel that stores an object with a high spatial resolution. As a result, whenever an object with a high spatial resolution is supplied to the object writing portion 72, the number of objects with a high spatial resolution increases in the object memory 75.

The background picture memory 73 stores a background picture supplied from the background picture writing portion 71. The background picture flag memory 74 stores the above-described one-bit background picture flag at an address of the background picture memory 73. The background picture flag memory 74 represents whether or not a background picture with a high spatial resolution has been stored at an address of the background picture memory 73. The object memory 75 is composed of at least one memory portion that stores each object supplied from the object writing portion 72. The object flag memory 76 stores the above-described one-bit object flag that represents whether or not an object with a high spatial resolution has been stored in the object memory 75.

In this case, for simplicity, the background picture flag and the object flag are one-bit flags. Alternatively, the background picture flag and the object flag may be multi-bit flags. In that case, the background picture flag and the object flag can represent resolutions in more levels. In other words, a one-bit flag represents only two levels that are a high resolution and a low resolution. However, a multi-bit flag represents resolutions in more levels.

The combining portion 77 reads a background picture of the current frame (this frame may be referred to as considered frame) stored in the background picture memory 73 corresponding to a background picture moving vector contained in the additional information. In addition, the combining portion 77 combines the background picture and an object stored in the object memory 75 corresponding to an object moving vector contained in the additional information. As a result, the combining portion 77 generates a picture of the considered frame and supplies the picture to a display memory 78.

In addition, when the combining portion 77 receives control information from the control information inputting portion 24 (see FIG. 5), the combining portion 77 reads an object at the considered point contained in the control information from the object memory 75 and supplies the object to a sub window memory 79.

The display memory 78 functions as a so-called VRAM (Video Read Only Memory). The display memory 78 temporarily stores the picture of the considered frame supplied from the combining portion 77.

The sub window memory 79 temporarily stores an object supplied from the combining portion 77.

A superimposing portion 80 reads the stored content of the display memory 78 and supplies the stored content to the picture outputting portion 23 (see FIG. 5). The picture outputting portion 23 displays the stored content. When necessary, the superimposing portion 80 opens a sub window (that will be described later) on the picture outputting portion 23, reads the stored content of the sub window memory 79, and displays the content on the sub window.

Figure 14:
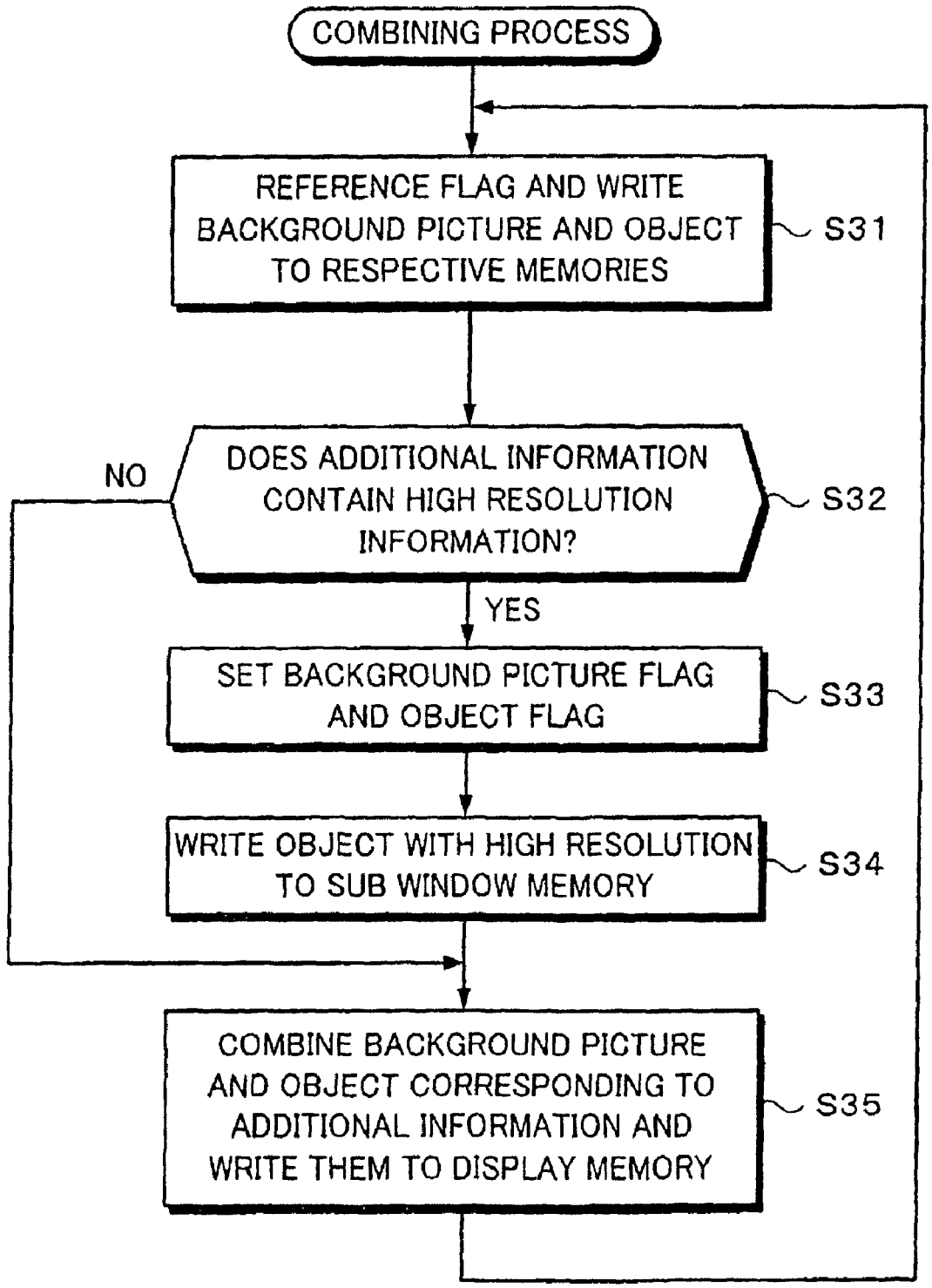
FIG. 14 is a flow chart for explaining a combining process of the combining process portion 22 shown in FIG. 13.

Next, with reference to FIG. 14, the process (combining process) performed by the combining process portion 22 shown in FIG. 13 will be described.

First of all, at step S31, the background picture writing portion 71 or the object writing portion 72 writes a background picture or an object that is supplied from the decoding portion 53 (see FIG. 12) to the relevant memory corresponding to the background picture flag stored in the background picture flag memory 74 or the object flag stored in the object flag memory 75, respectively, in the above-described manner.

In other words, the background picture writing portion 71 references the background picture flag memory 74 and writes the supplied background picture to an address of the background picture memory 73 when the background picture flag of a pixel corresponding to the address is 0. In contrast, if the spatial resolution of the supplied background picture is high, the background picture writing portion 71 writes the background picture to an address of the background picture memory 73 when the background picture flag of a pixel corresponding to the address is 1.

Likewise, when the object flag of the object memory 75 is 0, the object writing portion 72 writes the supplied object to the object memory 75. When the object flag of the object memory 75 is 1, if the spatial resolution of the supplied object is high, the object writing portion 72 writes the supplied object to the object memory 75.

When the background picture writing portion 71 writes a background picture to a particular address of the background picture memory 73, if the address has stored a background picture, the background picture writing portion 71 overwrites the background picture to the address. This operation applies to the object memory 75.

Thereafter, the flow advances to step S32. At step S32, the background picture writing portion 71 and the object writing portion 72 determine whether or not the additional information contains high resolution information. When the determined result at step S32 represents that the additional information contains the high resolution information (namely, the user has operated the control information inputting portion 24 (see FIG. 5), the resultant control information has been transmitted to the transmitting apparatus 1, and then the transmitting apparatus 1 has transmitted a background picture and an object with a high spatial resolution for a picture in the priority range), the flow advances to step 33. At step S33, the background picture writing portion 71 or the object writing portion 72 changes the background picture flag of the background picture flag memory 74 or the object flag of the object flag memory 76 to 1.

In other words, when the transmitting apparatus 1 transmits a background picture and an object with a high spatial resolution for a picture in the priority range, at step S31, the background picture writing portion 71 and the object writing portion 72 write the background picture and object with the high spatial resolution to the background picture memory 73 and the object memory 75, respectively. Thus, at step S33, the background picture flag and the object flag for a pixel that composes the background picture and the object with the high spatial resolution are changed to 1.

Thereafter, the flow advances to step S34. The combining portion 77 reads an object in the priority range from the object memory 75 and writes the object to the sub window memory 79.

In other words, when the determined result at step S32 represents that the additional information contains high resolution information, the user has operated the control information inputting portion 24 (see FIG. 5), the control information has been transmitted to the transmitting apparatus 1, and then the transmitting apparatus 1 has transmitted a background picture and an object with a high spatial resolution for a picture in the priority range. The control information that is transmitted to the transmitting apparatus 1 is also supplied to the combining portion 77. Thus, when the combining portion 77 receives the control information, at step S34, the combining portion 77 recognizes the priority range corresponding to the coordinates of the considered point contained in the control information, reads an object with a high spatial resolution in the priority range that has been transmitted from the transmitting apparatus 1 from the object memory 75, and writes the object to the sub window memory 79.

Thereafter, the flow advances to step S35. At step S35, the combining portion 77 reads a background picture of the current frame that is displayed (this frame is referred to as considered frame) from the background picture memory 73 corresponding to a background picture moving vector contained in the additional information. In addition, the combining portion 77 reads an object that is displayed on the considered frame from the object memory 75. The combining portion 77 combines the background picture of the considered frame and the object that is read from the object memory 75 corresponding to the object moving vector contained in the additional information and writes the combined picture of the considered frame to the display memory 78. In other words, the combining portion 77 writes a background picture to for example the display memory 78 and then overwrites an object to the display memory 78. As a result, the combining portion 77 writes a picture of which a background picture and an object are combined as a picture of the considered frame to the display memory 78.

In such a manner, a picture of the considered frame written to the display memory 78 and an object written to the sub window memory 79 are supplied to the picture outputting portion 23 (see FIG. 5). The picture outputting portion 23 displays the supplied picture and object.

In the transmitting apparatus 1, a so-called soft key may be contained in for example additional information. In this case, the combining portion 77 combines an object and a background picture using the soft key.

In contrast, when the determined result at step S32 represents that the additional information does not contain high resolution information (namely, the user has not operated the control information inputting portion 24 (see FIG. 5)), the flow advances to step S35, skipping steps 33 and 34. As was described above the combining portion 77 reads a background picture of the considered frame from the background picture memory 73. In addition, the combining portion 77 reads a required object from the object memory 75 and combines the background picture of the considered frame and the object that is read from the object memory 75 corresponding to the additional information. As a result, a picture of the considered frame is generated and written to the display memory 78. Thereafter, the flow returns to step S31. Thereafter, the combining process portion 22 repeats the similar process.

In the above-described combining process, when the user does not operate the control information inputting portion 24 (see FIG. 5) (namely, the control information inputting portion 24 that is composed of a pointing device such as a mouse is not dragged (or clicked)), as shown in FIG. 15 (A), a picture with a low spatial resolution is displayed with a default temporal resolution on the picture outputting portion 23 (see FIG. 5). In FIG. 15 (A), an object with a low spatial resolution is being moved on a background picture with a low spatial resolution.

When the user operates the control information inputting portion 24 (see FIG. 5), moves the cursor to an object, and drags the cursor at the position of the object, as was described above, control information is transmitted to the transmitting apparatus 1. The transmitting apparatus 1 transmits data necessary for displaying a picture with a high spatial resolution at the sacrifice of a temporal resolution for a picture in the priority range. As a result, as shown in FIG. 15 (B), although the temporal resolution is for example 0 frames/second, a picture of which the spatial resolution of an object and a background picture in the priority range around the dragged position is gradually improved is displayed on the picture outputting portion 23 (see FIG. 5). In other words, corresponding to the dragging time (or the number of clicks), the spatial resolution of a picture in the priority range is gradually improved.

In this case, on the picture outputting portion 23 (see FIG. 5), as shown in FIG. 15 (B), a sub window is opened. An object in the priority range around the dragged position is displayed in such a manner that the spatial resolution of the object is gradually improved.

Thereafter, when the user stops the dragging operation with the control information inputting portion 24 (see FIG. 5), as was described above, at step S35, the combining portion 77 reads a background picture of the considered frame from the background picture memory 73, reads an object from the object memory 75, combines the background picture of the considered frame and the object that is read from the object memory 75 corresponding to additional information, and writes the combined picture to the display memory 78. As was described above, since the object with a high spatial resolution as a result of the dragging operation is stored in the object memory 75, the picture outputting portion 23 (see FIG. 5) displays a picture of which an object with a high spatial resolution as a result of the dragging operation is pasted at a relevant position of the considered frame with a regular temporal resolution as shown in FIG. 15 (C).

Thereafter, the picture outputting portion 23 (see FIG. 5) displays a picture of which an object with a high spatial resolution is being moved corresponding to the additional information with a regular temporal resolution.

Thus, when the user performs the dragging operation at the position of an object that he or she wants to see in detail, he or she can see the object with a high spatial resolution. In other words, the user can see an object in detail.

When the user performs the dragging operation, a background picture with a high spatial resolution in the priority range is stored to the background picture memory 73. Thus, even if the user stops the dragging operation, the background picture with the high spatial resolution stored in the background picture memory 73 is displayed. Thus, when the user performs the dragging operation, since the spatial resolution of a background picture in the priority range including the dragged position is improved, whenever the user performs the dragging operation at each position on the display screen of the picture outputting portion 23 (see FIG. 5) a background picture with a high spatial resolution gradually widens in a mosaic pattern. Finally, the picture outputting portion 23 displays all the background picture with a high spatial resolution.

In addition, according to the embodiment, as was described above, since a background picture is stored in the background picture memory 73, the transmitting apparatus 1 does not need to transmit a background picture with a low spatial resolution that has been already transmitted. Thus, the transmission band (transmission rate) for the background picture can be assigned to an object and a background with a higher spatial resolution.

In the above-described case, an object with a high spatial resolution as a result of the dragging operation is stored to the object memory 75. After the dragging operation is stopped, the object with the high spatial resolution is pasted to a background picture. Thus, the spatial resolution of an object displayed by the receiving apparatus 2 becomes high. However, the state of an object photographed by the transmitting apparatus 1 is not affected to an object displayed by the receiving apparatus 2.

To solve such a problem, after the dragging operation is stopped, an object with a high spatial resolution stored in the object memory 75 can be substituted with an object stored in the storing portion 62F of the decoding portion 53 (see FIG. 12), ignoring the object flag. In other words, objects that are transmitted from the transmitting apparatus 1 are successively stored to the storing portion 62F of the decoding portion 53 (see FIG. 12). Thus, when the objects are written to the object memory 75, the objects of a picture displayed on the picture outputting portion 23 are affected by the state of the objects photographed by the transmitting apparatus 1 (however, the spatial resolution of the objects displayed is low).

The MUX 32 shown in FIG. 7 that composes the transmitting process portion 16 of the transmitting apparatus 1 places the presence/absence of high resolution information, a frame rate (temporal resolution) and a spatial resolution in a priority range corresponding to the high resolution information, and a frame rate and a spatial resolution in the non-priority range to a header or the like of multiplexed data under the control of the controlling portion 35. The receiving apparatus 2 recognizes the presence/absence of the high resolution information, the frame rate and spatial resolution in the priority range, and the frame rate and spatial resolution in the non-priority range corresponding to information placed in the header (hereinafter, this information is referred to as header information).

In the transmitting apparatus 1, the header information may contain for example (the coordinates) of a considered point contained in control information transmitted from the receiving apparatus 2. In this case, the combining portion 77 shown in FIG. 13 can recognize an object at the position of a considered point corresponding to the header information transmitted from the transmitting apparatus 1. In other words, in the above-described case, the combining portion 77 recognizes an object at the position of a considered point contained in the control information corresponding to the control information supplied from the control information inputting portion 24 (see FIG. 5), reads the object from the object memory 75, and supplies the object to the sub window memory 79. However, when the header information contains a considered point, the combining portion 77 recognizes an object at the position of the considered point corresponding to the header information. In this case, in FIG. 5, the control information inputting portion 24 does not need to supply the control information to the receiving apparatus 2.

Next, with reference to FIG. 16, the relation between a spatial resolution and a temporal resolution of a picture transmitted from the transmitting apparatus 1 to the receiving apparatus 2 through the transmission path 3 will be described.

Now, it is assumed that the transmission rate of the transmission path 3 is R [bps] and that a picture composed of a background picture and three objects #1 to #3 is transmitted. For simplicity, in this example, additional information is not considered. In addition, it is assumed that to display the background picture and the objects #1 to #3 with a particular spatial resolution, each of them requires the same data amount.

In this case, when the user does not perform the dragging operation, in the transmitting apparatus 1, as shown in FIG. 16 (A), each of the background picture and the objects #1 to #3 is transmitted at R/4 [bps] of which the transmission rate R is divided by 4. When the regular temporal resolution is 1/T frames/second, the transmitting apparatus 1 can transmit data of one frame of each of the background picture and the objects #1 to #3 in at most T seconds. Thus, in this case, the receiving apparatus 2 displays the background picture and the objects #1 to #3 with a spatial resolution obtained with data of T×R/4 bits per frame.

When the user perform the dragging operation at the position of for example the object #1, as shown in FIG. 16 (A), the transmitting apparatus 1 stops transmitting the background picture and the objects #2 and #3 and transmits only the object #1 at all the transmission rate R of the transmission path 3. Thereafter, at time t2 of which time period 4T has elapsed from time t1, when the user stops the dragging operation, the transmitting apparatus 1 transmits the background picture and the objects #1 to #3 at the transmission rate R/4 each.

Thus, while the user is performing the dragging operation, the transmitting apparatus 1 transmits data of 4T×R bits for the object #1. Thus, assuming that while the user is performing the dragging operation, the temporal resolution is 0 frames/second, the receiving apparatus 2 displays the object #1 with a spatial resolution obtained with data of 4T×R bits per frame. In other words, when the horizontal spatial resolution and the vertical spatial resolution are improved for the same amount, in the receiving apparatus 2, although the temporal resolution becomes 0 frames/second, the receiving apparatus 2 displays the object #1 with a spatial resolution in each of the horizontal direction and the vertical direction that is four times (=(4T×R/(T×R/4 bits)) higher than that in the case that the user does not perform the dragging operation.

In other words, the spatial resolution can be more improved at the sacrifice of the temporal resolution. In addition, in comparison with the case that the temporal resolution is sacrificed, the spatial resolution of a portion that the user is considering can be quickly improved.

In the above-described case, while the user performing the dragging operation for the object #1, all data of the background picture and the other objects #2 and #3 is not transmitted. However, as shown in FIG. 16 (B), a higher transmission rate can be assigned to the data of the object #1, while a low transmission rate can be assigned to data of the background picture and the other objects #2 and #3.

Alternatively, even if the dragging operation is performed, the transmission rate assigned to each of the background picture and the objects #1 to #3 may not be changed from R/4. In other words, in this case, since the spatial resolution is improved at the sacrifice of the temporal resolution, for example, although it takes a long time to display the data, the spatial resolution can be improved without need to change the assignment of the transmission rate.

According to the embodiment, as was described above, an object with a high spatial resolution as a result of the dragging operation is stored to the object memory 75. After the dragging operation is stopped, the object with the high spatial resolution is pasted on a background picture. However, the position of the background picture to which the object with the high spatial resolution is pasted depends on an object moving vector contained in the additional information about the object that is transmitted from the transmitting apparatus 1.

Thus, the receiving apparatus 2 should recognize what object of a particular frame corresponds to what object of an adjacent frame. Thus, when the object extracting portion 14 of the transmitting apparatus 1 (see FIG. 3) extracts an object, the object extracting portion 14 adds information that allows the receiving apparatus 2 to perform such an recognizing operation to the additional information.

Figure 17:
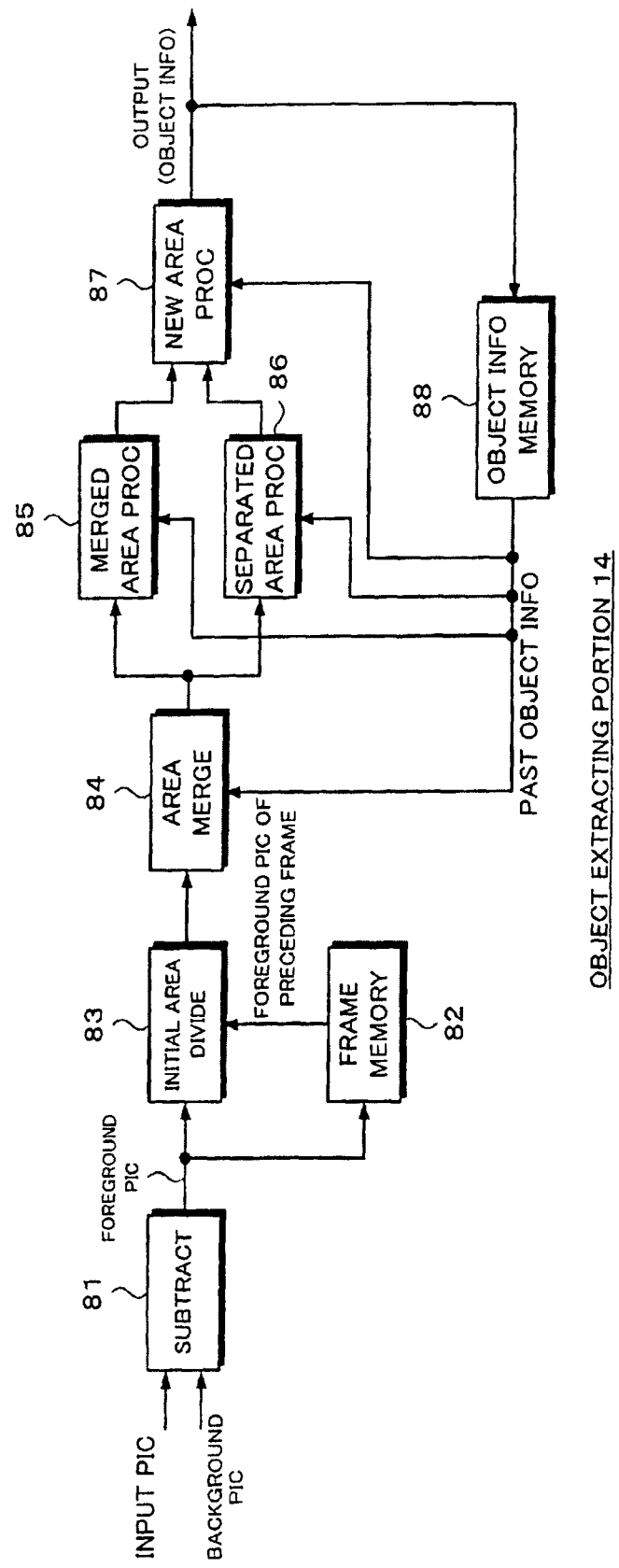
FIG. 17 is a block diagram showing an example of the structure of an object extracting portion 14 shown in FIG. 3.

FIG. 17 shows an example of the structure of the object extracting portion 14 shown in FIG. 3.

A picture that is output from the picture inputting portion 11 and a background picture that is output from the background picture extracting portion 13 are supplied to a subtracting portion 81. The subtracting portion 18 subtracts the background picture that is output from the background picture extracting portion 13 from the picture that is output from the picture inputting portion 11 and obtains a foreground picture as an object. The foreground picture obtained by the subtracting portion 81 is supplied to a frame memory 82 and an initial area dividing portion 83.

The frame memory 82 temporarily stores the foreground picture supplied from the subtracting portion 81. The initial area dividing portion 83 performs an initial area dividing process using the foreground picture of the current frame that is processed (this frame is referred to as considered frame) that is supplied from the subtracting portion 81 and the foreground picture of the immediately preceding frame stored in the frame memory 82 (this foreground picture is referred to as foreground picture of the preceding frames).

In other words, the initial area dividing portion 83 categorizes each pixel that composes the foreground picture of the considered frame as a class corresponding to the pixel value. In reality, when a pixel value is represented by RGB (Red, Green, and Blue), the initial area dividing portion 83 categorizes each pixel as a class depending on the relation between a vector composed of elements of R, G, and B values (this vector may be referred to as color vector) and a plurality of small areas in the RGB space. In addition, the initial area dividing portion 83 categorizes each pixel that composes the foreground picture of the immediately preceding frame stored in the frame memory 82 as a class in the same manner.

When the considered frame is for example the n-th frame, the initial area dividing portion 83 divides the foreground picture of the n-th frame and the foreground picture of the (n−1)-th frame the immediately preceding frame into areas that are temporally or spatially adjacent areas and that are composed of pixels categorized as the same class.

Figures 18A, 18B:
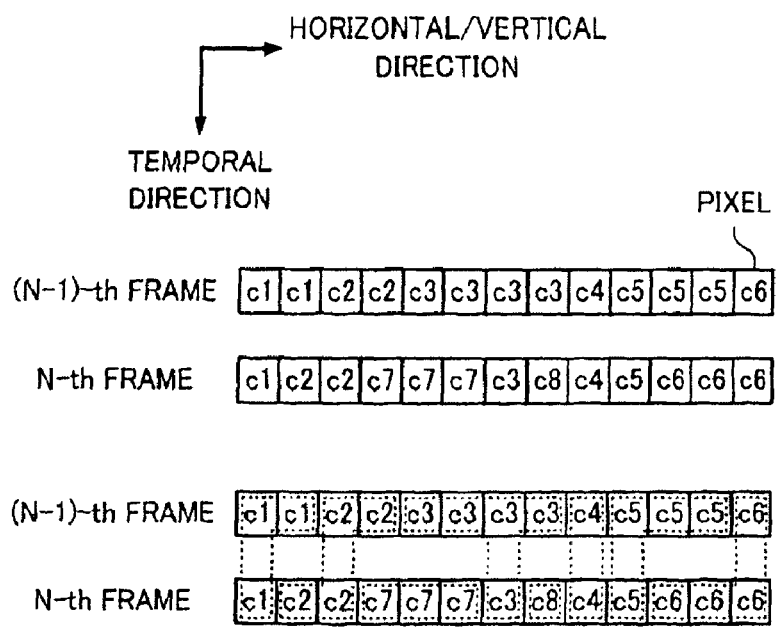
FIG. 18 is a schematic diagram for explaining the process of an initial area dividing portion 83 shown in FIG. 17.

In other words, for example, it is assumed that each pixel that composes the foreground picture of the n-th frame and each pixel that composes the foreground picture of the (n−1)-th frame are categorized as classes as shown in FIG. 18(A). In FIG. 18 (also in FIGS. 19 and 20), a set of a character c and a numeral contained, in a square represents the class of a pixel.

In the case shown in FIG. 18(A), when the foreground picture of the n-th frame and the foreground picture of the (n−1)-th frame are divided into areas composed of pixels categorized as the same class, initial areas as denoted by dotted lines shown in FIG. 18(B) are formed.

The initial areas obtained by the initial area dividing portion 83 are supplied to an area merging portion 84 shown in FIG. 17.

The area merging portion 84 performs an area margining process for margining the initial areas supplied form the initial area dividing portion 83.

In other words, the area merging portion 84 reads object information about an object contained in the (n−1)-th frame from an object information memory 88 and recognizes the position and the range of the object contained in the (n−1)-th frame. In addition, the area merging portion 84 recognizes pixels that compose the object contained in the (n−1)-th frame and merges the initial areas that contain the pixels.

In reality, for example, assuming that a particular object Obj is contained in a range denoted by solid lines (a box) shown in FIG. 19 (A), the object Obj is composed of pixels categorized as classes c2, c3, c4, and c5. The initial areas containing these pixels are merged. Thus, in this example, initial areas composed of pixels of the classes c2, c3, c4, and c5 (hereinafter, the initial areas composed of pixels of the classes c#i are referred to as initial areas c#i) are merged as hatched areas shown in FIG. 19 (B).

In addition, the area merging portion 84 calculates the distance between the merged initial area (hereinafter may be referred to as merged area) and an initial area adjacent to the merged area. In this example, the distance between a merged area and an initial area adjacent thereto (hereinafter may be referred to as adjacent initial area) may be the distance of the average values of the pixel values (colors) of the pixels that compose two areas (the merged area and the adjacent initial area) (this distance may be referred to as distance in the RGB space) or the continuity of pixel values (colors) of pixels in the vicinity of the boundary of the two areas.

When the distance between the merged area and the adjacent initial area is smaller than (or equal to) a predetermined threshold value, the area merging portion 84 merges the merged area and the adjacent initial area and generates a new merged area. The area merging portion 84 calculates the above-described distance until there is no adjacent initial area that can be merged to the merged area and repeatedly merges the adjacent initial area and the merged area.

Thus, with the merged area shown in FIG. 19 (B), for example a merged area shown in FIG. 19 (C) is formed. In FIG. 19 (C), since the distance between the initial areas c7 and c8 is close, they are merged to the merged area shown in FIG. 19 (B). In contrast, since the distance between the initial areas c1 and c6 is far, they are not merged to the merged area.

When there is no adjacent initial area that can be merged to the merged area as shown in FIG. 19 (C), the area merging portion 84 extracts a portion composed of pixels that compose the foreground picture of the n-th frame as an object corresponding to the object Obj of the (n−1)-th frame (this object may be referred to as corresponding object), assigns the same label as the label of the object Obj of the (n−1)-th frame, and outputs the object to the merged area process portion 85 and the separated area process portion 86.

In other words, according to the embodiment, objects that correspond in individual frames are assigned the same label. The receiving apparatus 2 recognizes what object of a particular frame corresponds to what object of the adjacent frame corresponding to the label.

The label assigned to the object Obj of the (n−1)-th frame is contained in the object information and stored in the object information memory 88. With reference to the object information memory 88, the area merging portion 84 recognizes the label assigned to the object Obj of the (n−1)-th frame.

In addition, after the area merging portion 84 extracts objects of the n-th frame corresponding to all objects of the (n−1)-th frame in the above-described manner, the area merging portion 84 extracts an area of which each initial area of the n-th frame and another initial area adjacent thereto are merged as an object and assigns a new label (other than any label assigned to objects of the (n−1)-th frame) to the extracted object and outputs the extracted object to the merged area process portion 85 and the separated area process portion 86.

The merged area process portion 85 and the separated area process portion 86 perform a merged area process and a separated area process, respectively. The merged area process is performed when objects are merged. The separated area process is performed when a merged object is separated.

In other words, for example, considering three successive frames of the (n−1)-th frame, the n-th frame, and the (n+1)-th frame, as shown in FIG. 20, in the (n−1)-th frame, objects A and B approach each other. In the n-th frame, the objects A and B overlap. In other words, in the n-th frame, the objects A and B may be merged as one object. In this case, the objects A and B that have been merged as one object continue to move in their directions. In the (n+1)-th frame, the merged object is separated into the two objects A and B.

In this case, in the area merging process of the area merging portion 84, the merged object of the n-th frame corresponds to both the objects A and B in the (n−1)-th frame. In contrast, the objects A and B separated in the (n+1)-th frame correspond to one merged object in the n-th frame. According to the embodiment, it is assumed that one object of a particular frame corresponds to one object of the immediately preceding frame. Thus, as was described above, it is not preferred to correlate two objects with one object. In contrast, it is not preferred to correlate one object with two objects.

Thus, the merged area process portion 85 performs a merged area process for correlating one merged object of the n-th frame with one of the objects A and B of the (n−1)-th frame. The separated area process portion 86 performs a separated area process for correlating one of two objects A and B of the (n+1)-th frame with one merged object of the n-th frame.

In other words, the merged area process portion 85 assigns the same label as one of the objects A and B of the (n+1)-th frame to one merged object of the n-th frame. On the other hand, the separated area process portion 86 assigns the same label as the label of the merged object of the n-th frame to one of the two separated objects A and B of the (n+1)-th frame and assigns a new label to the other separated object of the (n+1)-th frame.

The object extracted result as the result of the merged area process performed by the merged area process portion 85 and the object extracted result as the result of the separated area process performed by the separated area process portion 86 are merged by the area merging portion 84 and supplied to a new area process portion 87.

When the object extracted results of the merged area process portion 85 and the separated area process portion 86 contain a new object, the new area process portion 87 performs a new area process for the new object.

There are three types of objects that are assigned new labels in the object extracted results of the merged area process portion 85 and the separated area process portion 86. The first type is an object of which since the motion of an object is fast and the object does not spatially overlap in the considered frame and the immediately preceding frame, the area merging portion 84 does not extract the object of the considered frame as the corresponding object of the immediately preceding frame. The second type is an object of which since the corresponding object of the immediately preceding frame is merged with another object, the separated area process portion 86 cannot correlate the object of the considered frame with the corresponding frame of the immediately preceding frame. The third type is an object of which since a new object takes place in the considered frame, a new label is assigned thereto.

Among those three types of objects, a new label should be assigned to an object of the third type. Thus, for objects of the first and second types, the new area process portion 87 detects a corresponding object from the immediately preceding frame and re-assigns the same label as the object of the considered frame to the corresponding object of the immediately preceding frame.

In reality, the new area process portion 87 references the object information memory 88, recognizes objects of several past frames of the considered frame, and obtains the distance between each of the recognized objects and the considered object of the considered frame, the considered object being assigned a new label. As the distance between objects, the distance between feature amounts of the objects can be used. Examples of a feature amount of an object are an area of the object, a histogram in the tangent direction of the contour line composed of each pixel of the object (for example, a histogram in each of eight directions of up, down, left, right, upper left; lower left, upper right, and lower right), and a moving vector of the object.

The new area process portion 87 obtains the minimum value of the distances between the recognized objects and the considered object. When the minimum value is smaller than (or equal to) a predetermined threshold value, the new area process portion 87 treats an object with the minimum distance to the considered object as an object corresponding to the considered object, assigns the same label as the label of the obtained object to the considered object, and outputs the considered object. When the minimum value of the distances between the recognized objects and the considered object is not smaller than the predetermined threshold value (namely, there is no object whose distance to the considered object is small in the past frames), the new area process portion 87 treats the considered object as an object that newly takes place in the considered frame, assigns a new label to the considered object, and outputs the considered object.

An output of the new area process portion 87 is supplied to the additional information calculating portion 15 (see FIG. 3) and the transmitting process portion 16 (see FIG. 3). In addition, the output of the new area process portion 87 is supplied to the object information memory 88. The object information memory 88 temporarily stores an object (the position and size (contour) of the object pixel values of pixels that compose the object, and so forth) and a label assigned thereto as object information.

Figure 21:
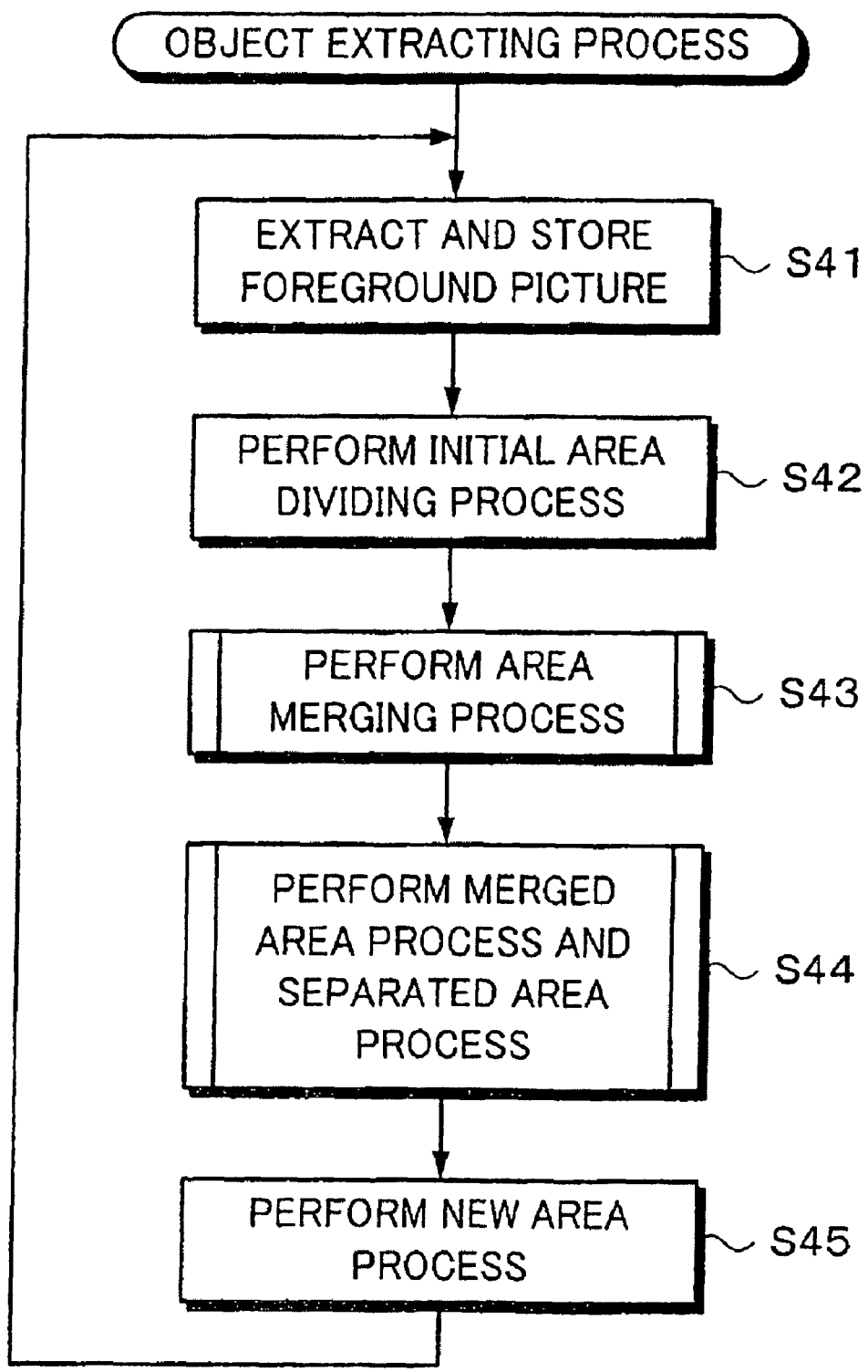
FIG. 21 is a flow chart for explaining the object extracting process of the object extracting portion 14 shown in FIG. 17.

Next, with reference to a flow chart shown in FIG. 21, the object extracting process for extracting an object from a picture will be described. The object extracting process is performed by the object extracting portion 14 shown in FIG. 17.

A picture that is output by the picture inputting portion 11 and a background picture that is output by the background picture extracting portion 13 are supplied to the subtracting portion 81. At step S41, the subtracting portion 81 subtracts the background picture that is output from the background picture extracting portion 13 from the picture that is output from the picture inputting portion 11 and obtains a foreground picture as an object. The foreground picture obtained by the subtracting portion 81 is supplied to the frame memory 82 and the initial area dividing portion 83. The frame memory 82 stores the foreground picture that is output from the subtracting portion 81.

On the other hand, at step S42, the initial area dividing portion 83 references a foreground picture of the immediately preceding frame of the considered frame, performs the initial area dividing process described with reference to FIG. 18, obtains initial areas, and supplies the obtained initial areas to the area merging portion 84. At step S43, the area merging portion 84 references object information of the immediately preceding frame stored in the object information memory 88, performs the area merging process as described with reference to FIG. 19 for the initial areas that are output from the initial area dividing portion 83, and extracts an object of the considered frame.

The object extracted by the area merging portion 84 is supplied to the merged area process portion 85 and the separated area process portion 86. At step S44, the merged area process portion 85 or the separated area process portion 86 performs the merged area process or the separated area process as described with reference to FIG. 20 and outputs the processed result to the new area process portion 87.

At step S45, the new area process portion 87 performs the above-described new area process for the outputs of the merged area process portion 85 and the separated area process portion 86. Thus, the new area process portion 87 outputs the final object extracted result of the considered frame. The extracted result of the object is supplied to the additional information calculating portion 15 (see FIG. 3) and the transmitting process portion 16 (see FIG. 3). In addition, the extracted result of the object is supplied to the object information memory 88 and stored therein.

Thereafter, the flow returns to step S20. At the step, the next frame is designated as a new considered frame. Thereafter, the object extracting portion 14 repeats the similar process.

Figure 22:
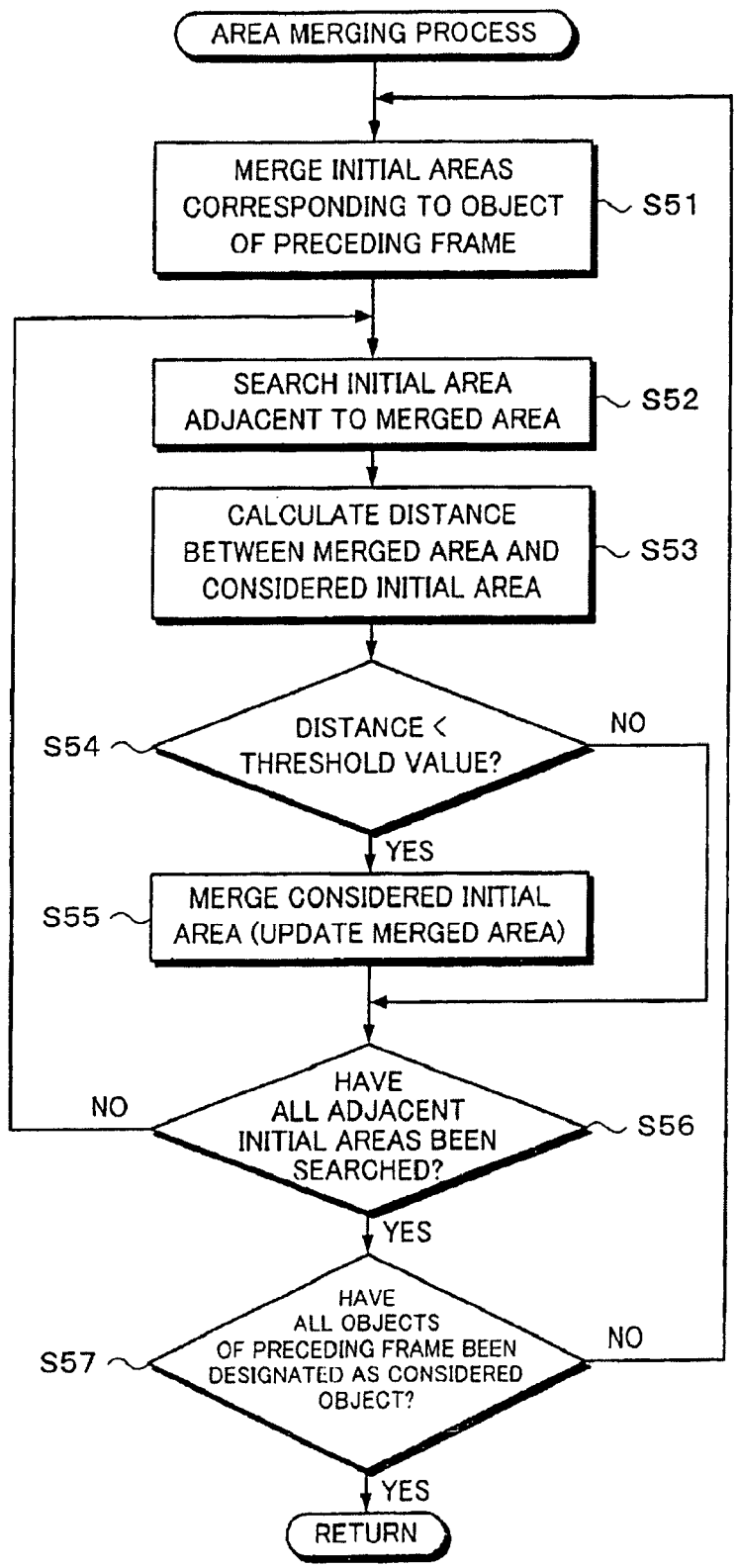
FIG. 22 is a flow chart for explaining the detail of the area merging process at step S43 shown in FIG. 21.

Next, with reference to a flow chart shown in FIG. 22, the area merging process performed by the area merging portion 84 at step S43 of FIG. 21 will be described in detail.

Figure 19A:
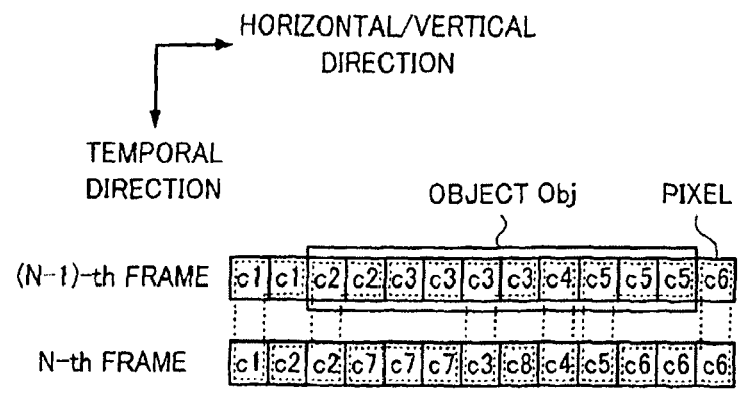
FIG. 19 is a schematic diagram for explaining the process of an area merging portion 84 shown in FIG. 17.
Figure 19B:
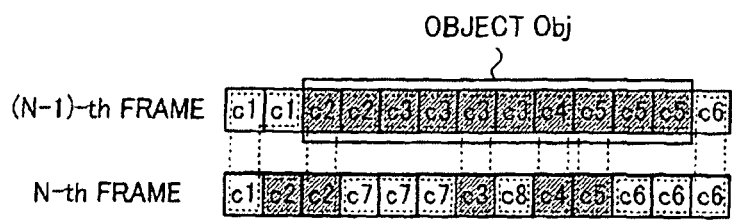
Figure 19C:
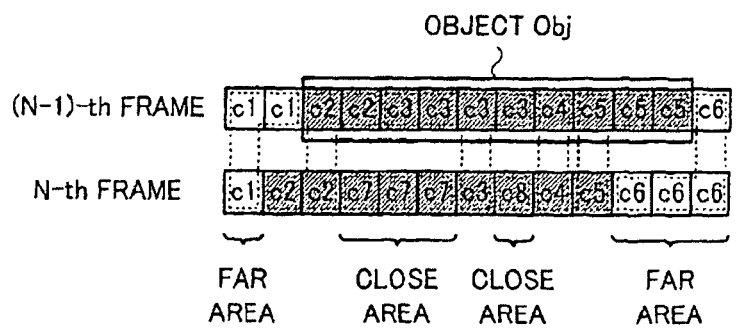
Figure 19D:
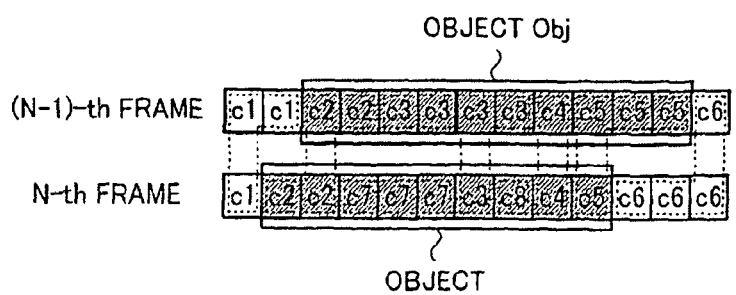

In the area margining process, first of all, at step S51, the area merging portion 84 references object information about an object contained in the immediately preceding frame (preceding frame) of the considered frame and treats the object of the preceding frame as a considered object. At step S51, using the considered object, as shown in FIG. 19(B), the area merging portion 84 merges initial areas that are output from the initial area dividing portion 83 and forms a merged area.

Thereafter, the flow advances to step S52. At step S52, the area merging portion 84 searches an initial area adjacent to the merged area (this initial area may be referred to as adjacent initial area). Thereafter, the flow advances to step S53. At step S53, the area merging portion 84 calculates the distance between the merged area and the considered initial area. Thereafter, the flow advances to step S54. At step S54, the area merging portion 84 determines whether or not the distance between the areas is smaller than a predetermined threshold value.

When the determined result at step S54 represents that the distance between the merged area and the considered initial area is smaller than the predetermined threshold value, the flow advances to step S55. At step S55, the area merging portion 84 merges the considered initial area to the merged area and thereby forms a new merged area. Thereafter, the flow advances to step S56.

In contrast, when the determined result at step S54 represents that the distance between the merged area and the considered initial area is not smaller than the predetermined threshold value, the flow advances to step S56, skipping step S55. In other words, the area merging portion 84 does not merge the considered initial area to the merged area. At step S56, the area merging portion 84 determines whether or not all initial areas adjacent to the merged area have been searched. When the determined result at step S56 represents that all the initial areas adjacent to the merged area have not been searched, the flow returns to step S52. At step S52, the area merging portion 84 searches an adjacent initial area that has not been searched. Thereafter, the area merging portion 84 repeats the similar process.

When the determined result at step S56 represents that all initial areas adjacent to the merged area have been searched, the flow advances to step S57. At step S57, the area merging portion 84 determines whether or not each of all objects contained in the preceding frame has been designated as the considered object. When the determined result at step S57 represents that each of all objects contained in the preceding frame has not been designated as the considered object, the flow returns to step S51. At step S51, the area merging portion 84 designates one of objects that are contained in the preceding frame as the considered object and repeats the similar process for the newly considered object.

In contrast, when the determined result at step S57 represents that each of all the objects contained in the preceding frame has been designated as the considered object, the flow returns to the called process.

Figure 23:
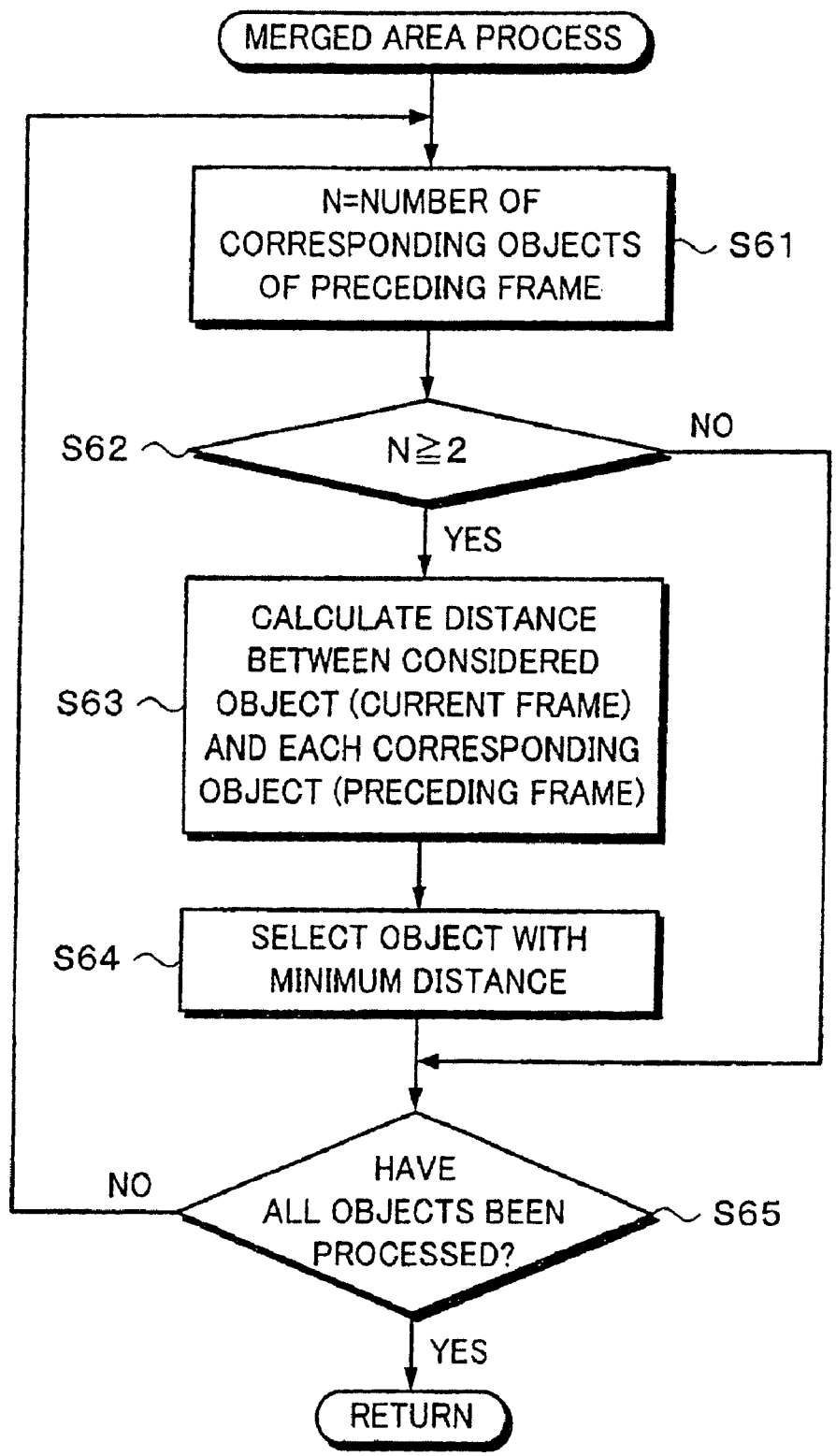
FIG. 23 is a flow chart for explaining the detail of the merged area process at step S44 shown in FIG. 21.

Next, with reference to a flow chart shown in FIG. 23, the merged area process performed by the merged area process portion 85 at step S44 shown in FIG. 21 will be described in detail.

First of all, at step S61, the merged area process portion 85 designates a frame that is processed as a considered frame, references the object information memory 88, recognizes the number of objects contained in the immediately preceding frame (preceding frame) (namely, the number of objects of the preceding frame of the considered frame) in the condition that the objects of the preceding frame spatially overlap with the considered object of the considered frame, and sets the number of objects to a variable N.

Thereafter, the flow advances to step S62. At step S62, the merged area process portion 85 determines whether or not the variable N is 2 or larger. When the variable N is smaller than 2 (namely, no object that spatially overlaps with the considered object is contained in the preceding frame or the number of the objects is one), the flow advances to step S65, skipping steps S63 and S64.

In contrast, when the determined result at step S62 represents that the variable N is 2 or larger (namely, two or more objects that spatially overlap with the considered object are contained in the preceding frame), the flow advances to step S63. At step S63, the merged area process portion 85 calculates the distance between the considered object and each of two or more objects of the preceding frame that spatially overlap with the considered object. Thereafter, the flow advances to step S64.

At step S64, the merged area process portion 85 selects an object with the minimum distance to the considered object from the objects obtained at step S63 and assigns the same label as the label of the selected object to the considered object.

Thereafter, the flow advances to step S65. At step S65, the merged area process portion 85 determines whether or not each of all objects contained in the considered frame has been designated as the considered object. When the determined result at step S65 represents that each of all objects contained in the considered frame has not been designated as the considered object, the merged area process portion 85 designates one of those objects as the considered object. Thereafter, the flow returns to step S61. At step S61, the merged area process portion 85 repeats the similar process.

On the other hand, when the determined result at step S65 represents that each of all the objects contained in the considered frame has been designated as the considered object, the flow returns to the called process.

Figure 24:
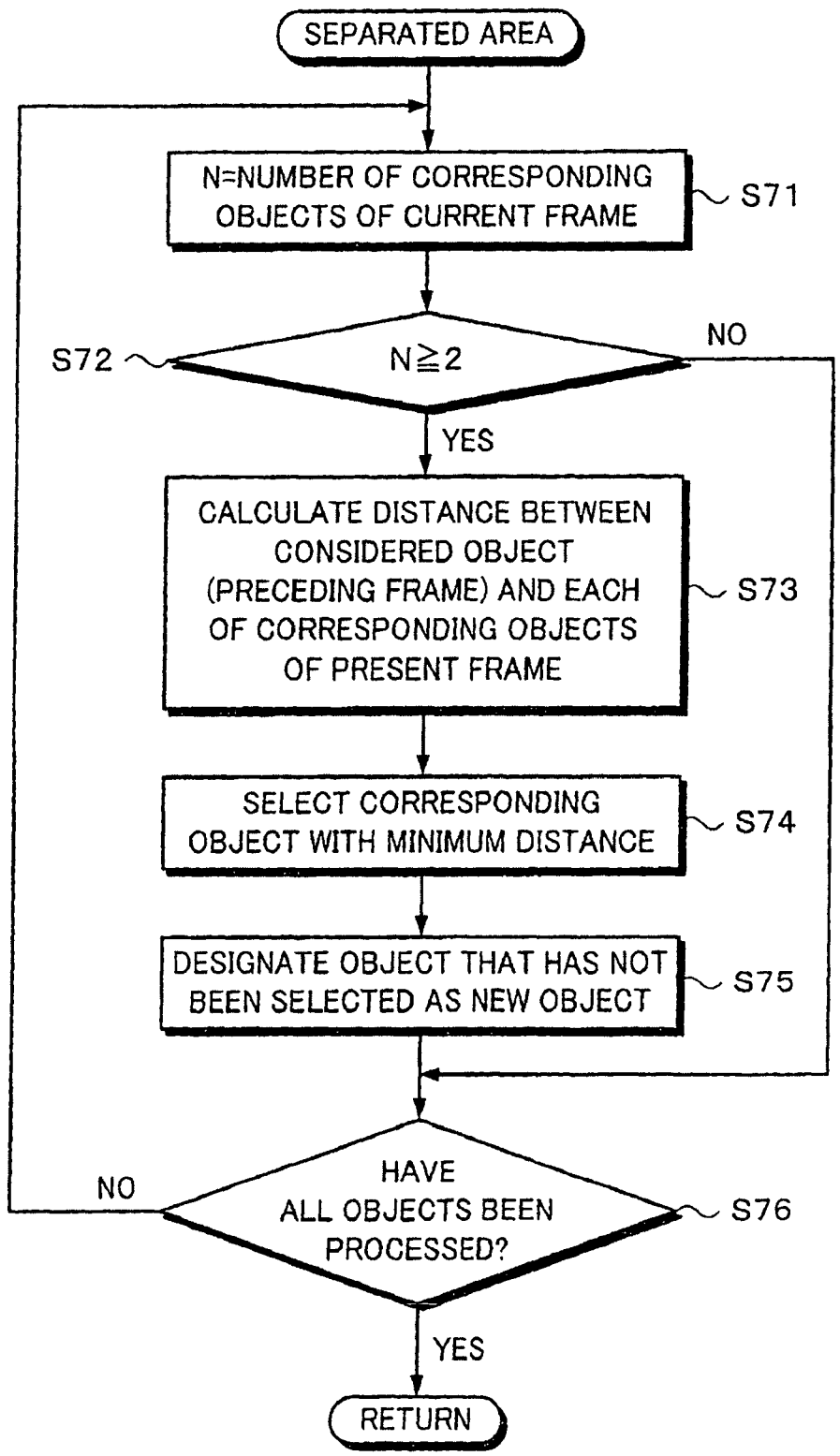
FIG. 24 is a flow chart for explaining the detail of the separated area process at step S44 shown in FIG. 21.

Next, with reference to a flow chart shown in FIG. 24, the separated area process performed by the separated area process portion 86 at step S44 shown in FIG. 21 will be described in detail.

The separated area process portion 86 references the object information memory 88 and designates one of objects contained in the immediately preceding frame (preceding frame) of the considered frame as a considered object. In addition, at step S71, the separated area process portion 86 recognizes the number of objects of the considered frame corresponding to the considered object (the recognized objects are referred to as corresponding objects) and sets the number of objects to the variable N.

Thereafter, the flow advances to step S72. At step S72, the separated area process portion 86 determines whether or not the variable N is 2 or larger.

When the determined result at step S72 represents that the variable N is not larger than 2 (namely, no object that spatially overlaps with the considered object is contained in the considered frame or the number of objects is one), the flow advances to step S76, skipping steps S73 to S75.

In contrast, when the determined result at step S72 represents that the variable N is 2 or larger (namely, two or more objects that spatially overlap with the considered object are contained in the considered frame (objects corresponding to the considered object), the flow advances to step S73. At step S73, the separated area process portion 86 calculates the distance between each of those objects and the considered object. Thereafter, the flow advances to step S74.

At step S74, the separated area process portion 86 selects an object with the minimum distance to the considered object from those objects and assigns the same label as the label of the selected object to the considered object.

Thereafter, the flow advances to step S75. At step S75, the separated area process portion 86 assigns a new label to one of the objects that are not selected at step S74 (namely, objects except for an object with the minimum distance to the considered object). Thereafter, the flow advances to step S76.

At step S76, the separated area process portion 86 determines whether or not each of all objects contained in the preceding frame has been designated as the considered object. When the determined result at step S76 represents that each of all the objects contained in the preceding frame has not been designated as the considered object, the separated area process portion 86 designates one of those objects as the considered object. Thereafter, the flow returns to step S71. At step S71, the separated area process portion 86 repeats the similar process.

When the determined result at step S76 represents that each of all the objects contained in the preceding frame has been designated as the considered object, the flow returns to the called process.

In the above-described case, when the user designates a considered point with the control information inputting portion 24, the transmitting apparatus 1 controls the transmission of data so that the spatial resolution of a picture in a priority range containing the considered point is improved at the sacrifice of the spatial resolution of the picture. Alternatively, the transmitting apparatus 1 may learn a preference of the user, detect an object or the like that the user tends to see with a high spatial resolution corresponding to the learnt result, and control the transmission of data so that the object is displayed with a high spatial resolution.

Figure 25:
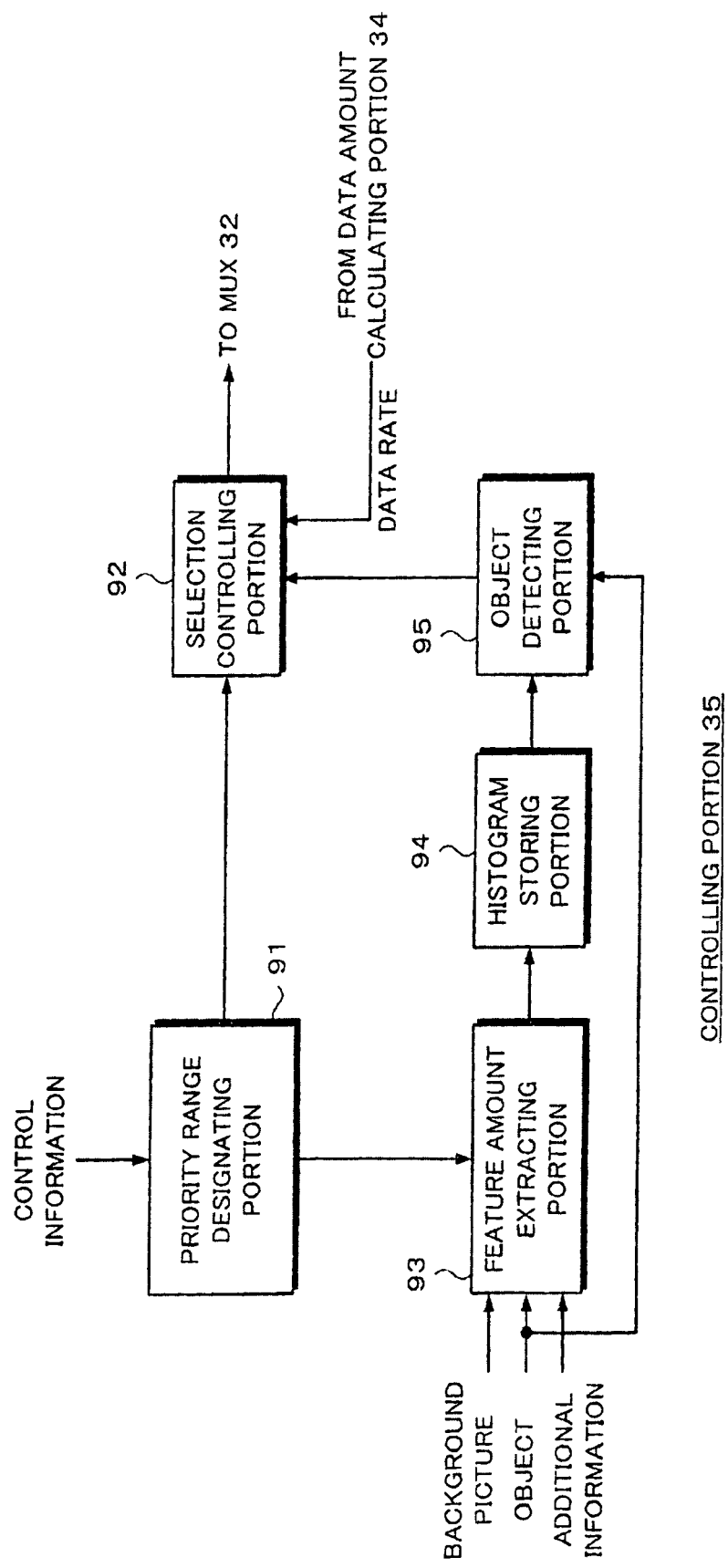
FIG. 25 is a block diagram showing an example of the structure of a controlling portion 35 shown in FIG. 7.

FIG. 25 shows an example of the structure of the controlling portion 35 shown in FIG. 7 in the case that the transmitting apparatus 1 performs such a transmission control.

A priority range designating portion 91 receives a control signal transmitted from the receiving apparatus 2, designates a priority range in the above-described manner, and supplies the designated priority range to a selection controlling portion 92 and a feature amount extracting portion 93.

The selection controlling portion 92 controls the selection of data of a background picture an object, and additional information of the MUX 32 (see FIG. 7). In other words, when the selection controlling portion 92 receives the priority range from the priority range designating portion 91, the selection controlling portion 92 controls the MUX 32 (see FIG. 7) to improve the spatial resolution of the picture in the priority range at the sacrifice of the temporal resolution of the picture. In addition, when the selection controlling portion 92 receives a label from an object detecting portion 95, the selection controlling portion 92 controls the MUX 32 (see FIG. 7) to improve the spatial resolution of an object with the label at the sacrifice of the temporal resolution of the picture.

The data amount calculating portion 34 (see FIG. 7) supplies the data rate of the multiplexed data that is output from the MUX 32 to the selection controlling portion 92. The selection controlling portion 92 controls the selection of data of the MUX 32 so that the data rate of the multiplexed data does not exceed the transmission rate of the transmission path 3.

A background picture, an object, and additional information that are output by the pre-process portion 12 (see FIG. 3) and a priority range that is output by the priority range designating portion 91 are supplied to the feature amount extracting portion 93. The feature amount extracting portion 93 extracts a feature amount of a picture in the priority range that is output from the priority range designating portion 91. In other words, the feature amount extracting portion 93 extracts a feature amount of an object contained in the priority range so that the feature amount reflects the tendency of the picture that the user is considering.

Figure 26:
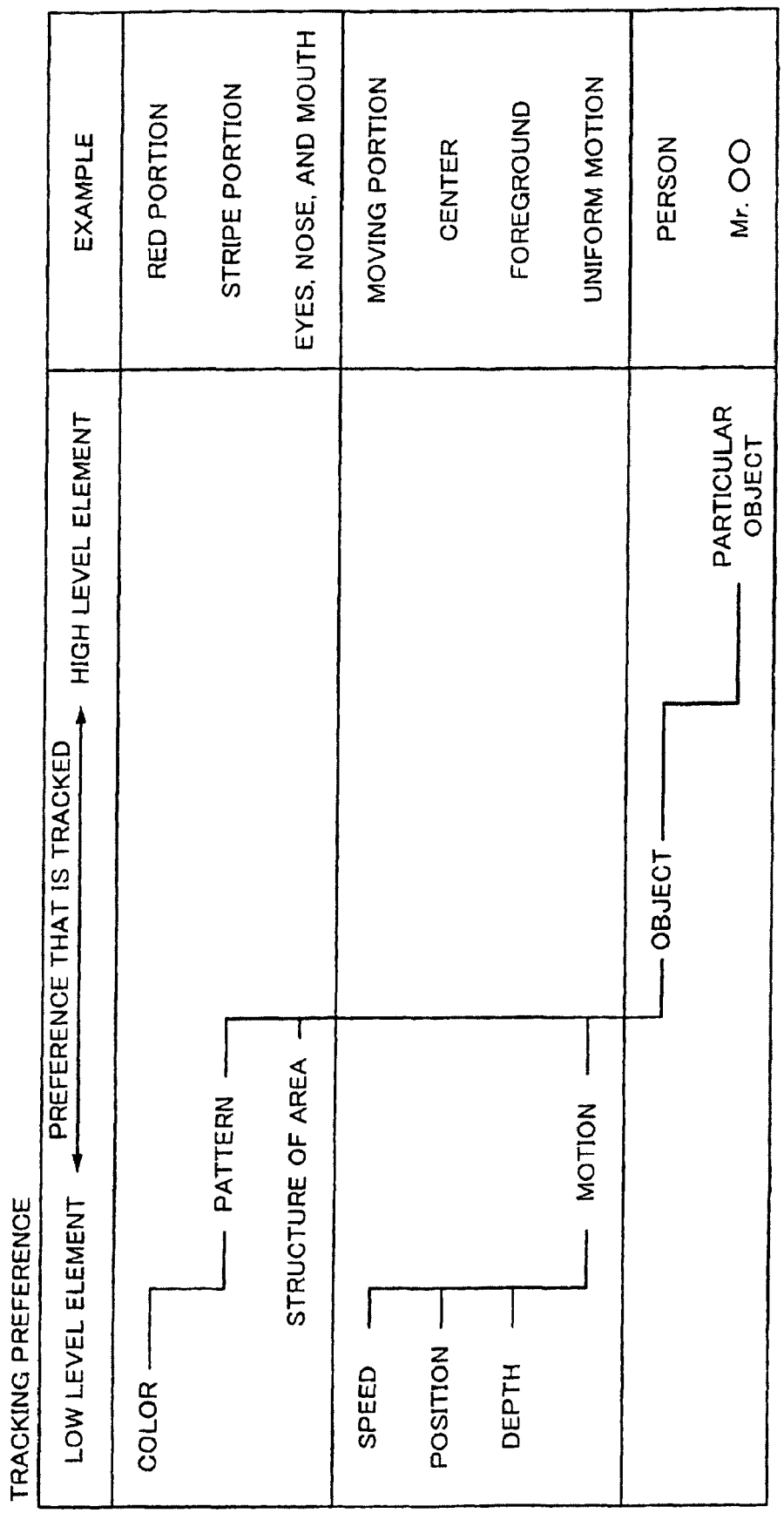
FIG. 26 is a schematic diagram for explaining a feature amount of an object.

In reality for example, as shown in FIG. 26, the feature amount of an object of a particular person extracted by the feature amount extracting portion 93 represents that an object is a person, the motion of the object is uniform, the position in the depth direction of the object (depth) is foreground, the position of the object on the display is center, the object is moving (the object is a portion that is moving), the area of the object contains eyes, a nose, and a mouth (the area of the object is composed of eyes, a nose, and a mouth), the pattern of the object is a stripe pattern (the object is a stripped portion), the color of the object is red (the object is a red portion).

The feature amount extracting portion 93 obtains a vector (having elements of feature amounts) of an extracted object (the vector may be referred to as feature amount vector) and increments the frequency of the histogram of the obtained feature amount vector stored in the histogram storing portion 94 by 1.

A histogram storing portion 94 stores the histogram of the feature amount vector as the learnt result of the preference 7 of the user.

The object detecting portion 95 detects an object from those supplied from the preprocess portion 12 (see FIG. 3) so that a feature amount vector with the maximum frequency of the histogram is obtained from the histogram storing portion 94. In other words, the object detecting portion 95 obtains a feature amount vector for an object supplied from the preprocess portion 12 (see FIG. 3) in the same manner as the feature amount extracting portion 93. In addition, the object detecting portion 95 references the histogram stored in the histogram storing portion 94 and determines whether or not a feature amount vector of an object supplied from the preprocess portion 12 (see FIG. 3) is contained in a predetermined range of the feature amount vector space around the feature amount vector with the highest frequency. When the feature amount vector is contained in the predetermined range, the object detecting portion 95 designates the object as an object that the user tends to consider and supplies the label of the object to the selection controlling portion 92.

Figure 27:
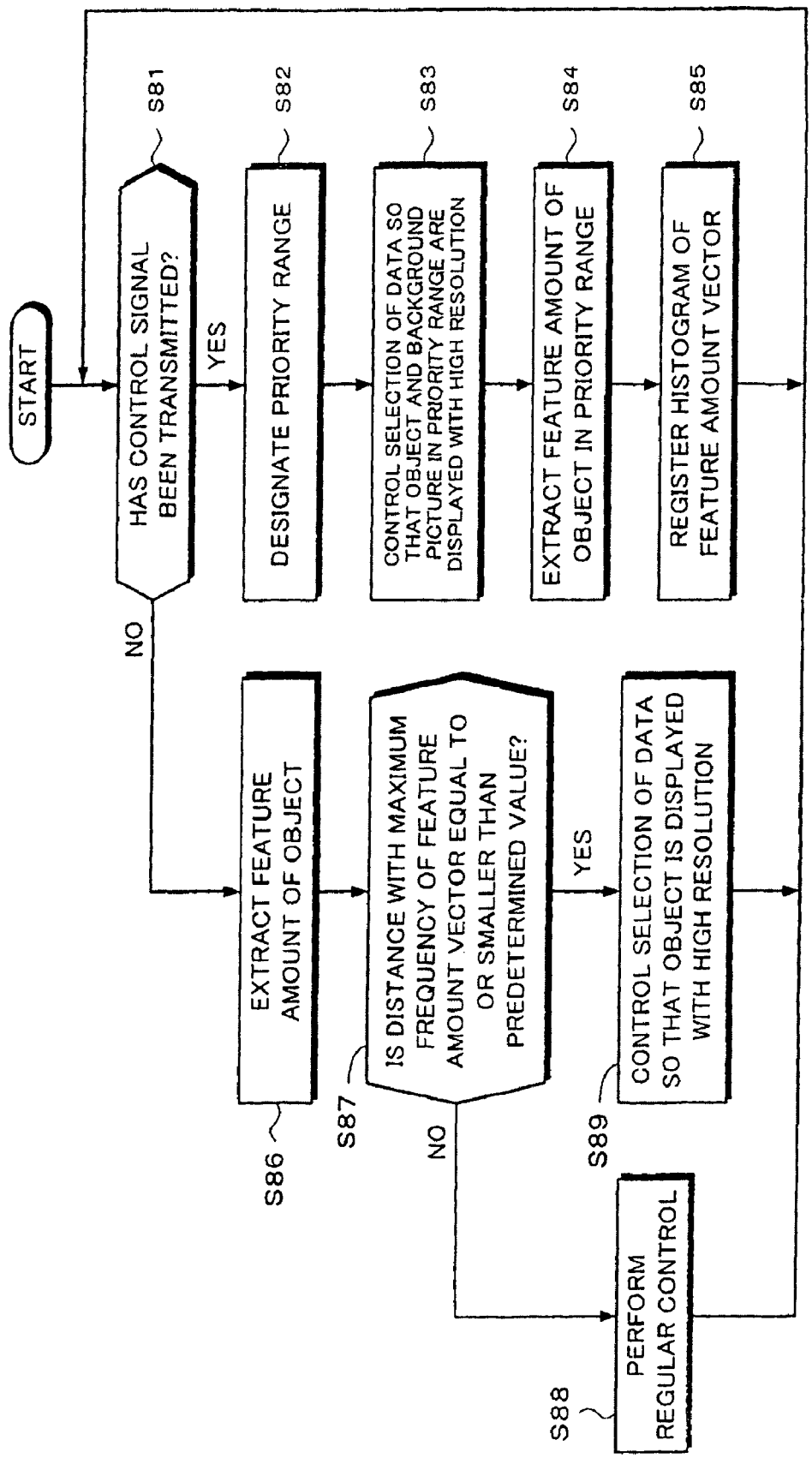
FIG. 27 is a flow chart for explaining the detail of the process of the controlling portion 35 shown in FIG. 25.

Next, with reference to a flow chart shown in FIG. 27, the controlling process of the MUX 32 (see FIG. 7) will be described. The controlling process is performed by the controlling portion 35 shown in FIG. 25.

First of all, at step S81, the priority range designating portion 91 determines whether or not a control signal has been transmitted from the receiving apparatus 2. When the determined result at step S81 represents that a control signal has been transmitted from the receiving apparatus 2, the flow advances to step S82. At step S82, the priority range designating portion 91 designates a priority range in the above-described manner corresponding to the control signal and supplies the priority range to the selection controlling portion 92 and the feature amount extracting portion 93.

At step S83, the selection controlling portion 92 controls the MUX 32 (see FIG. 7) to improve the spatial resolution of a picture (an object and a background picture) in the priority range supplied from the priority range designating portion 91 at the sacrifice of the temporal resolution of the picture.

At step S84, the feature amount extracting portion 93 extracts the feature amount of the object in the priority range supplied from the priority range designating portion 91 and obtains a feature amount vector having elements composed of each feature amount of the object. At step S85, the feature amount extracting portion 93 increments the frequency of the histogram of the feature amount vector stored in the histogram storing portion 94 by 1. Thereafter, the flow returns to step S81.

In the loop from step S81 to step S85, the histogram storing portion 94 forms a histogram of a feature vector of an object that the user tends to consider. In other words, the histogram storing portion 94 learns the preference of the user.

In addition, the feature amount extracting portion 93 can quantized the obtained feature amount vector and increment the frequency of code corresponding to the quantized result of the feature amount vector. In this case, the histogram storing portion 94 temporarily stores the histogram of the code.

In contrast, when the determined result at step S81 represents that the control signal has not been transmitted from the receiving apparatus 2, the flow advances to step S86. At step S86, the object detecting portion 95 obtains a feature amount vector of the object supplied from the pre-process portion 12 (see FIG. 3) in the same manner as the feature amount extracting portion 93. In addition, at step S87, the object detecting portion 95 references the histogram stored in the histogram storing portion 94 and determines whether or not a feature amount vector of the object supplied from the pre-process portion 12 (see FIG. 3) is contained in a predetermined range of the feature amount vector space around the feature amount vector with the highest frequency. In other words, at step S87, the object detecting portion 95 determines whether or not the distance between the feature amount vector with the highest frequency and the feature amount vector of the object supplied from the pre-process portion 12 is equal to or smaller than a predetermined value.

As was described above, when the histogram storing portion 94 stores the histogram of the code as the vector quantized result, the object detecting portion 95 quantizes the obtained feature amount vector. At step S87, the object detecting portion 95 determines whether or not the code as the vector quantized result matches the code of the highest frequency of the histogram stored in the histogram storing portion 94.

When the determined result at step S87 represents that the distance between the feature amount vector with the highest frequency and the feature amount vector of the object supplied from the pre-process portion 12 is not smaller than the predetermined value (namely, the object supplied from the pre-process portion 12 is an object that the user does not tend to consider due to his or her tendency), the flow advances to step S88. At step S88, the selection controlling portion 92 controls the MUX 32 (see FIG. 7) so that the receiving apparatus 2 displays a picture with a regular temporal resolution and a regular spatial resolution. Thereafter, the flow returns to step S81.

In contrast, when the determined result at step S87 represents that the distance between the feature amount vector with the maximum frequency and the feature amount vector of the object supplied from the pre-process portion 12 is equal to or smaller than the predetermined value (namely, the object supplied from the pre-process portion 12 is an object that the user tends to consider due to his or her tendency), the object detecting portion 95 outputs the label of the object supplied from the pre-process portion 12 to the selection controlling portion 92. Thereafter, the flow advances to step S89.

At step S89, the selection controlling portion 92 controls the MUX 32 (see FIG. 7) to improve the spatial resolution of the object with the label supplied from the object detecting portion 95 at the sacrifice of the temporal resolution. Thereafter, the flow returns to step S81.

Thus, in this case, the receiving apparatus 2 displays an object with a label that is output from the object detecting portion 95 so that the spatial resolution becomes high at the sacrifice of the temporal resolution. Thereafter, the receiving apparatus 2 continues to display the object with the high spatial resolution.

As a result, the receiving apparatus 2 automatically displays an object that the user tends to consider so that the spatial resolution of the object becomes high without necessity of the intervention of the user for the control information inputting portion 24. Thereafter, the receiving apparatus 2 continues to display the object with the high spatial resolution (however, in this case, as was described above, the temporal resolution of the picture deteriorates).

The histogram of the feature amount vector stored as the learnt result of the preference of the user in the histogram storing portion 94 can be reset periodically, non-periodically, or corresponding to a request from the user of the receiving apparatus 2.

In the above-described case, the spatial resolution of an object that has a feature amount vector that matches or that is similar to a feature amount vector with the highest frequency of the histogram is improved. Alternatively, spatial resolutions of all objects having feature amount vectors that match or that are similar to a feature amount vector whose frequency in the histogram exceeds a predetermined value may be improved.

The priority range is a predetermined range of which a considered point is at the center of gravity (in the above-described case, the priority range is a rectangular range). However, it can be said that an area of a picture in a particular range containing a considered point is a picture area that the user wants to see with interest (hereinafter, this area is referred to as interested object area).

On the other hand, a moving picture displayed by the receiving apparatus 2 has a moving picture area (hereinafter this area may be referred to as moving area) and a still picture area (hereinafter this area may be referred to as still area).

To improve the spatial resolution of the interested object area, it is necessary to recognize (designate) an interested object area that the user is considering in both the moving area and the still area of the picture. When the interested object area that the user is considering can be designated, a picture area that the user is not considering (for example, a background picture) can be obtained.

Even if an interested object area that the user is considering can be designated at a particular time, thereafter, it may be changed. Thus, when a picture area that the user is considering is changed to another picture area, it is necessary to recognize the new picture area as the interested object area.

In addition, there may be a plurality of interested object areas that the user is considering. In this case, it is necessary to separately recognizes those interested object areas.

Figure 28:
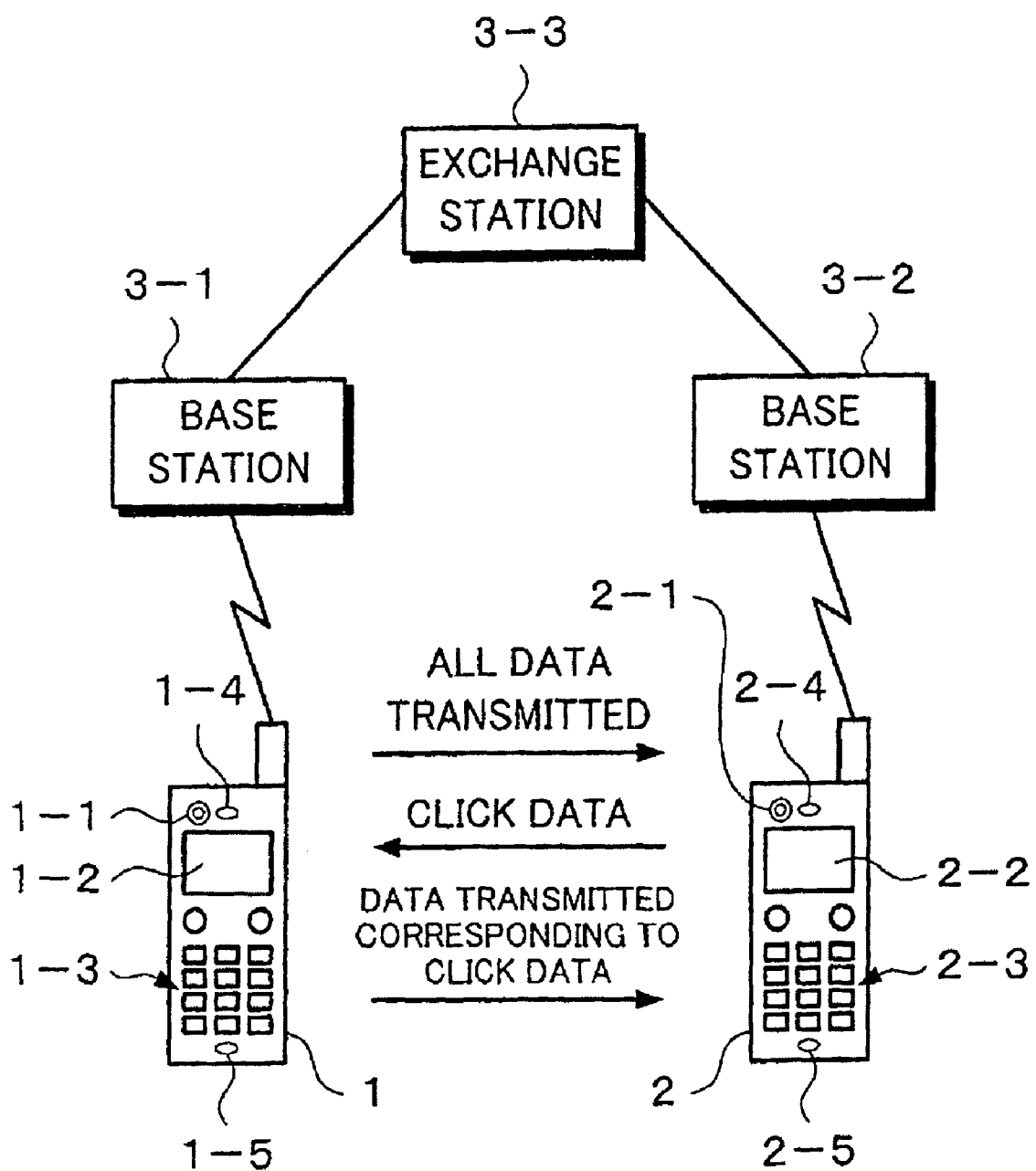
FIG. 28 is a detailed schematic diagram showing an example of a second structure of the transmitting system shown in FIG. 1.

Thus, FIG. 28 shows an example of a second structure of the picture transmitting system shown in FIG. 1 in the case that portable terminal units are used as the transmitting apparatus 1 and the receiving apparatus 2 shown in FIG. 1. In FIG. 28, similar portions to those in FIG. 2 are denoted by similar reference numerals and their description is omitted. In other words, the structure of the picture transmitting system shown in FIG. 28 is basically the same as the structure of the picture transmitting system shown in FIG. 2.

In the embodiment shown in FIG. 2, all information necessary for controlling a spatial resolution and a temporal resolution such as the coordinates of a considered point that the user is considering, the spatial resolution, and the transmission rate is transmitted as control information from the receiving apparatus 2 to the transmitting apparatus 1. In contrast, according to the embodiment shown in FIG. 28, as will be described later, information of a considered point of a picture displayed on the displaying portion 2-2 that is operated (clicked) by the user with the key portion 2-3 of the receiving apparatus 2 is transmitted as control information (hereinafter, information at a considered point may be referred togas click data).

When the transmitting apparatus 1 receives click data from the receiving apparatus 2, the transmitting apparatus 1 designates a picture area (interested object area) that the user is considering from a picture displayed by the receiving apparatus 2 (the picture is photographed by the video camera portion 1-1 of the transmitting apparatus 1) corresponding to the click data and controls the information amount of the picture data that is transmitted to the receiving apparatus 2 so that the spatial resolution and the temporal resolution of the designated picture area are changed while a predetermined condition is satisfied.

Figure 29:
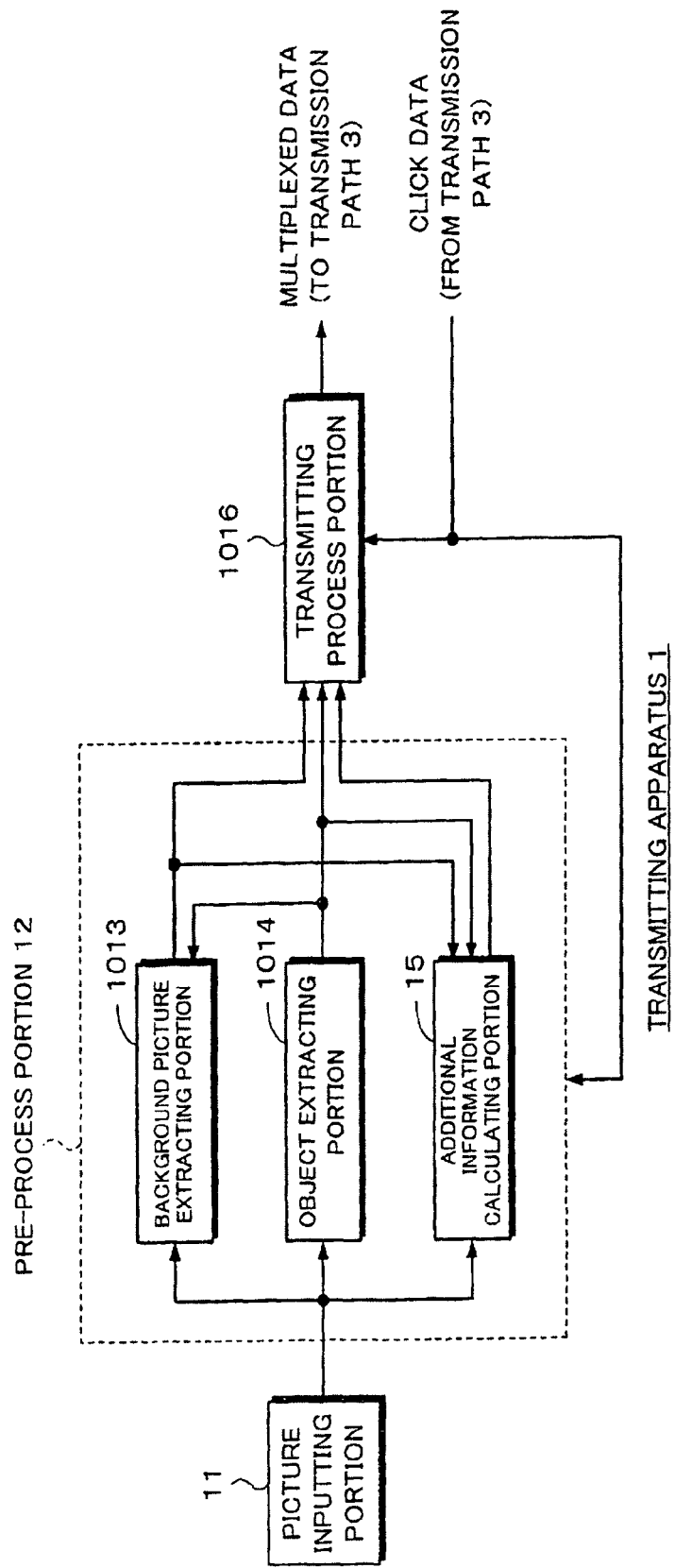
FIG. 29 is a block diagram showing an example of the structure of a transmitting apparatus 1 shown in FIG. 28.

Next, FIG. 29 shows an example of the structure of the transmitting apparatus 1 shown in FIG. 28. In FIG. 29, similar portions to those in FIG. 3 are denoted by similar reference numerals and their description is omitted. In the transmitting apparatus 1 shown in FIG. 29, a background picture extracting portion 1013, an object extracting portion 1014, and a transmitting process portion 1016 are disposed instead of the background picture extracting portion 13, the object extracting portion 1', and the transmitting process portion 16, respectively. In addition, click data transmitted from the receiving apparatus 2 is supplied to not only the transmitting process portion 1016 corresponding to the transmitting process portion 16, but the preprocess portion 12. Except for those points, the structure of the transmitting apparatus 1 shown in FIG. 29 is basically the same as the structure of the transmitting apparatus 1 shown in FIG. 3. However, in the transmitting apparatus 1 shown in FIG. 29, an output of the background picture extracting portion 1013 is not supplied to the object extracting portion 1014. In contrast, in the transmitting apparatus 1 shown in FIG. 3, an output of the background picture extracting portion 13 is supplied to the object extracting portion 14. In addition, in the transmitting apparatus 1 shown in FIG. 29, an output of the object extracting portion 1014 is supplied to the background picture extracting portion 1013. In contrast, in the transmitting apparatus 1 shown in FIG. 3, an output of the object extracting portion 14 is not supplied to the background picture extracting portion 13.

Click data is supplied to the pre-process portion 12. In the preprocess portion 12, the click data is supplied to the object extracting portion 1014. The object extracting portion 1014 extracts (designates) a picture area (interested object area) that the user of the receiving apparatus 2 is considering from a picture photographed by the picture inputting portion 11 and supplies picture data corresponding to the extracted (designated) interested object area to the transmitting process portion 1016. When there are a plurality of interested object areas that the user of the receiving apparatus 2 is considering in the picture photographed by the picture inputting portion 11, the object extracting portion 1014 supplies picture data of the plurality of interested object areas to the transmitting process portion 1016. In addition, the picture data of an interested object area extracted by the object extracting portion 1014 is also supplied to the additional information calculating portion 15.

As an example of an interested object area that the user is considering is an object such as a substance. Next, the case that an object (hereinafter, referred to as object picture) is extracted as an example of an interested object area by the object extracting portion 1014 will be described. It should be noted that an interested object area is not limited to an object. Instead, an interested object area may, be a picture area other than an object, a picture area in an object, or a background picture portion (that will be described later). However, according to the embodiment, as an example, the case that an interested object area is an object will be described. The object extracting process (interested object area designating process) performed by the object extracting portion 1014 will be described later.

The background picture extracting portion 1013 extracts a signal (hereinafter, referred to as background picture data) corresponding to a background picture portion (that is a picture area other than an interested object area; hereinafter, the background picture portion is referred to as background picture) of the picture from picture data supplied from the picture inputting portion 11 corresponding to the object extracted result of the object extracting portion 1014 and supplies the extracted background picture data to the transmitting process portion 1016 and the additional information calculating portion 15. In this example, a plane picture area whose activity is low (namely, that does not have a significance as a picture) is treated as a background picture. Of course, as well as a picture that does not have a significance, a background picture may be an object in which the user is not interested. In this example, for simplicity, the above-described plane picture area will be described as a background picture.

The additional information calculating portion 15 detects a background picture moving vector that represents the motion of background picture corresponding to background picture data supplied from the background picture extracting portion 1013 (the motion of the background picture corresponds to the motion in the photographing direction of the picture inputting portion 11). In addition, the additional information calculating portion 15 detects an object moving vector that represents the motion of an object corresponding to picture data of an object picture (hereinafter, this picture data is referred to as object picture data) supplied from the object extracting portion 1014. The additional information calculating portion 15 supplies the detected moving vector as a part of the additional information to the transmitting process portion 1016. Moreover, the additional information calculating portion 15 supplies information about the object such as the position and contour of the object of the picture (frame) photographed by the picture inputting portion 11 corresponding to the object picture data supplied from the object extracting portion 1014 as additional information to the transmitting process portion 1016. In other words, when the object extracting portion 1014 extracts an object picture from picture data, the object extracting portion 1014 also extracts information about the object such as the position and contour of the object and supplies the information to the additional information calculating portion 15. The additional information calculating portion 15 outputs information about the object as additional information.

The transmitting process portion 1016 encodes the object picture data supplied from the object extracting portion 1014, the background picture data supplied from the background picture extracting portion 1013, and the additional information supplied from the additional information calculating portion 15 corresponding to the click data supplied from the receiving apparatus 2 so that while the spatial resolution of the object picture of the picture displayed by the receiving apparatus 2 is improved, the condition of the data rate of the transmission path 3 is satisfied. Thereafter, the transmitting process portion 1016 multiplexes the encoded object picture data, the encoded background picture data, and the encoded additional information and transmits the multiplexed data, the frame rate information, and so forth to the receiving apparatus 2 through the transmission path 3.

Figure 30:
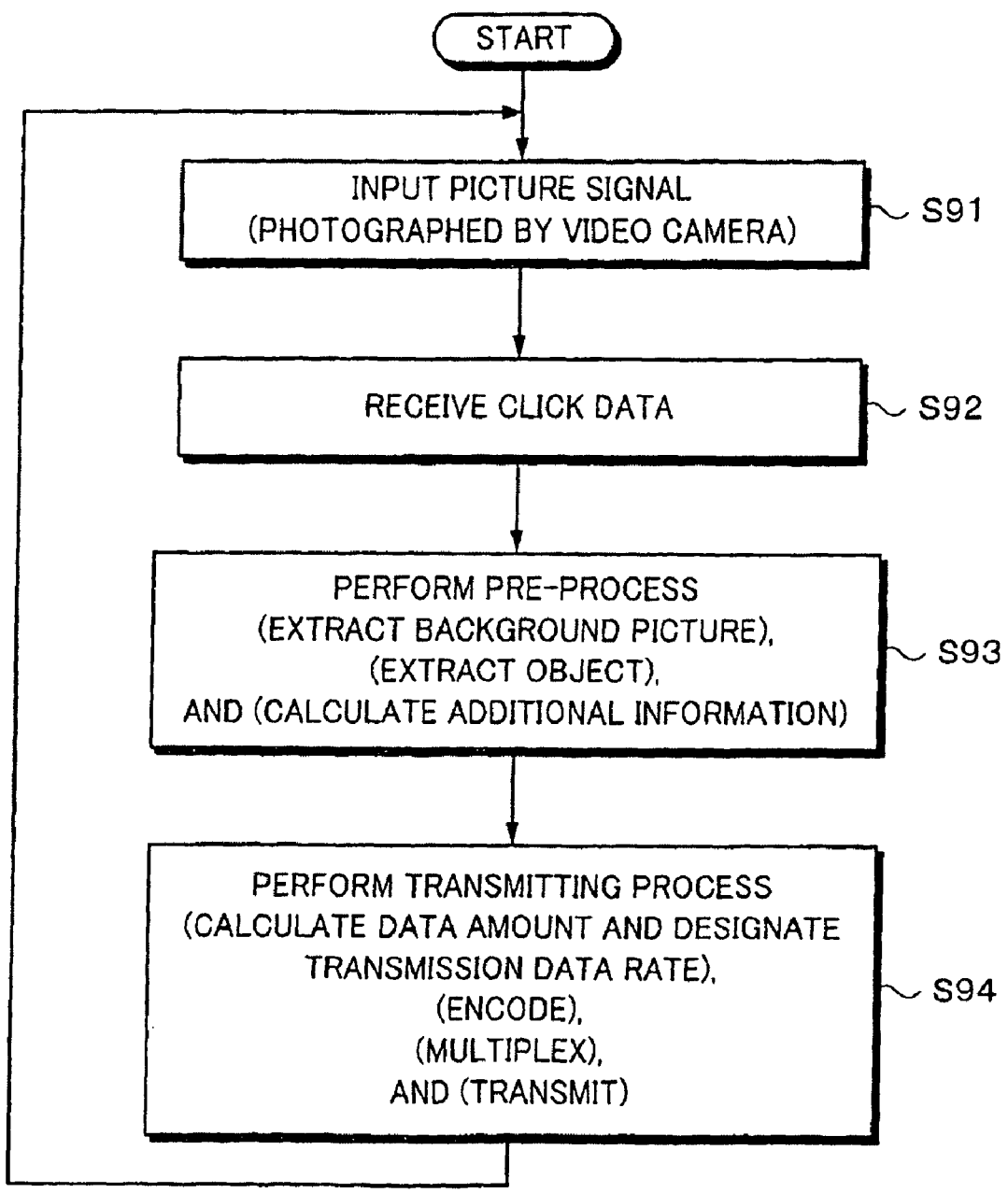
FIG. 30 is a flow chart for explaining the process of the transmitting apparatus 1 shown in FIG. 29.

Next, with reference to a flow chart shown in FIG. 30, the process performed by the transmitting apparatus 1 shown in FIG. 29 will be described.

At step S91, the transmitting apparatus 1 inputs picture data obtained by the picture inputting portion 11 to the pre-process portion 12.

Thereafter, at step S92, the transmitting apparatus 1 receives click data transmitted from the receiving apparatus 2 and inputs the click data to the pre-process portion 12.

At step S93, the pre-process portion 12 that has received the picture data and the click data performs a pre-process for extracting a background picture, an object, and additional information and supplies the background picture data, object picture data, and additional information obtained in the pre-process to the transmitting process portion 1016.

At step S94, the transmitting process portion 1016 calculates the data amounts of the object picture data background picture data, and additional information so that the condition of the data rate of the transmission path 3 is satisfied. Thereafter, the transmitting process portion 1016 encodes the object picture data, background picture data, and additional information corresponding to the data amounts and then multiplexes them. Thereafter, along with the frame rate information and so forth, the transmitting process portion 1016 transmits the multiplexed data to the receiving apparatus 2 through the transmission path 3.

Thereafter, the flow returns to step S1. At step S1, the transmitting apparatus 1 repeats the similar process.

Figure 31:
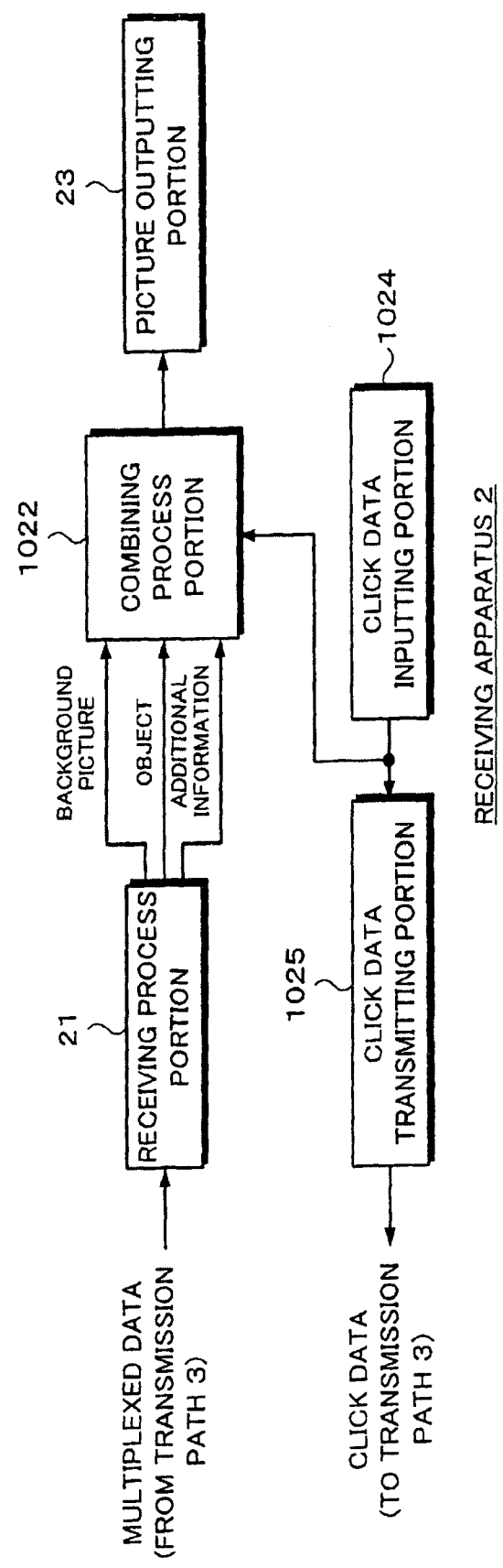
FIG. 31 is a block diagram showing an example of the structure of a receiving apparatus 2 shown in FIG. 28.

Next, FIG. 31 shows an example of the structure of the receiving apparatus 2 shown in FIG. 28. In FIG. 31, similar portions to those in FIG. 5 are denoted by similar reference numerals and their description is omitted. In other words, in the receiving apparatus 2 shown in FIG. 31, a combining process portion 1022 is disposed instead of the combining process portion 22. In addition, a click data inputting portion 1024 and a click data transmitting portion 1025 are disposed instead of the control information inputting portion 24 and the control information transmitting portion 25, respectively. Except for those points, the structure of the receiving apparatus 2 shown in FIG. 28 is basically the same as the structure of the receiving apparatus 2 shown in FIG. 5.

Multiplexed data transmitted from the transmitting apparatus 1 through the transmission path 3 is received by the receiving process portion 21. The receiving process portion 21 separates the received multiplexed data into encoded background picture data, encoded object picture data, and encoded additional information data and decodes the separated data. Thereafter, the receiving process portion 21 supplies the decoded background picture data, object picture data, and additional information to the combining process portion 1022.

The combining process portion 1022 combines the decoded background picture data, object picture data, and additional information and supplies, the combined picture signal to the picture outputting portion 23. In addition, the combining process portion 1022 controls the spatial resolution and temporal resolution of the picture that is combined corresponding to click data supplied from the click data inputting portion 1024.

The click data inputting portion 1024 generates click data that represents the click portion (coordinate position) and the click time corresponding to the operation of the key portion 2-3 by the user. The key portion 2-3 functions as a pointing device for designating the coordinate position of a picture displayed on the picture outputting portion 23 corresponding to the displaying portion 2-2 of the receiving apparatus 2 (see FIG. 28). In other words, when the user clicks the key portion 2-3 for a desired picture portion (interested object area) of a picture displayed on the picture outputting portion 23, the click data inputting portion 1024 generates click data that represents the coordinate information of the click position and the click time. The click data generated combining process portion 1022 and the click data transmitting portion 1025.

When the click data transmitting portion 1025 receives the click data from the click data inputting portion 1024, the click data transmitting portion 1025 transmits the click data to the transmitting apparatus 1 through the transmission path 3.

Figure 32:
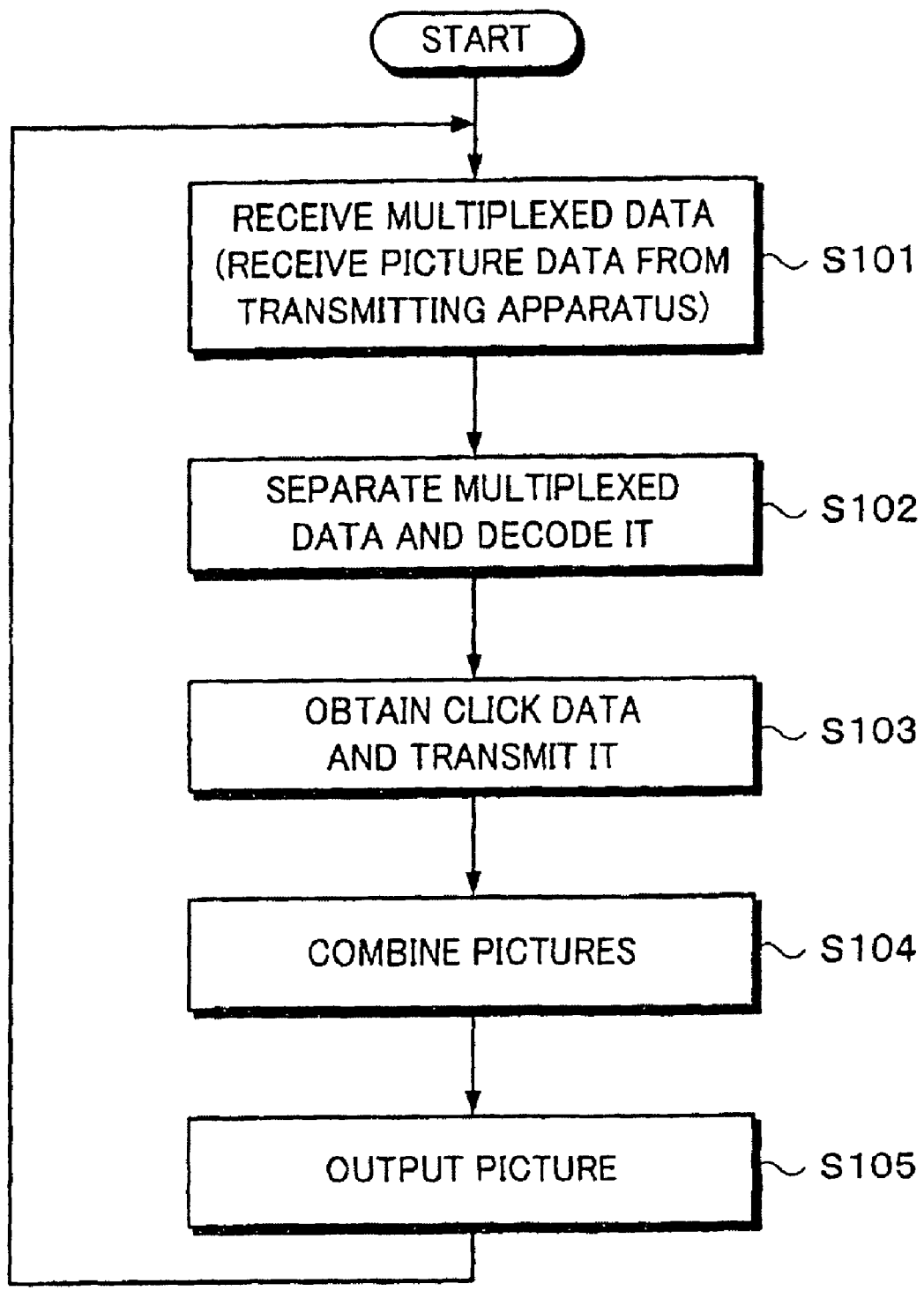
FIG. 32 is a flow chart for explaining the process of the receiving apparatus 2 shown in FIG. 31.

Next, with reference to a flow chart shown in FIG. 32, the process performed by the receiving apparatus 2 shown in FIG. 31 will be described in brief.

First of all, at step S101, the receiving apparatus 2 receives multiplexed data transmitted from the transmitting apparatus 1 through the transmission path 3.

At step S102, the receiving process portion 21 separates the multiplexed data into encoded background picture data, encoded object picture data, and encoded additional information data and decodes the separated encoded data. The decoded background picture data, object picture data, and additional information are sent to the combining process portion 1022.

At step S103, in the receiving apparatus 2, the click data inputting portion 1024 obtains click data corresponding to a click operation of the key portion 2-3 by the user and supplies the click data to the combining process portion 1022 and the click data transmitting portion 1025. Thus, the click data is transmitted from the click data transmitting portion 1025 to the transmitting apparatus 1.

At step S104, the combining process portion 1022 combines a picture and controls the spatial resolution and the temporal resolution of the combined picture corresponding to the background picture data, object picture data, and additional information supplied from the receiving process portion 21 and the click data supplied from the click data inputting portion 1024. The transmitting apparatus 1 can place the click data transmitted from the receiving apparatus 2 in header information of the multiplexed data and transmit the resultant header information to the receiving apparatus 2. In this case, the combining process portion 1022 of the receiving apparatus 2 can obtain the click data from the header information. Thus, it is not necessary to supply the click data from the click data inputting portion 1024 to the combining process portion 1022.

At step S105, the picture outputting portion 23 displays the picture combined by the combining process portion 1022 on a liquid crystal display or the like of the picture outputting portion 23.

Thereafter, the flow returns to step S101. At step S101, the receiving apparatus 2 repeats the similar process.

Figure 33:
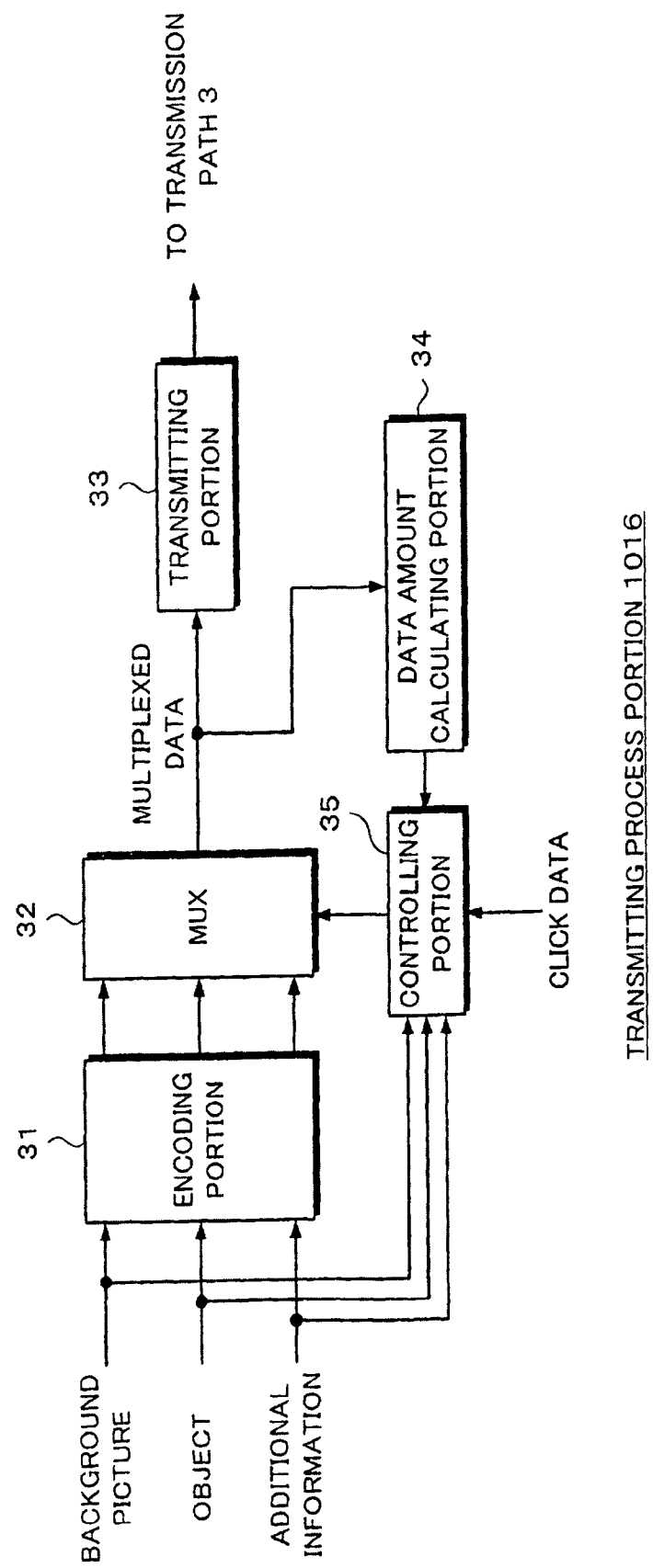
FIG. 33 is a block diagram showing an example of the structure of a transmitting process portion 1016 shown in FIG. 29.

Next, FIG. 33 shows a real example of the structure of the transmitting process portion 1016 of the transmitting apparatus 1 shown in FIG. 29. In FIG. 33, similar portions to those in FIG. 7 are denoted by similar reference numerals and their description is omitted. In other words, the structure of the transmitting process portion 1016 shown in FIG. 33 is basically the same as the structure of the transmitting process portion 1016 shown in FIG. 7 except that the transmitting process portion 1016 shown in FIG. 33 supplies click data (as part of control information) rather than the whole control information to the controlling portion 35.

In FIG. 33, background picture data, object picture data, and additional information are supplied from the preprocess portion 12 shown in FIG. 29 to the transmitting process portion 1016. The background picture data, object picture data, and additional information are input to the encoding portion 31 and the controlling portion 35. The encoding portion 31 hierarchically encodes the supplied background picture data, object picture data, and additional information in the above-described manner and supplies the obtained encoded data to the MUX 32. The MUX 32 selects the encoded background picture encoded data, encoded object picture encoded, and encoded additional information data under the control of the controlling portion 35 and supplies the selected data as multiplexed data to the transmitting portion 33. The transmitting portion 33 modulates the multiplexed data supplied form the MUX 32 corresponding to the transmission standard of the transmission path as a downstream portion and transmits the modulated data to the receiving apparatus 2 through the transmission path 3.

On the other hand, the controlling portion 35 controls an output of the multiplexed data supplied from the MUX 32 so that the data rate supplied from the data amount calculating portion 34 does not exceed the transmission rate of the transmission path 3. In addition, the controlling portion 35 receives click data transmitted from the receiving apparatus 2 through the transmission path 3 and controls the MUX 32 to select and a multiplex the encoded data corresponding to the lick data.

Figure 34:
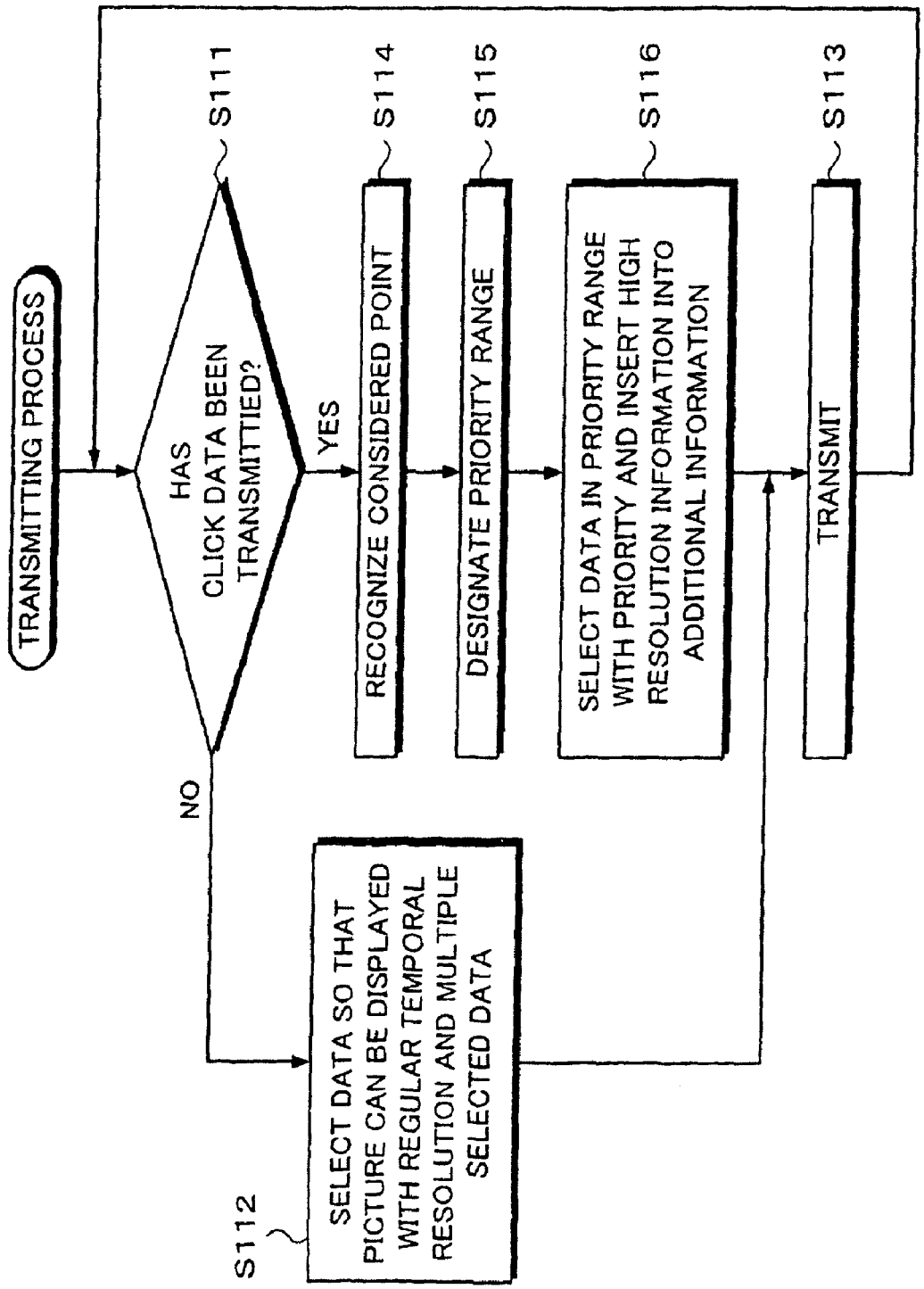
FIG. 34 is a flow chart for explaining the transmitting process of the transmitting process portion 1016 shown in FIG. 33.

Next, with reference to a flow chart shown in FIG. 34, the transmitting process performed by the transmitting process portion 1016 shown in FIG. 33 will be described.

First of all, at step S111, the controlling portion 35 of the transmitting process portion 1016 determines whether or not click data has been transmitted from the receiving apparatus 2. When the determined result at step S111 represents that the click data has not been transmitted from the receiving apparatus 2 (namely, the controlling portion 35 has not received click data), the flow advances to step S112. At step S112, as with the case at step S22 shown in FIG. 10, the controlling portion 35 controls the MUX 32 to select encoded background picture data, encoded object data, and encoded additional information data and multiplex the selected data so that the receiving apparatus 2 can display a picture with a regular temporal resolution.

Thereafter, the flow advances to step S113. At step S113, the transmitting process portion 1016 transmits the multiplexed data supplied from the MUX 32 from the transmitting portion 33 through the transmission path 3. Thereafter, the flow returns to step S111.

When the determined result at step S111 represents that click data has been transmitted from the receiving apparatus 2 (namely, the controlling portion 35 has received click data), the flow advances to step S114. At step S114, the controlling portion 35 recognizes the coordinates (click position) and click time of a considered point that the user has designated with the key portion 2-3 of the receiving apparatus 2 corresponding to the click data.

Thereafter, at step S115, the controlling portion 35 designates an interested object area that the user of the receiving apparatus 2 side has considered corresponding to the coordinates (click position) and the click time of the considered point in the manner that will be described later, designates the interested object area as a priority range for a picture whose spatial resolution is improved with priority, and detects a picture in the priority range and additional information thereof. In this case, a picture in the priority range is an object picture. A picture in the non-priority range is for example a picture such as a background picture in a non-interested object area.

Thereafter, at step S116, the controlling, portion 35 controls the MUX 32 to select encoded data of a picture in the priority range (object picture), a picture in the non-priority range (background picture) and additional information and multiplex them. In other words, when the controlling portion 35 receives click data from the receiving apparatus 2, as in the case at step S26 shown in FIG. 10, the controlling portion 35 controls the MUX 32 so that the spatial resolution of the picture in the priority range is improved at the sacrifice of the temporal resolution.

In addition, at step S116, the controlling portion 35 controls the MUX 32 to insert high resolution information as information of the position and size of the priority range into the additional information selected as multiplexed data. Thereafter, the flow advances to step S113.

At step S113, the transmitting portion 33 transmits the multiplexed data that is output by the MUX 32 through the transmission path 3. Thereafter, the flow returns to step S111.

As was described above, in the transmitting process shown in FIG. 34, the similar process to the process shown in FIG. 10 is performed. Thus, when the user of the receiving apparatus 2 continuously operates the click data inputting portion 1024 (for example, he or she continuously designates the same considered point), for a picture in the priority range that contains a considered point (an interested object area and an object picture), data for improving the spatial resolution is transmitted with priority. Thus, the spatial resolution of the picture in the priority range that contains the considered point is gradually improved. As a result, the picture in the priority range is more clearly displayed. In other words, a picture (an interested object area and an object picture) that the user on the receiving apparatus 2 side is considering is more clearly displayed.

As described above, the transmission of picture data is controlled so that the spatial resolution and the temporal resolution of the picture in the priority range (an interested object area and an object picture) are changed in the range of the resolutions corresponding to the transmission rate of the transmission path 3. Thus, in a limited transmission rate, the spatial resolution of an object picture corresponding to a considered point displayed by the receiving apparatus 2 can be more improved. In other words, since the spatial resolution of the object picture in the priority range is improved at the sacrifice of the temporal resolution of the picture, the object picture displayed on the receiving apparatus 2 can be more clearly displayed at the limited transmission rate (namely, the spatial resolution can be more improved).

Figure 35:
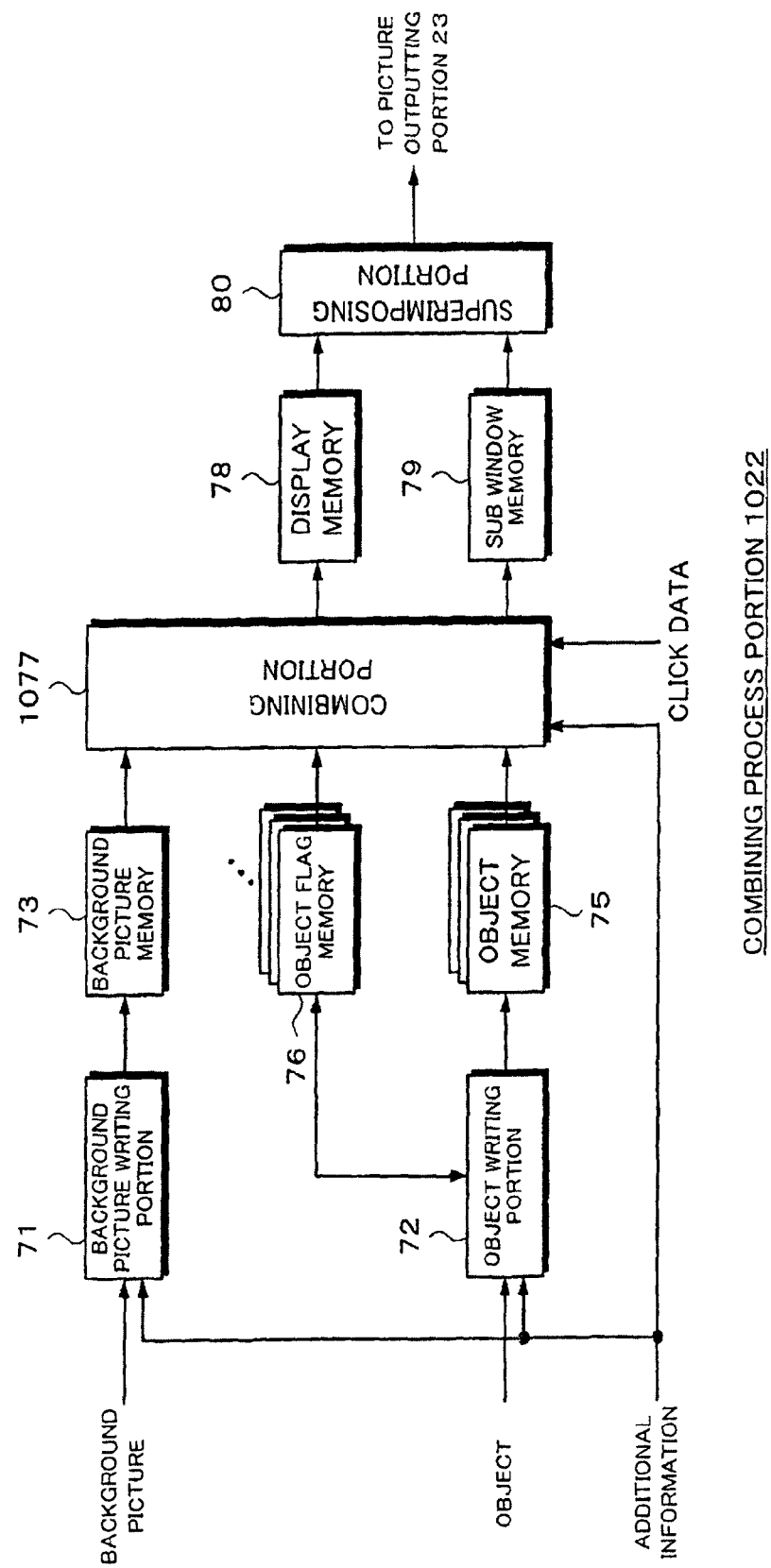
FIG. 35 is a block diagram showing an example of the structure of a combining process portion shown in FIG. 31.

Next, FIG. 35 shows an example of the structure of the combining process portion 1022 shown in FIG. 31. In FIG. 35, similar portions to those in FIG. 13 are denoted by similar reference numerals and their description is omitted. In other words, the background picture flag memory 74 is not disposed in the combining process portion 1022. A combining portion 1077 rather than the combining portion 77 is disposed in the combining process portion 1022. In addition, click data rather than control information is supplied to the combining portion 1077. Except for those points, the structure of the combining process portion 1022 shown in FIG. 35 is basically the same as the structure of the combining portion 22 shown in FIG. 13.

Referring to FIG. 35 background picture data that is output from the receiving process portion 21 (see FIG. 31) is input to a background picture writing portion 71. Object picture data that is output from the receiving process portion 21 is input to an object writing portion 72. Additional information that is output from the receiving process portion 21 is input to the background picture writing portion 71, the object writing portion 72, and the combining portion 1077.

The background picture writing portion 71 successively writes the supplied background picture data to a background picture memory 73. However, in the embodiment shown in FIG. 35, the background picture flag memory 74 of the embodiment shown in FIG. 13 is not disposed. Thus, in FIG. 35, when the background picture writing portion 71 writes background picture data to the background picture memory 73, the background picture writing portion 71 does not reference a background picture flag.

The combining portion 1077 reads a background picture of the frame that is displayed at present time (current frame) from the background picture data stored in the background picture memory 73 corresponding to a background picture moving vector contained in the additional information, combines an object picture stored in an object memory 75 and the background picture corresponding to an object moving vector contained in the additional information, and supplies the combined picture of the current frame to a display memory 78.

In addition, when the combining portion 1017 receives click data from the click data inputting portion 1024 shown in FIG. 31, the combining portion 1077 reads object picture data that contains the coordinate position of a considered point contained in the click data from an object memory 75 and supplies the obtained object picture data to a sub window memory 79.

Figure 36:
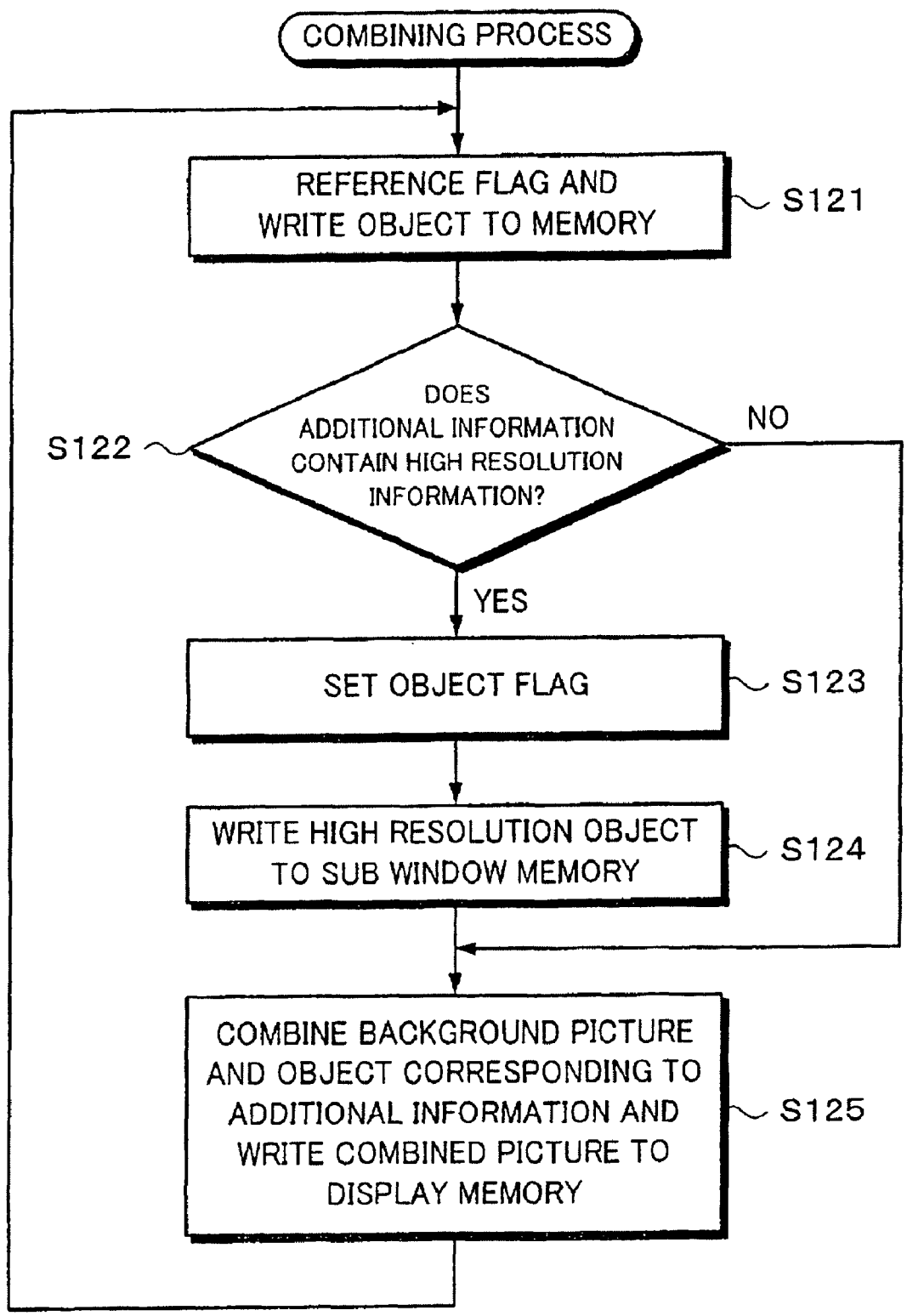
FIG. 36 is a flow chart for explaining the combining process of a combining process portion shown in FIG. 35.

Next, with reference to a flow chart shown in FIG. 36, the process (combining process) performed by the combining process portion 1022 shown in FIG. 35 will be described.

First of all, at step S121, the object writing portion 72 writes object picture data supplied form the decoding portion 53 shown in FIG. 35 in the above-described manner corresponding to an object flag stored in the object memory 75.

Thereafter, the flow advances to step S122. The object writing portion 72 determines whether or not the additional information contains high resolution information. When the determined result at step S122 represents that the additional information contains high resolution information (namely, the user of the receiving apparatus 2 has operated the key portion 2-3, the click data has been transmitted to the transmitting apparatus 1, and then for a picture in the priority range, object picture data with a high spatial resolution has been transmitted from the transmitting apparatus 1), the flow advances to step S123. At step S123, the object writing portion 72 sets a relevant object flag of the object flag memory 76 to "1".

In other words, when object picture data with a high spatial resolution for a picture in the priority range has been transmitted from the transmitting a apparatus 1, at step S121, the object picture data with the high spatial resolution is written to the object memory 75. Thus, at step S123, the object flag of the pixel that composes the object picture with the high spatial resolution is set to "1".

Thereafter, the flow advances to step S124. At step S124, the combining portion 1077 reads the object, picture data in the priority range from the object memory 75 and writes the obtained object picture data to the sub window memory 79.

In other words, when the determined result at step S122 represents that the additional information contains the high resolution information, as was described above, the use has operated the key portion 2-3, the click data has been transmitted to the transmitting apparatus 1, and then object picture data with a high spatial resolution for a picture in the priority range has been transmitted from the transmitting apparatus 1. The click data transmitted to the transmitting apparatus 1 is also supplied to the combining portion 1077. When the combining portion 1077 receives the click data, at step S124, the combining portion 1077 recognizes the priority range corresponding to the coordinates and click time of the considered point contained in the click data, reads an object with a high spatial resolution in the priority range that has transmitted from the transmitting apparatus 1 from the object memory 75, and writes the obtained object to the sub window memory 79. In addition as was described above, when the header information transmitted from the transmitting apparatus contains click data, the combining portion 1077 can recognize the priority range from the click data contained in the header information.

Thereafter, the flow advances to step S125. At step S125, the combining portion 1077 reads background picture data of the current frame from the background picture memory 73 corresponding to a background picture moving vector contained in the additional information. In addition, the combining portion 1077 reads object picture data of the current frame that is displayed from the object memory 75. Thereafter, the combining portion 1077 combines the background picture data of the current frame and the object picture data that has been read from the object memory 75 corresponding to an object moving vector contained in the additional information and writs the combined picture of the current frame to the display memory 78. In other words, the combining portion 1077 writes the background picture data to the display memory 78 and then overwrites the object picture data to the display memory 78. As a result, the combining portion 1077 writes picture data of the current frame of which a background picture and an object picture have been combined to the display memory 78.

In the above-described manner, the picture data of the current frame written to the display memory 78 and the object picture data written to the sub window memory 79 are supplied to the picture outputting portion 23 shown in FIG. 31 and displayed thereon.

In contrast, when the determined result at step S122 represents that the additional information does not contain high resolution information (namely, the user of the receiving apparatus 2 has not operated the key portion 2-3), the flow advances to step S125, skipping steps S123 and S124. As was described above, at step S125, the combining portion 1077 reads background picture data of the current frame from the background picture memory 73, reads required object picture data from the object memory 75, and combines the background picture of the current frame and the object picture that has been read from the object memory 75 corresponding to the additional information. As a result, picture data of the current frame is formed and written to the display memory 78. Thereafter, the flow returns to step S121. At step S121, the combining portion 1077 repeats the similar process.

According to the above-described combining process, in the same manner as the case described with reference to FIG. 15, a picture with a high spatial resolution that the user is considering as an object is displayed. The combining process portion 1022 shown in FIG. 35 does, not have the background picture flag memory 74 shown in FIG. 13. Thus, the background picture writing portion 71 shown in FIG. 35 always writes supplied background picture data to the background picture memory 73. Thus in the combining process shown in FIG. 36, the spatial resolution of the background picture is not improved unlike in the case described with reference to FIGS. 13 to 15.

Next, a method for extracting an object picture (interested object area) corresponding to click data supplied from the receiving apparatus 2 will be described. This method is performed by the an object extracting portion 1044 shown in FIG. 29.

Figure 37:
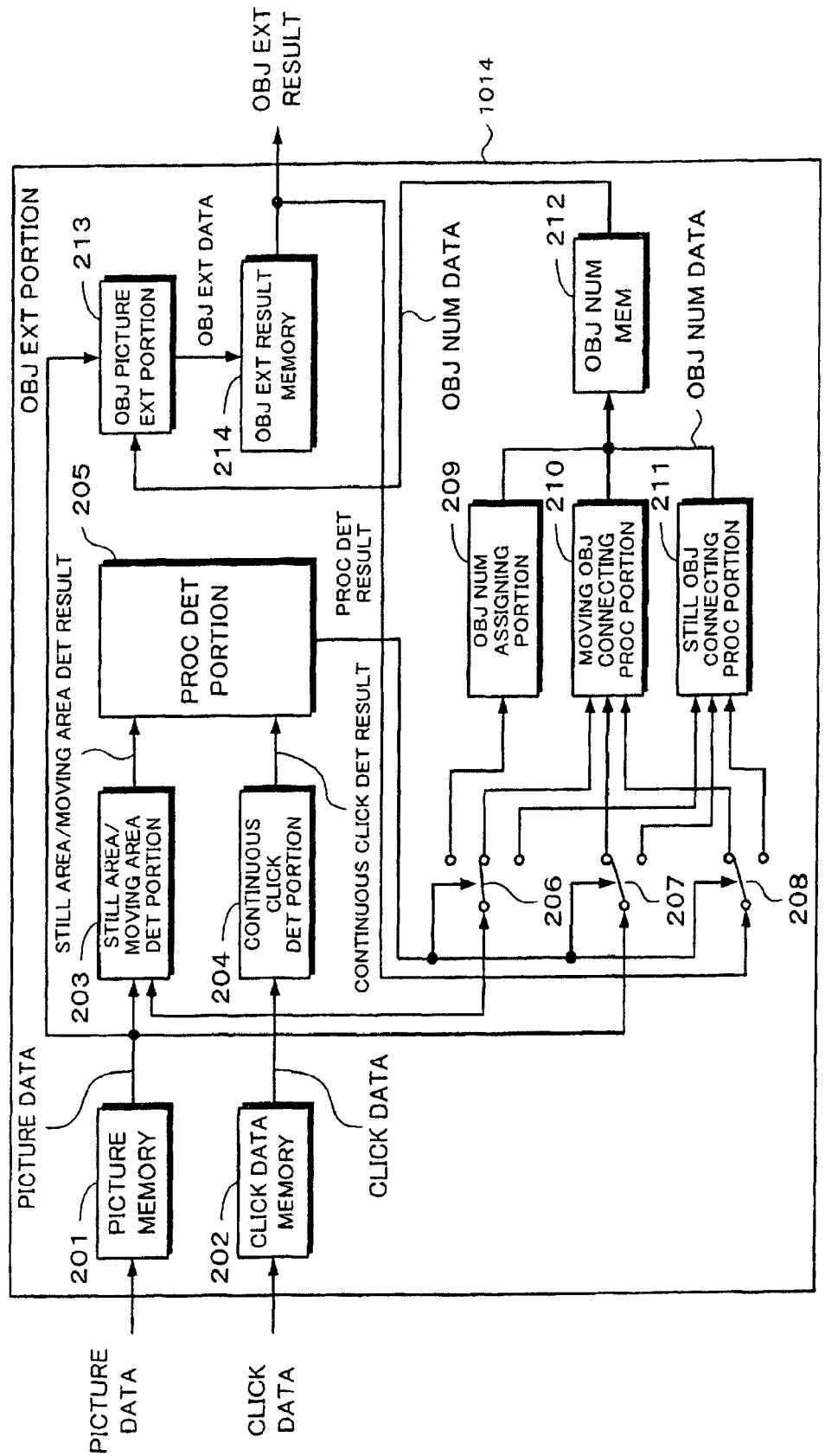
FIG. 37 is a schematic diagram showing a real structure of an object extracting portion 1014 shown in FIG. 29.

FIG. 37 shows an example of the structure of the object extracting portion 1014 of the pre-process portion 12 shown in FIG. 29.

In FIG. 37, picture data supplied from the picture inputting portion 11 shown in FIG. 29 is stored to a picture memory 201. The picture data is read from the picture memory 201 and supplied to a common terminal of a still area and moving area determining portion 203, an object picture extracting portion 213, and a selecting switch 207. The picture memory 201 stores picture data of at least several frames necessary for the still area and moving area determination of the still area and moving area determining potion 203 as a downstream portion of the picture memory 201.

In addition, click data transmitted from the receiving apparatus 2 through the transmission path 3 is stored to a click data memory 202. The click data is read from the click data memory 202 and supplied to a common terminal of a still area and moving area determining portion 204, a continuous click determining portion 204, and a selecting switch 206. The click data memory 202 stores click data for a predetermined time period (for example, longer than 500 to 700 msec) necessary for the continuous click determination performed by the continuous click determining portion 204 as a downstream portion of the click data memory 202.

The still area and moving area determining portion 203 determines whether a picture area of a local small block (of for example 16×16 pixels) around the click position (coordinate value on a picture) represented by the current click data sent from the receiving apparatus 2 is a moving area or a still area. In other words, the still area and moving area determining portion 203 obtains the difference between the picture area of the current frame and the picture area of a past frame that precedes the current frame by several frames (hereinafter, this past frame is referred to as past frame) for 16×16 pixels around the click position. When the difference between the frames is equal to or smaller than a predetermined threshold value, the still area and moving area determining portion 203 determines that the picture area is a still area. In contrast, when the difference is more than the predetermined threshold value, the still area and moving area determining portion 203 determines that the picture area is a moving area. When a color picture is handled, the still area and moving area determining portion 203 obtains the difference between the picture area of the current frame and the picture area of the past frame for a picture of 16×16 pixels for each of R, G, and B. When the average value of the absolute values of the frame differences obtained for R, G, and B is equal to or smaller than a predetermined threshold value (for example, equal to or less than 10), the still area and moving area determining portion 203 determines the picture area is a still area. In contrast, when the average value is larger than the predetermined threshold value, the still area and moving area determining portion 203 determines that the picture area is a moving area. When the still area and moving area determining portion 203 determines that the picture area is a still area, the still area and moving area determining portion 203 determines that the current click data that is output from the click data memory 202 is a still click (a click in a still area). When the still area and moving area determining portion 203 determines that the picture area is a moving area, the still area and moving area determining portion 203 determines that the current click data that is output from the click data memory 202 is a moving click (a click in a moving area). Thereafter, the still area and moving area determining portion 203 sends information that represents a still click or a moving click as a still area and moving area determined result to a process determining portion 205.

The continuous click determining portion 204 determines whether or not the user of the receiving apparatus 2 has continuously performed the click operation corresponding to the click time of the click data sent from the receiving apparatus 2. In other words, the continuous click determining portion 204 obtains the time difference between the click time of the current click data sent from the receiving apparatus 2 and the click time of the immediately preceding click data (namely, the click time interval). When the time difference is equal to or smaller than a predetermined threshold value, the continuous click determining portion 204 determines that the user has not continuously performed the click operation. When the continuous click determining portion 204 determines that the use has continuously performed the click operation, the continuous click determining portion 204 treats the current click data that is output form the click data memory 202 as a continuous click. In contrast, when the continuous click determining portion 204 determines that the user has not continuously perform the click operation (namely, the time difference between the current click time and the immediately preceding click time is equal to or larger than the predetermined threshold value), the continuous click determining portion 204 treats the current click data that is output from the click data memory 202 as a non-continuous click. Thereafter, the continuous click determining portion 204 sends information that represents a continuous click or a non-continuous click as a continuous click determined result to the process determining portion 205.

The process determining portion 205 controls the selecting switch 206, the selecting switch 207, and a selecting switch 208 corresponding to the still area and moving area determined result of the still area and moving area determining portion 203 and the continuous click determined result of the continuous click determining portion 204.

In other words, for example, corresponding to the still area and moving area determined result and the continuous click determined result, when the current click data that is output from the click data memory 202 is a still click and a continuous click, the process determining portion 205 controls the selecting switch 206 so that the current click data that is output from the click data memory 202 is sent to a still object connecting process portion 211. In addition, the process determining portion 205 controls the selecting switch 207 so that the picture data that is output from the picture memory 201 is sent to the still object connecting process portion 211. Moreover, the process determining portion 205 controls the selecting switch 208 so that the immediately preceding click data that is output from an object extracted result memory 214 (that will be described later), an object number (that corresponds to the above-described label and that categorizes (identifies) an object) assigned to the click data, and object picture data corresponding to the object number are sent to the still object connecting process portion 211.

In addition, corresponding to the still area and moving area determined result and the continuous click determined result, when the current click data that is output from the click data memory 202 is a moving click and a continuous click, the process determining portion 205 controls the selecting switch 206 so that the current click data that is output from the click data memory 202 is sent to a moving object connecting process portion 210. In addition, the process determining portion 205 controls the selecting switch 207 so that picture data that is output from the picture memory 201 is sent to the moving object connecting process portion 210. Moreover, the process determining portion 205 controls the selecting switch 208 so that the immediately preceding click data that is output from the object extracted result memory 214 (that will be described later), the object number assigned to the click data, and the object picture data corresponding to the object number are sent to the moving object connecting process portion 210.

In addition, corresponding to the still area and moving area determined result and the continuous click determined result, when the current click data that is output from the click data memory 202 is a still click and a continuous click (the time difference of the current click time and the immediately preceding click time is equal to or larger than the predetermined threshold value), the process determining portion 205 controls the selecting switch 206 so that the current click data that is output from the click data memory 202 is sent to an object number assigning portion 209. In addition, the process determining portion 205 controls the selecting switch 207 so that the picture data that is output from the picture memory 201 is sent to the still object connecting process portion 211. At that point, the selecting switch 208 controls the selecting switch 208 so that the immediately preceding click data that is output from the object extracted result memory 214, the object number, and the object picture data are not sent to the still object connecting process potion 211 (in this case, for example, the selecting switch 208 is opened).

In addition, corresponding to the still area and moving area determined result and the continuous click determined result, when the current click data that is output from the click data memory 202 is a moving click and a non-continuous click (the time difference between the current click time and the immediately preceding click time is equal to or larger than the predetermined threshold value), the process determining portion 205 controls the selecting switch 206 so that the current click data that is output from the click data memory 202 is not sent to the object number assigning portion 209. In addition, the process determining portion 205 controls the selecting switch 207 so that the picture data that is output from the picture memory 201 is sent to the moving object connecting process portion 210. At that point, the process determining portion 205 controls the selecting switch 208 so that the immediately preceding click data that is output from the object extracted result memory 214, the object number, and the object picture data are not sent to the moving object connecting process portion 210 (for example, the selecting switch 208 is opened).

The object number assigning portion 209 assigns a new object number to click data as a non-continuous click other than continuous clicks that are processed as a connecting process, by the still object connecting process portion 211 and the moving object connecting process portion 210 (that will be described later) and sends the object number and the click data to an object number memory 212.

When the process determining portion 205 determines that the current click data that is output from the click data memory 202 is a moving click and a continuous click, the moving object connecting process portion 210 determines whether the immediately preceding click data is a moving click and the feature of the picture in the vicinity of the current click position is contained in the feature of the area of the moving object picture with the object number assigned to the immediately preceding click data or they are similar to each other. When the determined result is true, the moving object connecting process portion 210 determines that the current click is a click for the same object picture. Thus, the moving object connecting process portion 210 performs a moving object connecting process for assigning the same object number as the immediately preceding click data to the current click data and sends the object number and the click data to the object number memory 212.

When the determined result of the process determining portion 205 represents that the current click data that is output from the click data memory 202 is a still click and a continuous click, the still object connecting process portion 211 determines whether the immediately preceding click is a still click and the current click position is contained in the area of the still object picture with the object number assigned to the immediately preceding click data or the current click position is close to the area. When the determined result of the still object connecting process portion 211 is true, the still object connecting process portion 211 determines that the current click is a click for the same object, picture as the immediately preceding click. Thus, the still object connecting process portion 211 performs a still object connecting process for assigning the same object number as the immediately preceding click data to the current click data and sends the object number and the click data to the object number memory 212.

The object number memory 212 stores click data for a plurality of past frames to which the object number assigning portion 209, the moving object connecting process portion 210, and the still object connecting process portion 211 have assigned object numbers and sends the stored click data and object numbers to the object picture extracting portion 213.

The object picture extracting portion 213 extracts a still object picture, a moving object picture, a background picture, and so, forth from the picture data supplied from the picture memory 201 corresponding to click data of the plurality of past frames that have been assigned object numbers and that have been supplied from the object number memory 212 and supplies the extracted result to the object extracted result memory 214.

In other words, the object picture extracting portion 213 obtains a dominant object number from a picture portion of click data with a high click data density as still clicks corresponding to click data of the plurality of past frames that have been assigned object numbers and that have been supplied from the object picture extracting portion 213. The object picture extracting portion 213 forms the shape of an object corresponding to the distribution of the click data assigned with the dominant object number and extracts a picture in the shape of the formed object as an object picture from the picture data.

In addition, the object picture extracting portion 213 performs a pattern matching operation for pictures of the frames in the vicinity of the click position assigned the same object number in click data determined as a moving click and performs a motion compensation for the pictures corresponding to the matching result. Moreover, the object picture extracting portion 213 obtains a dominant object number of a picture area with a high click density from a picture area determined as a similar picture area (namely a picture area that has been aligned by the motion compensation). The object picture extracting portion 213 forms the shape of an object corresponding to the distribution of the click data assigned the dominant object number and extracts a picture in the formed shape as an object picture from the picture data.

In addition, the object picture extracting portion 213 designates a picture portion with a low still click density or a low moving click density as a background picture.

Along with click data, object number, and so forth, the object extracted result memory 214 stores object picture data extracted by the object picture extracting portion 213. When necessary, the object extracted result memory 214 supplies the object picture data to the background picture extracting portion 1013, the additional information calculating portion 15, and the transmitting process portion 1016 shown in FIG. 29.

Next, with reference to a flow chart shown in FIG. 38, a process for extracting an object picture (interested object area) that the user of the receiving apparatus 2 is considering from a picture that is being photographed corresponding to click data transmitted from the receiving apparatus 2 will be described. The process is performed by the object extracting portion 1014 shown in FIG. 37.

First of all, at step S131, the picture memory 201 stores picture data of a frame that is input from the picture inputting portion 11 (frame picture data is input whenever transmitted). The picture memory 201 stores picture data of at least several frames necessary for the still area and moving area determining process performed at step S133.

At step S131, when click data is transmitted from the receiving apparatus 2 through the transmission path 3, the click data memory 202 stores the click data. The click data memory 202 stores click data form at least a predetermined time period (for example, longer than 500 to 700 msec) necessary for the continuous click determining process performed at step S133 (that will be described later).

Thereafter, the flow advances to step S132. At step S132, the object extracting portion 1014 determines whether or not the click data memory 202 stores click data that has been transmitted from the receiving apparatus 2 and that has not been processed. When the determined result at step S132 represents that the click data memory 202 does not store click data that has not been processed, the flow returns to step S131. At step S131, the object extracting portion 1014 waits for picture data and click data that are input. In contrast, when the determined result at step S132 represents that the click data memory 202, stores click data that has not been processed, the flow advances to step S133. At step S133, the object extracting portion 1014 designates the oldest click data that has not been processed as the current click data. The still area and moving area determining portion 203, the continuous click determining portion 204, and the process determining portion 205 perform the still area and moving area determining process and the continuous click determining process for the current click data.

In other words, at step S133, the still area and moving area determining portion 203 performs the still area and moving area determining process for determining whether a picture area as a local small block around a click position is a moving area or a still area using click position (picture coordinate value) information contained in the current click data transmitted from the receiving apparatus 2.

Figure 39:
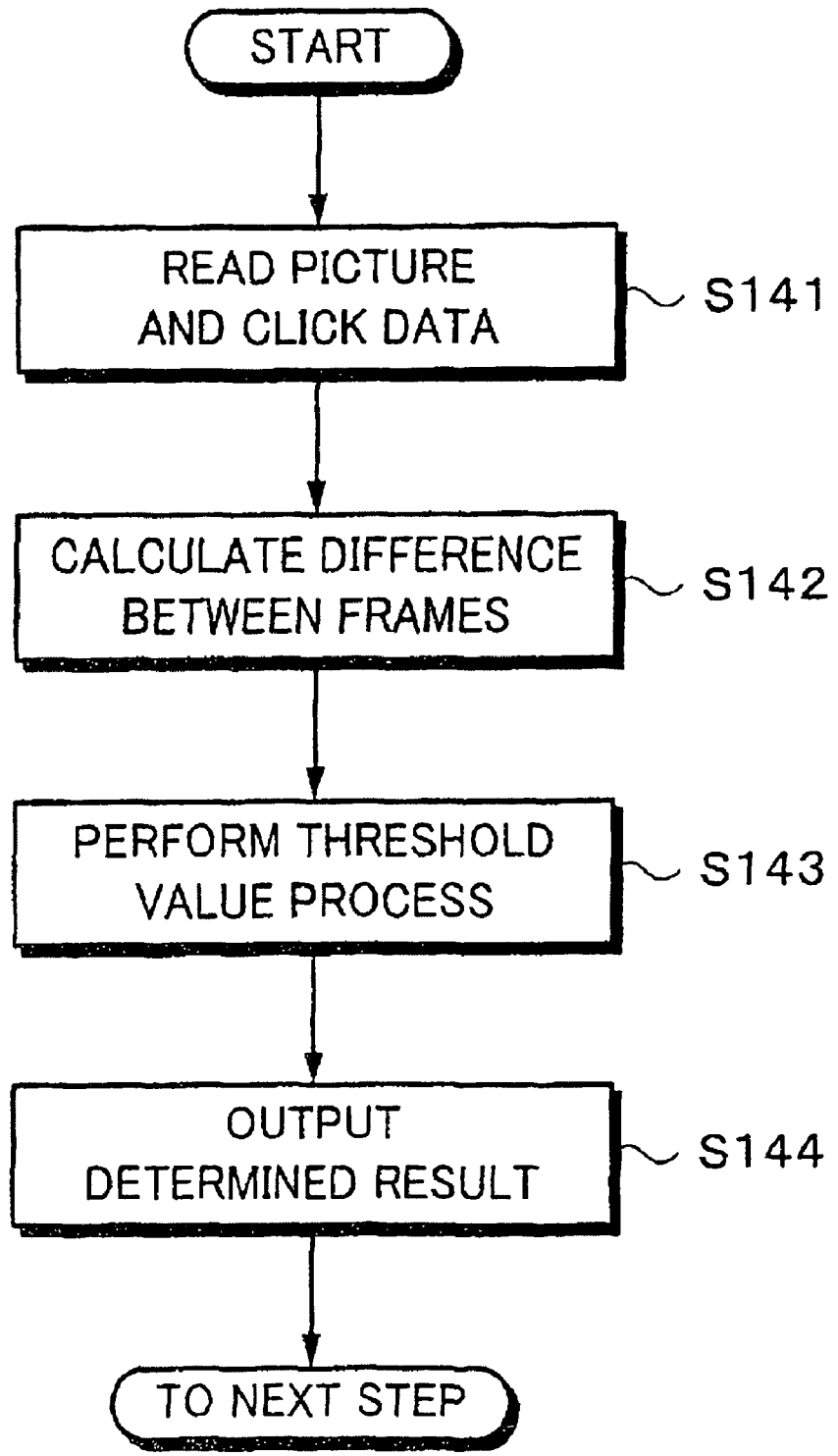
FIG. 39 is a flow chart for explaining a, still area and moving area determining process.
Figure 40:
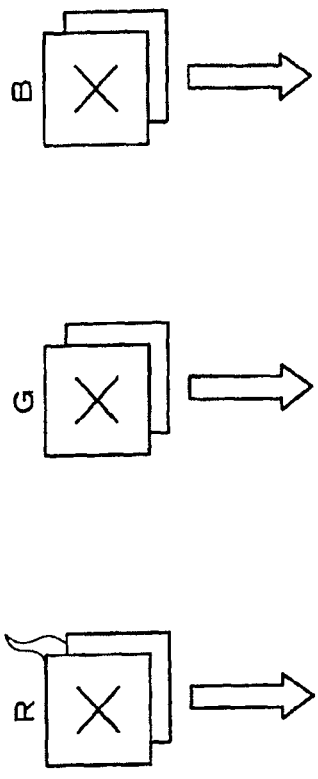
FIG. 40 is a schematic diagram for explaining a calculating method for the difference between frames.

Next, the still area and moving area determining process at step S133 shown in FIG. 38 performed by the still area and moving area determining portion 203 will be described in more reality. As shown in a flow chart shown in FIG. 39, at step S141, the still area and moving area determining portion 203 performs reads picture data and click data for several frames from the picture memory 201 and the click data memory 202, respectively. When a color picture is handled, as shown in FIG. 40 (A), the still area and moving area determining portion 203 reads picture data of several frames for R (Red), G (Green), and B (Blue). In addition, the still area and moving area determining portion 203 reads picture data of several past frames containing a frame corresponding to the current click data and click data corresponding to clicks performed for the several frames from the picture data memory 201 and the click data memory 202, respectively.

Thereafter, at step S142, the still area and moving area determining portion 203 calculates the difference between a picture area of the current frame and a picture area of a past frame that precedes the current frame for several frame (this past frame is referred to as past frame) for a local small block composed 16×16 pixels in the horizontal direction and the vertical direction around the click position of the current click data. When a color picture is handled, at step S142, as shown in FIGS. 40 (B) and 40 (C), the still area and moving area determining portion 203 obtains the difference between the frames for a picture composed of 16×16 pixels for each of R, G, and B and obtains the average value of the absolute values of the differences for each of R, G, and B.

Thereafter, at step S143, the still area and moving area determining portion 203 determines whether or not the difference between the frames calculated at step S142 is equal to or smaller than a predetermined threshold value. Thereafter, the flow advances to step S144. When the difference between the frames is equal to or smaller than the predetermined threshold value, the still area and moving area determining portion 203 determines that a small block that contains the click position of the current click data (this small block may be referred to as current block) is a still area. In contrast, when the difference between the frames is larger than the predetermined threshold value, the still area and moving area determining portion 203 determines that the current block is a moving area. In addition, when the determined result of the still area and moving area determining portion 203 represents that the current block is a still area, the still area and moving area determining portion 203 designates click data corresponding to the picture area of the current block as a still click. In contrast, when still area and moving area determining portion 203 represents that the current block is a moving area, the still area and moving area determining portion 203 designates click data corresponding to the picture area of the current block as a moving click. The still area and moving area determining portion 203 outputs the determined result as a still area and moving area determined result.

In the case that a color picture is handled, at step S144, as shown in FIG. 40 (D), when the average of the absolute values of the differences between the frames for each block of 16×16 pixels for each of R, G, and B is equal to or smaller than a predetermined threshold value (for example, "10"), the still area and moving area determining portion 203 sets a predetermined flag to for example "0". In contrast, when the average value is larger than the predetermined threshold value, the still area and moving area determining portion 203 sets the predetermined flag to for example "1". At step S144, as shown in FIG. 40 (E), when all the flags for R, G, and B for the current block of 16×16 pixels are "0", the still area and moving area determining portion 203 determines that the current block is a still area and designates the click data corresponding to the picture area of the current block as a still, click. In contrast, when one of the flags is "1", the still area and moving area determining portion 203 determines that the current block is a moving area and designates the click data corresponding to the picture area of the current block as a moving click. The still area and moving area determining portion 203 outputs information of a still click or a moving click as a still area and moving area determined result.

Returning to FIG. 38 at step S133, the continuous click determining portion 204 performs a continuous click determination for determining whether or not the click operation performed by the user of the receiving apparatus 2 is a continuous click operation corresponding to click time contained in the click data transmitted from the receiving apparatus 2.

Figure 41:
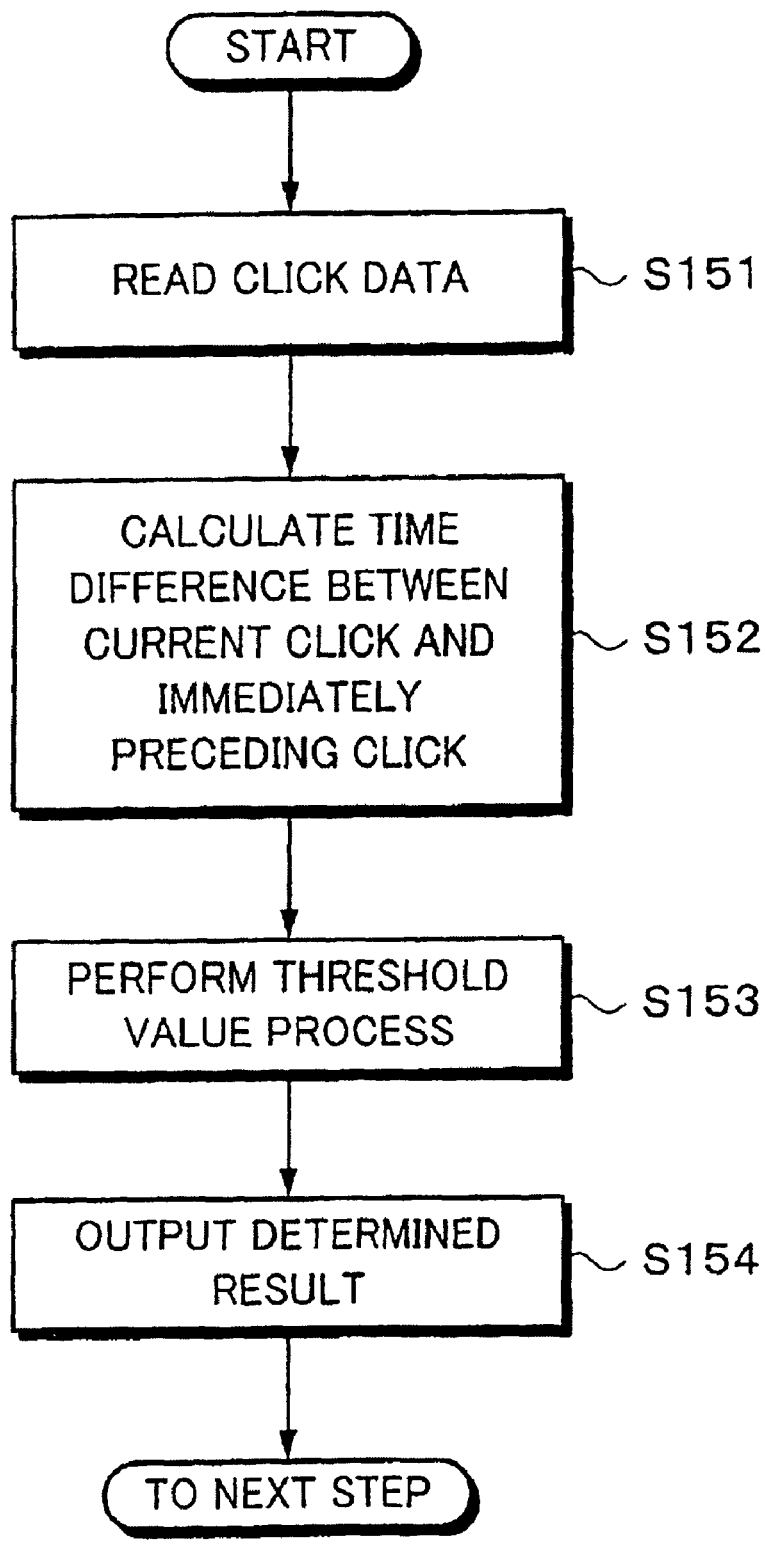
FIG. 41 is a flow chart for explaining a continuous click determining process.

Next, the process of the continuous click determining portion 204 performed at step S133 shown in FIG. 38 will be described. With reference to a flow chart shown in FIG. 41, at step S151, the click data memory 202 reads click data stored in the click data memory 202.

Thereafter, at step S152, the continuous click determining portion 204 calculates the time difference (click interval) between the click time of the current click data transmitted from the receiving apparatus 2 and the click time of the immediately preceding click data (preceding time).

Next, at step S153 the continuous click determining portion 204 determines whether or not the time difference is equal to or smaller than a predetermined threshold value. When the determined result at step S153 represents that the time difference is equal to or smaller than the predetermined threshold value, the continuous click determining portion 204 determines that the current click data is a continuous click. In contrast, when the determined result at step S153 represents that the time difference is larger than the predetermined threshold value, the continuous click determining portion 204 determines that the current click data is not a continuous click. Thereafter, the flow advances to step S154. At step S154, the continuous click determining portion 204 outputs information that represents a continuous click or a non-continuous click as the continuous click determined result.

In other words, when the determined result at step S153 represents that the current click data is a continuous click, the user of the receiving apparatus 2 tends to continuously perform the click operation for one object picture. This is because when the user of the receiving apparatus 2 requests the transmitting apparatus 1 to transmit object picture data (data in the interested object area) with a high spatial resolution, he or she tends to continuously click an object picture portion (interested object area) that the user wants to improve the spatial resolution thereof. Thus, when the determined result of the continuous click determining portion 204 represents that the current click operation is a continuous click operation, the continuous click determining portion 204 designates the current click data as a continuous click. In contrast, when the determined result of the continuous click determining portion 204 represents that the current click operation is not a continuous click operation (namely, the time difference between the click time of the current click and the click time of the immediately preceding click is equal to or larger than the predetermined threshold value), the continuous click determining portion 204 designates the current click data as a non-continuous click. The continuous click determining portion 204 outputs the continuous click determined result.

Returning to FIG. 38, when the determined results of the still area and moving area determining portion 203 and the continuous click determining portion 204 at step S133 represent that the current click data is a still click and a continuous click, the process determining portion 205 controls the selecting switch 206, the selecting switch 207, and the selecting switch 208 in the above-described manner. Thus, at step S135, the still object connecting process portion 211 performs a still object connecting process. When the determined results represent that the current click data is a moving click and a continuous click, the process determining portion 205 controls the selecting switch 206, the selecting switch 207, and the selecting switch 208 in the above-described manner. Thus, at step S136, the moving object connecting process portion 210 performs a moving object connecting process. When the determined results represent that the current click data is a non-continuous click, the process determining portion 205 controls the selecting switch 206, the selecting switch 207, and the selecting switch 208 in the above-described manner. At step S136, the moving object connecting process portion 210 performs the moving object connecting process. When the determined results represent that the current click data is a non-continuous click, the process determining portion 205 controls the selecting switch 206 in the above-described manner. Thus, at step S134, the object number assigning portion 209 performs a new object number assigning process.

In other words, when the determined result at step S133 represents that the current click data is a non-continuous click, the flow advances to step S134. At step S134, the object number assigning portion 209 assigns a new object number to the current click data. Thereafter, the flow returns to step S131.

In more reality, as shown in FIG. 42 (A), when an object number assigned to the immediately preceding click data CL1 denoted by a solid X mark is for example "0", if the current click data CL2 denoted by a dotted X mark in FIG. 42 (A) (namely, click-data that has not assigned an object number) is determined as a non-continuous click, the object number assigning portion 209 assigns, a new object number to the current click data CL2 denoted by a solid X mark in FIG. 42 (B) (in this example the new object number is "1").

In contrast, when the determined result at step S133 represents that the current click data is a continuous click and a still click, if the immediately preceding click is a still click and the current click position is contained in a picture area corresponding to an object number assigned to the immediately preceding click data or the current click position is close to the picture area, the still object connecting process portion 211 determines that the current click is a click for the same object picture as the immediately preceding click. Thus, at step S134, the still object connecting process portion 211 performs a still object connecting process for assigning the same object number as the immediately preceding click data for the current click data.

Figure 43:
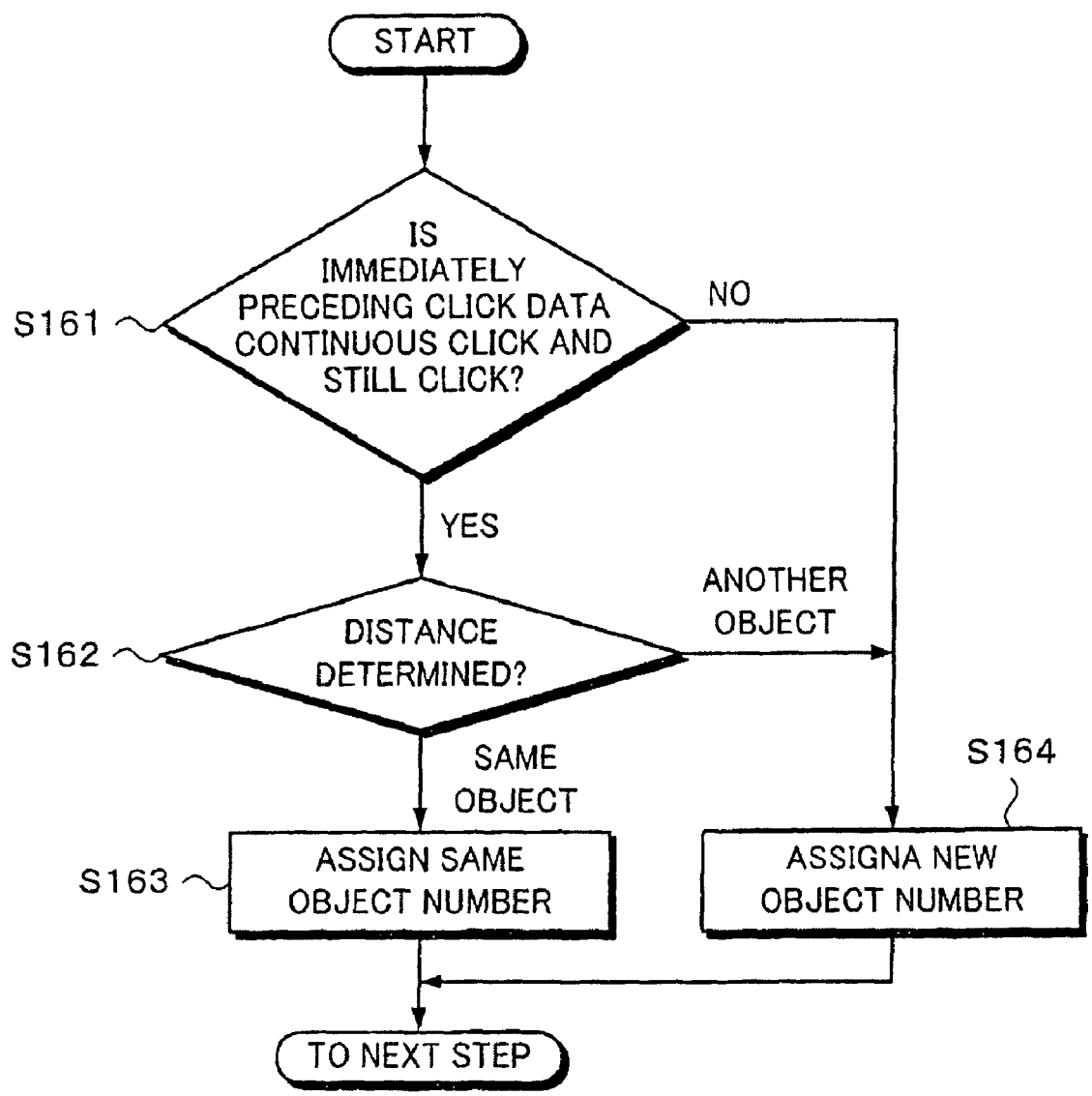
FIG. 43 is a flow chart for explaining a still object combining process.

In other words, as shown in a flow chart shown in FIG. 43, at step S161, the still object connecting process portion 211 determines whether or not the immediately preceding click data is a continuous click and a still click. When the determined result at step S161 represents that the immediately preceding click data is a continuous click and a still click, the flow advances to step S162. In contrast, when the determined result at step S161 represents the immediately preceding click is not a continuous click and a still click, the flow advances to step S164.

When the determined result at step S161 represents that the immediately preceding click data is not a continuous and still click, at step S164, the still object connecting process portion 211 assigns a new object number to the current click data in the same manner as was described with reference to FIGS. 42 (A) and (B). Thereafter, the flow advances to step S137 shown in FIG. 38.

In contrast, when the determined result at step S161 represents that the immediately preceding click data is a continuous click and a still click, the flow advances to step S162. At step S162, the still object connecting process portion 211 obtains the spatial distance between the current click position and the picture area corresponding to the object number assigned to the immediately preceding click data. When the current click position is contained in the picture area corresponding to the object number assigned to the immediately preceding click data or the current click position is close to the picture area, the still object connecting process portion 211 determines that the current click data is click data for the same object picture as the immediately preceding click. In contrast, when the current click position is not contained in the object picture area corresponding to the object number assigned to the immediately preceding click data and the current click position is far from the object picture area, the still object connecting process portion 211 determines that the current click data is click data for a different object picture from the immediately preceding click. When the determined result at step S162 represents that the current click data is click data for the same object picture as the immediately preceding click the flow advances to step S163. In contrast, when the determined result at step S162 represents that the current click data is click data for a different object picture from the immediately preceding click, the flow advances to step S164.

When the determined result at step S162 represents that the current click data is click data for a different object picture from the immediately preceding click, the flow advances to step S164. At step S164, the still object connecting process portion 211 assigns a new object number to the current click data. Thereafter, the flow advances to step S137 shown in FIG. 38.

In contrast, when the determined result at step S162 represents that the current click data is click data for the same object picture as the immediately preceding click, at step S163, the still object connecting process portion 211 performs a still object connecting process for assigning the same object number as the immediately preceding click data to the current click data.

In more reality, as shown in FIG. 42 (C), when an object number assigned to the immediately preceding click data CL1 denoted by a solid X mark is "0", if the current click data CL2 denoted by a dotted X mark shown in FIG. 42 (C) (namely, the current click data has not been assigned an object number) is determined as a continuous click and a still click, the immediately preceding click is a still click, and the current click position is contained in the picture area corresponding to an object number assigned to the immediately preceding click data or the current click position is close to the picture area, the still object connecting process portion 211 assigns the same object number (in this example, "0") as the immediately preceding click data to the current click data CL2 denoted by the solid X mark shown in FIG. 42 (D).

Figure 38:
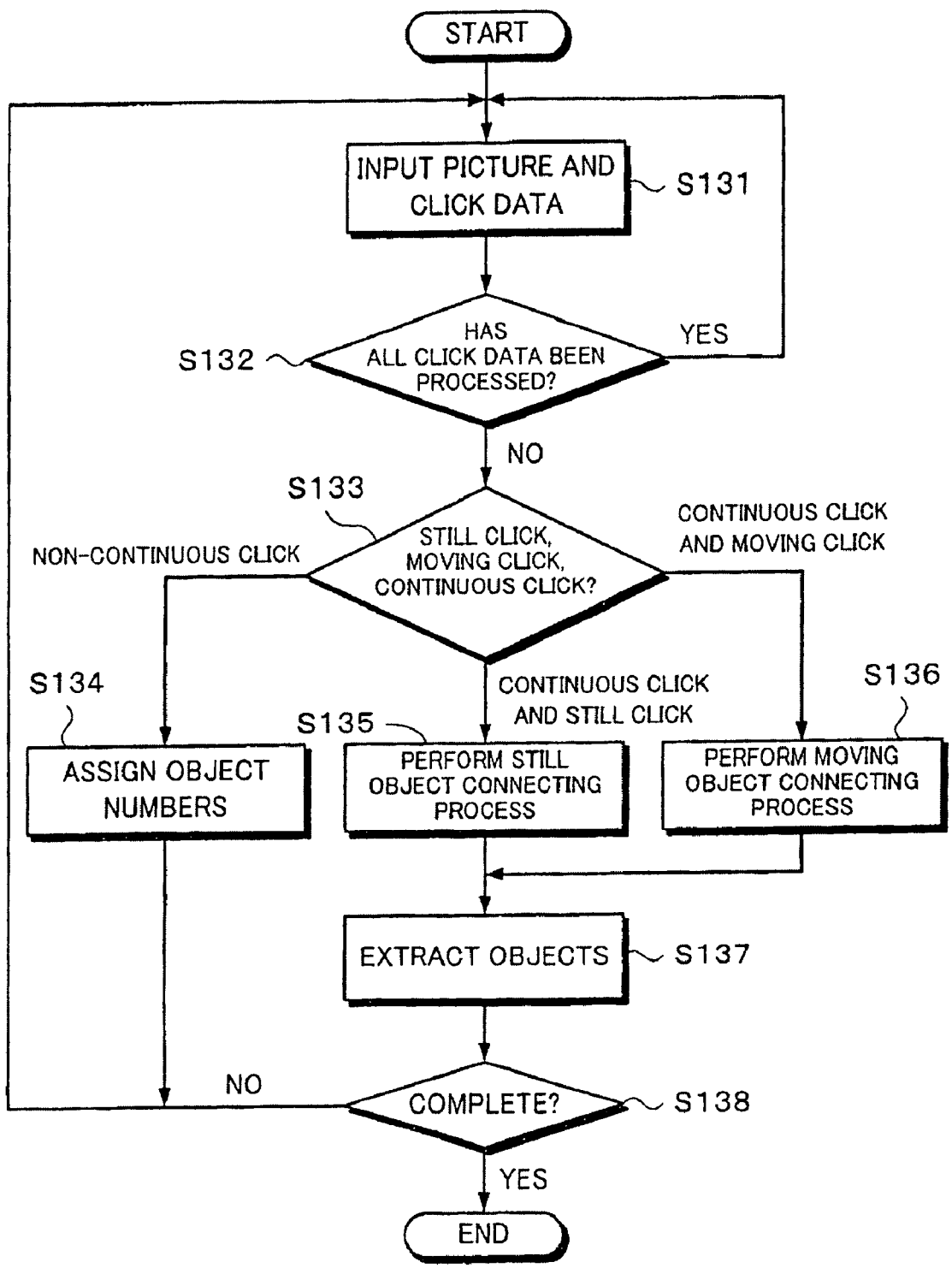
FIG. 38 is a flow chart for explaining the extracting process for a moving object picture or a still object picture.

After the still object connecting process portion 211 assigns the same object number as the immediately preceding click data to the current click data, the flow advances to step S137 shown in FIG. 38.

When the determined result at step S133 represents that the current click data is a continuous click and a moving click, the immediately preceding click is a moving click, and the feature of the picture in the vicinity of the current click position is contained in the feature of the picture area (16×16 pixels) corresponding to the object number assigned to the immediately preceding click or the former is close to the latter, the moving object connecting process portion 210 determines that the click is a click for the same object picture as the immediately preceding click. At step S136, the moving object connecting process portion 210 performs a moving object connecting process for assigning the same object number as the immediately preceding click data to the current click data.

Figure 44:
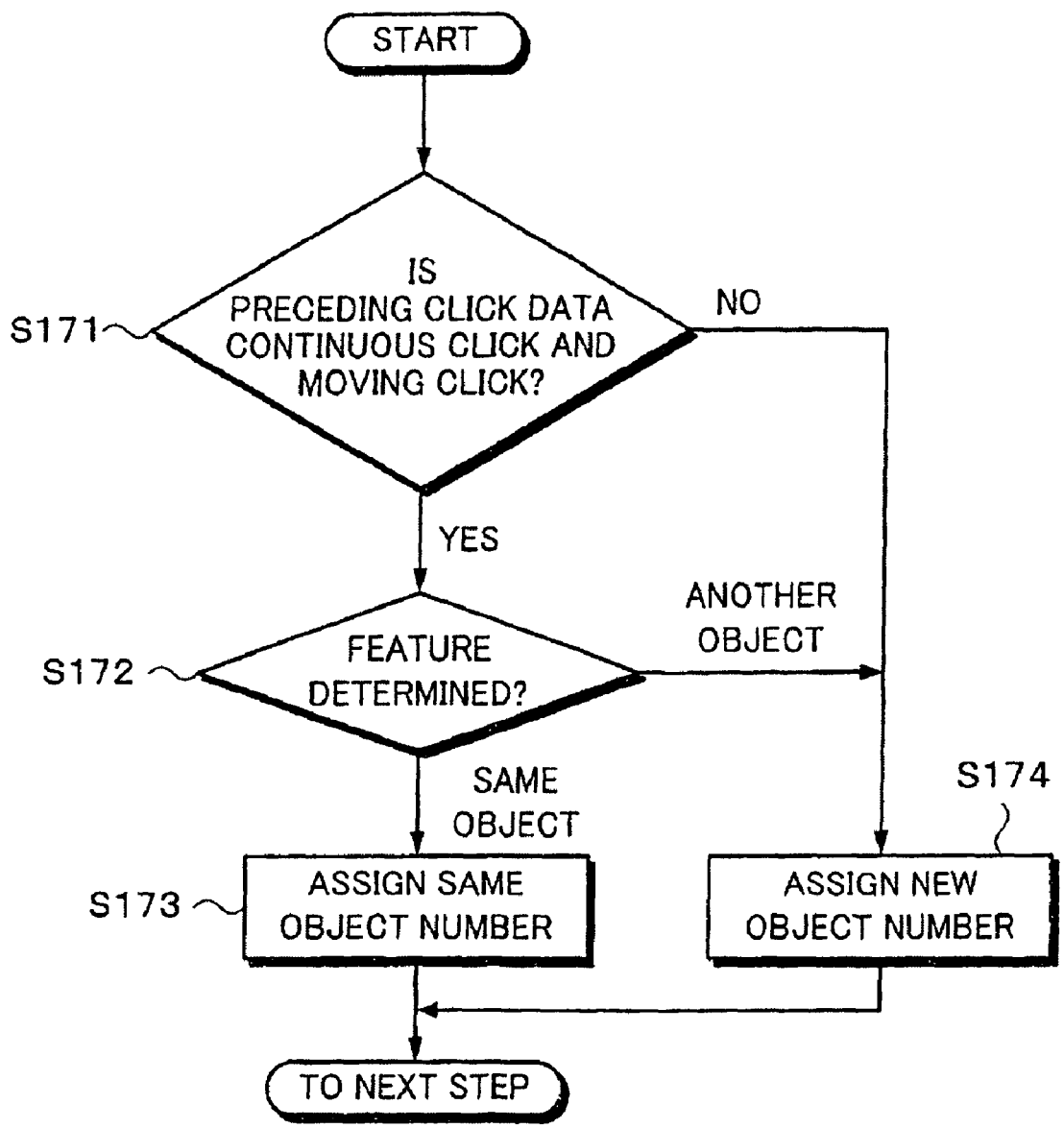
FIG. 44 is a flow chart for explaining a moving object combining process.

In other words, when the determined result at step S133 represents that the current click data is a continuous click and a moving click, as shown in FIG. 44, at step S171, the moving object connecting process portion 210 determines whether or not the immediately preceding click data is a continuous click and a moving click. When the determined result at step S171 represents that the immediately preceding click data is a continuous click and a moving click, the flow advances to step S172. In contrast, when the determined result at step S171 is not a continuous click and a moving click, the flow advances to step. S174.

When the determined result at step S171 represents that the immediately preceding click data is not a continuous click and a moving click, the flow advances to step S174. At step S174, the moving object connecting process portion 210 assigns a new object number to the current click data in the same manner described with reference to FIG. 41 (A) and (B). Thereafter, the flow advances to step S137 shown in FIG. 38.

When the determined result at step S171 represents that the immediately preceding click data is a continuous click and a moving click, the flow advances to step S172. At step S172, the moving object connecting process portion 210 obtains the feature of the picture area (16×16 pixels) in the vicinity of the current click position and the feature of the picture area corresponding to the object number assigned to the immediately preceding click. When the feature of the picture area in the vicinity of the current click position is contained in the feature of the picture area corresponding to the object number assigned to the immediately preceding click or the former is close to the latter, the receiving process portion 21 determines that the click is a click for the same object picture as the immediately preceding click. In contrast, when the feature of the picture area in the vicinity of the current click position is not contained in the feature of the picture area corresponding to the object number assigned to the immediately preceding click and the former is far from the latter, the moving object connecting process portion 210 determines that the current click data is click data for a different object picture from the immediately preceding click. In this case, the feature of the picture area is for example a color (an average color, a typical color, or the like), a histogram, and a pattern of the local area (16×16 pixels) in the vicinity of a click position. When the same object number is assigned to a plurality of moving clicks, it means that an object is tracked among those click data. When the determined result at step S172 represents that the current click data is click data for the same object picture as the immediately preceding click, the flow advances to step S173. In contrast, when the determined result at step S172 represents that the current click data is clock data for a different object picture from the immediately preceding click, the flow advances to step S174.

When the determined result at step S172 represents that the current click data is click data for indifferent object picture from the immediately preceding click, the flow advances to step S174. At step S174, the moving object connecting process portion 210 assigns a new object number to the current click data in the above-described manner. Thereafter, the flow advances to step S137 shown in FIG. 38.

When the determined result at step S172 represents that the current click data is click data for the same object picture as the immediately preceding click, the flow advances to step S173. At step S173, the moving object connecting process portion 210 assigns the same object number as the immediately preceding click data to the current click data.

In more reality, when an object number assigned to the immediately preceding click data CL1 denoted by a solid X mark shown in FIG. 42 (E) is for example "0", if the current click data CL2 denoted by a dotted X mark shown in FIG. 42 (E) is determined as a continuous click and a moving click and the feature of the picture in the vicinity of the current click position is contained in the feature of the object picture corresponding to the object number assigned to the immediately preceding click or the former is close to the latter, the moving object connecting process portion 210 assigns the same object number (in this example, "0") as the immediately preceding click data to the current click data CL2 denoted by the solid X mark shown in FIG. 42 (F).

After the moving object connecting process portion 210 has assigned the same object number as the immediately preceding click data to the current click data at step S173, the flow advances to step S137.

When the flow advances from step S135 to S137 shown in FIG. 38, the object picture extracting portion 213 extracts a still object picture, a moving object picture, and another background picture from input picture data corresponding to the click data of past several frames assigned object numbers and stored in the object number memory 212 and picture data of past several frames stored in the picture memory 20. In other words, it seems that a still object picture is contained in a picture portion with a high still click data density. At that point, the object picture extracting portion 213 obtains a still click data density corresponding to past several frames assigned object numbers, obtains a dominant object number of a picture portion with the high still click density, forms the shape of an object corresponding to the distribution of click data assigned the dominant object number, and extracts a picture in the shape of the object as a still object picture from the picture data.

When the flow advances from step S136 to step S137, the object picture extracting portion 213 performs a pattern matching operation for pictures of the frames in the vicinity of click positions of moving click data assigned the same object number, performs a motion compensation for the pictures corresponding to the matching result, obtains a dominant object number of the pattern matched picture area with a high click density, forms the shape of an object corresponding to the distribution of click data assigned the dominant object number, and extracts a picture in the shape of the object as a moving object picture from the picture data.

At step S137, the object picture extracting portion 213 treats a picture portion with a low still click density or low moving click data as the current background picture. In other words, the object picture extracting portion 213 treats a picture portion other than the still object picture and the moving object picture that have been extracted from picture data as a background picture.

Next, the process at step S137 will be described in detail with reference to a flow chart shown in FIG. 45. First of all, at step S181, the object picture extracting portion 213 captures click data of several past frames assigned object numbers and picture data corresponding thereto. Thereafter, at step S182, the object picture extracting portion 213 categorizes the click data as still clicks and moving clicks. When the flow advances from step S135 to step S137 in FIG. 38, the flow advances from step S182 to step S184 in FIG. 45. In contrast, when the flow advances from step S136 to step S137 in FIG. 38, the flow advances from step S182 to step S184 in FIG. 45.

Figure 45:
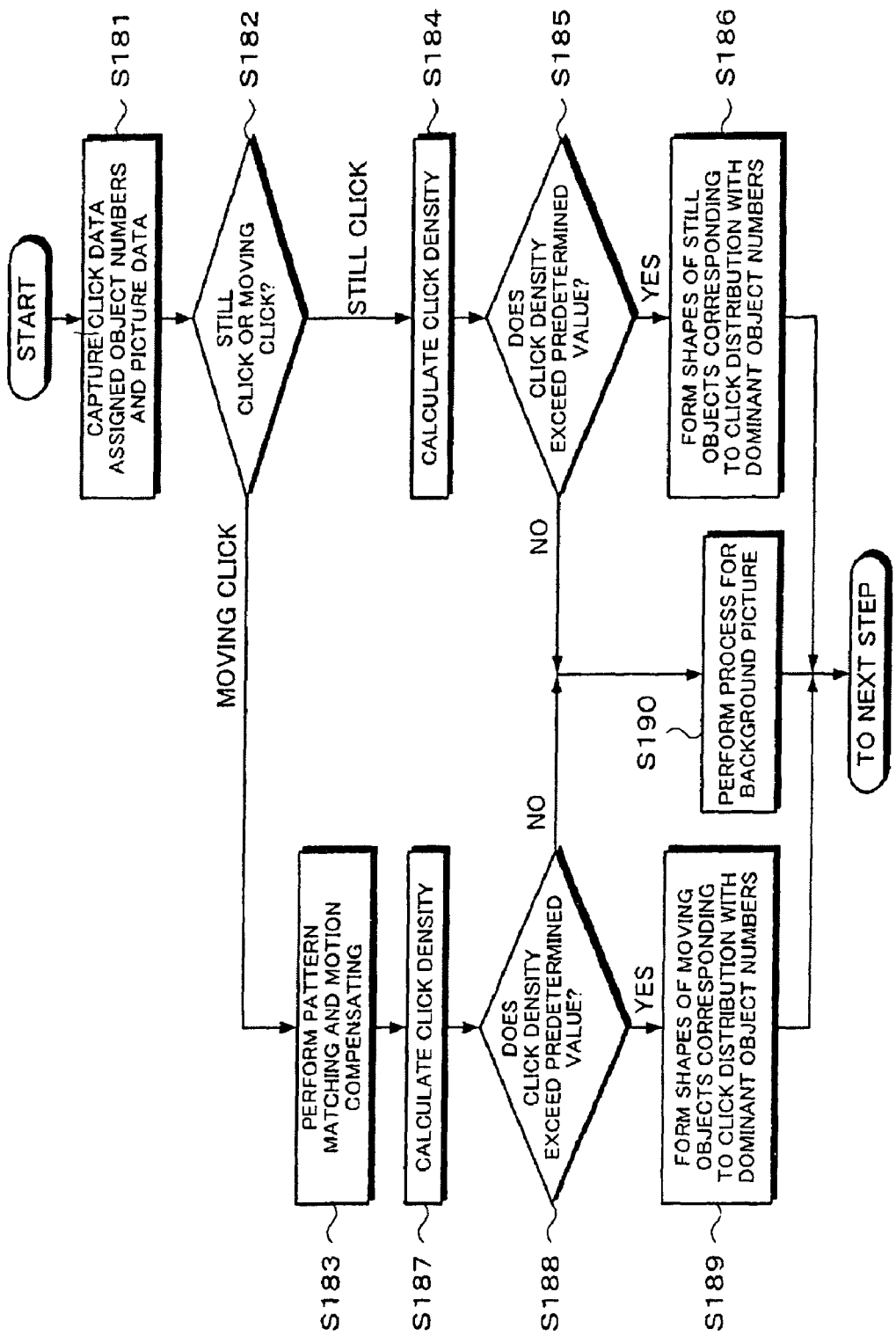
FIG. 45 is a flow chart for explaining an object extracting process.

When the flow advances from step S135 to step S137 in FIG. 38, the flow advances from step S182 to step S184 in FIG. 45. At step S184, the object picture extracting portion 213 obtains a still click data density of each still click assigned an object number for each block of 16×16 pixels.

Thereafter, at step S185, the object picture extracting portion 213 determines whether or not the still click density of still clicks denoted by X marks shown in FIG. 46 (A) for each block bk of 16×16 pixels denoted by a dotted box of the picture is equal to or larger than a predetermined value.

In a picture transmitted to the receiving apparatus 2, a picture portion with a high still click density tends to contain a still object picture. Thus, when the still click density of a particular block is equal to or larger than the predetermined value, the flow advances to step S186. In contrast, when the still click density of a particular block is smaller than the predetermined value, the flow advances to step S190.

At step S186, when the still click density of the block exceeds the predetermined value, as shown in FIG. 46 (E), the object picture extracting portion 213 obtains the most dominant object number from object numbers assigned to click data of the block. Thereafter, the object picture extracting portion 213 combines blocks (BK0, BK2, BK4, and BK5) corresponding to dominant object numbers as shown in FIG. 46 (B) and forms shapes of objects. The object picture extracting portion 213 extracts pictures in the shapes of the objects as still object pictures from the picture data. After step S186, the flow advances to step S138 shown in FIG. 38.

On the other hand, when the flow advances from step S136 to step S137 in FIG. 38, the flow advances from step S182 to step S183 in FIG. 45. At step S183, as shown in FIG. 46 (C), the object picture extracting portion 213 performs a pattern machining operation for pictures of a plurality of past frames in the vicinity of click positions assigned the same object numbers of click data as moving clicks denoted by X marks shown in FIG. 46 (C) and performs a motion compensation for the pictures corresponding to the matching result.

Thereafter, at step S187, the object picture extracting portion 213 obtains a moving click density in the pattern matched picture area.

Thereafter, at step S188, the object picture extracting portion 213 determines whether or not the moving click density of moving clicks denoted by X marks as shown in FIG. 46 (D) of the picture is equal to or larger than a predetermined value.

A picture portion that has been motion compensated and that has a high moving click density tends to contain a moving object picture. Thus, when the moving click density of a picture area that has been motion compensated is equal to or larger than the predetermined value, the flow advances to step S189. In contrast, when the moving click density of a picture area that has been motion compensated is smaller than the predetermined value, the flow advances to step S190.

At step S189, the object picture extracting portion 213 obtain the most dominant object numbers from object numbers assigned to click data for a picture area with a moving click density that is equal to or larger than the predetermined value. Thereafter, as shown in FIG. 46 (D), the object picture extracting portion 213 combines blocks (BK3 and BK6) corresponding to the dominant object numbers and forms shapes of objects. Thereafter, the object picture extracting portion 213 extracts pictures in the shapes of the objects as moving object pictures from the picture data. After step S189, the flow advances to step S138 shown in FIG. 38.

When the click density is smaller than the predetermined value at step S185 and step S188, the flow advances, to step S190. At step S190, the object picture extracting portion 213 treats a picture portion with a low still click density or a low moving click density as a background picture area of the current picture. In other, words, the object picture extracting portion 213 treats a picture portion other than a still object picture and a moving object picture that have been extracted from picture data as a background picture. After step S190, the flow advances to step S138 shown in FIG. 38.

After the object picture extracting portion 213 has extracted a still object picture, a moving object picture, and a background picture from picture data, the flow advances to step S138 shown in FIG. 38. At step S138, the object picture extracting portion 213 determines whether or not the object extracting process is completed. When the determined result at step S138 is No, the flow returns to step S131. When the determined result at step S138 is Yes, the object picture extracting portion 213 completes the object extracting process.

In the above-described process, the object extracting portion 1014 of the transmitting apparatus 1 shown in FIG. 29 can extract a still object picture, a moving object picture, and a background picture corresponding to click data corresponding to the click operation performed by the user of the receiving apparatus 2.

In the embodiment shown in FIG. 28, a plain picture area whose activity is small (namely, that does not have a significance as a picture) is treated as a background picture. For the background picture, the spatial resolution is not improved. Alternatively, a background picture may be extracted corresponding to click data transmitted from the receiving apparatus 2 so as to improve the spatial resolution thereof.

In such a case, the background picture extracting portion 1013 shown in FIG. 29 extracts a background picture corresponding to click data transmitted from the receiving apparatus 2. The transmitting process portion 1016 transmits the background picture so that the spatial resolution thereof is improved in the same manner that the spatial resolution of an object picture is improved.

In such a case, as shown in FIG. 47, the background picture flag memory 74 shown in FIG. 13 is added to the combining process portion 1022 shown in FIG. 31. The structure of the combining process portion 1022 shown in FIG. 47 is the same as the structure of the combining process portion 1022 shown in FIG. 35 except for the background picture flag memory 74. As in the structure shown in FIG. 13, in the structure shown in FIG. 47, when the background picture writing portion 71 writes a background picture with a high spatial resolution to the background picture memory 73, the background picture flag stored at an address of the background picture flag memory 74 corresponding to each pixel that composes the background picture is changed from "0" to "1". In if other words, when the background picture writing portion 71 writes background picture data to the background picture memory 73, the background picture writing portion 71 references the background picture flag memory 74. When the background picture flag is "1" (namely, when the background picture memory 73 has stored background picture data with a high spatial resolution), the background picture writing portion 71 does not write background picture data with a low spatial resolution to the background picture memory 73. Whenever background picture data is supplied to the background picture writing portion 71, the background picture data is written to the background picture writing portion 71. However, when the background picture memory 73 has stored background picture data with a high spatial resolution, the background picture writing portion 71 does not write background picture data with a low spatial resolution to the background picture memory 73. Thus, whenever, background picture data with a high spatial resolution is supplied to the background picture writing portion 71, the number of background pictures with a high spatial resolution increases in the background picture memory 73.

In the example, when the combining portion 1077 receives click data from the click data inputting portion 1024 shown in FIG. 31, the combining portion 1077 reads object picture, data and background picture data that contain the coordinate position of a considered point contained in the click data from the background picture memory 73 and the object memory 75 and supplies the obtained data to the sub window memory 79.

Next, a technology for determining (recognizing) a change of an interested object area of the user of the receiving apparatus 2 and categorizing each interested object area will be described.

Various types of pictures were analyzed to determine whether or not an interested object area of the user has changed and categorize each interested object area. The analyses show the following results.

First, an area of an interested object of a person (user) is an area unit that has a significance (for example, an object).

Second, when an interested object of the user is changed, each area unit that has a significance is changed.

Third, when an interested object of the user is changed, the input time period necessary for designating the interested object of the user (for example, click operation) tends to becomes long.

Fourth, when an interested object of the user is changed, the spatial distance between input positions at which the user designates an interested object area (for example, click operation) tends to relatively become long.

Figure 48:
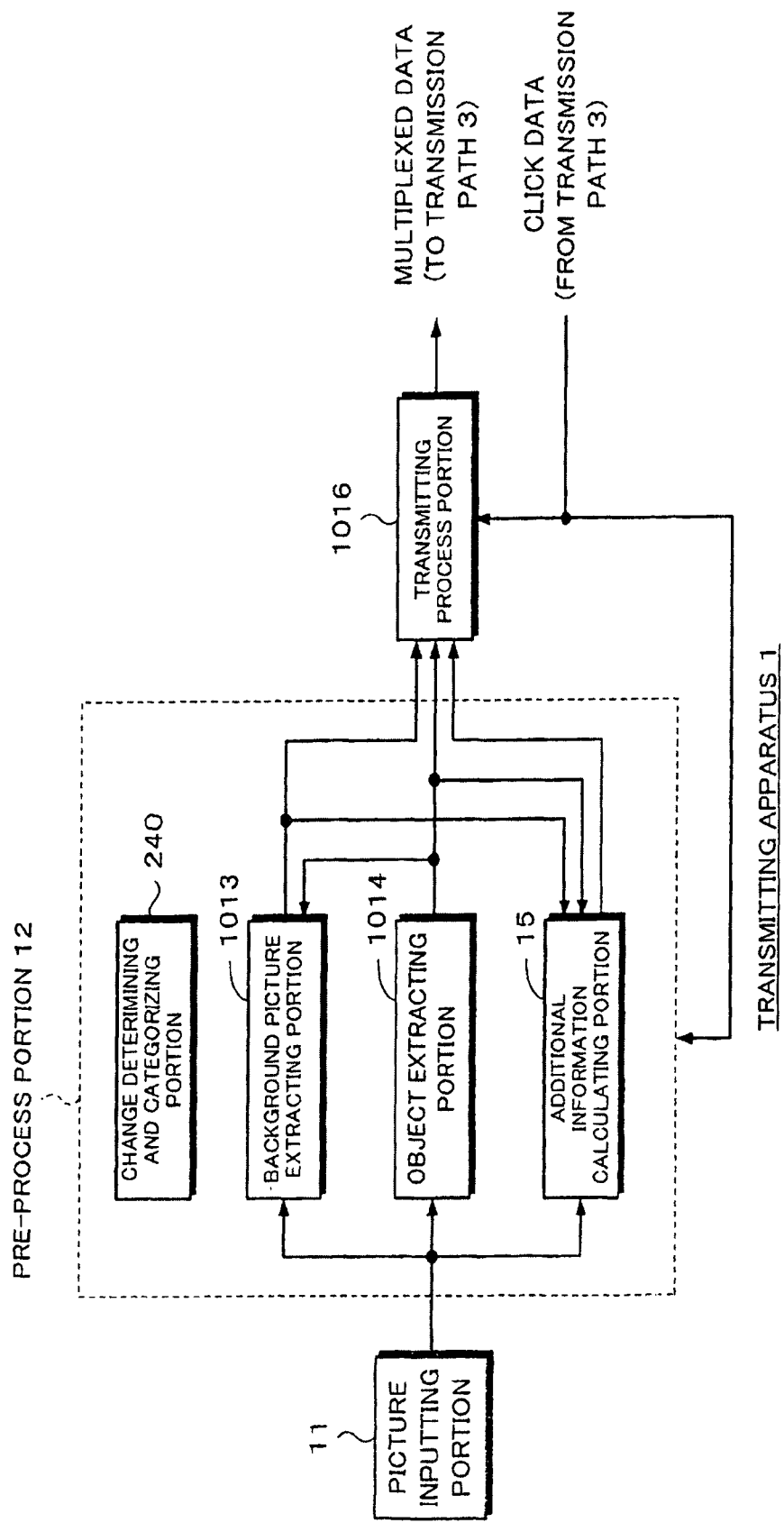
FIG. 48 is a block diagram showing an example of another structure of the transmitting apparatus 1 shown in FIG. 28.

Thus, FIG. 48 shows an example of the structure of the transmitting apparatus 1 that obtains the input time interval and the input position distance corresponding to click data that is input by the user of the receiving apparatus 2, determines whether or not an interested object area of the user of the receiving apparatus 2 has changed in consideration of the analyzed results (1) to (4), and categorizes interested object areas. The transmitting apparatus 1 shown in FIG. 48 is a modification of the transmitting apparatus 1 shown in FIG. 28. For simplicity, in FIG. 48, similar portions to those in FIG. 29 are denoted by similar reference numerals and their description is omitted. In other words, the structure of the transmitting apparatus 1 shown in FIG. 48 is basically the same as the structure of the transmitting apparatus 1 shown in FIG. 29 except that a change determining and categorizing portion 240 is newly disposed as a block that composes the pre-process portion 12.

According to the embodiment shown in FIG. 48, the change determining and categorizing portion 240 is disposed in the preprocess portion 12. Alternatively, the change determining and categorizing portion 240 may be disposed in the object extracting portion 1014 or the background picture extracting portion 1013 of the pre-process portion 12. Further alternatively, the change determining and categorizing portion 240 may be disposed independent from the pre-process portion 12.

In this embodiment, a position represented with click data is a considered point that the user is considering. A considered point of the user may be not click data. Instead, a considered point of the user may be recognized by detecting the view direction of the user.

Figure 49:
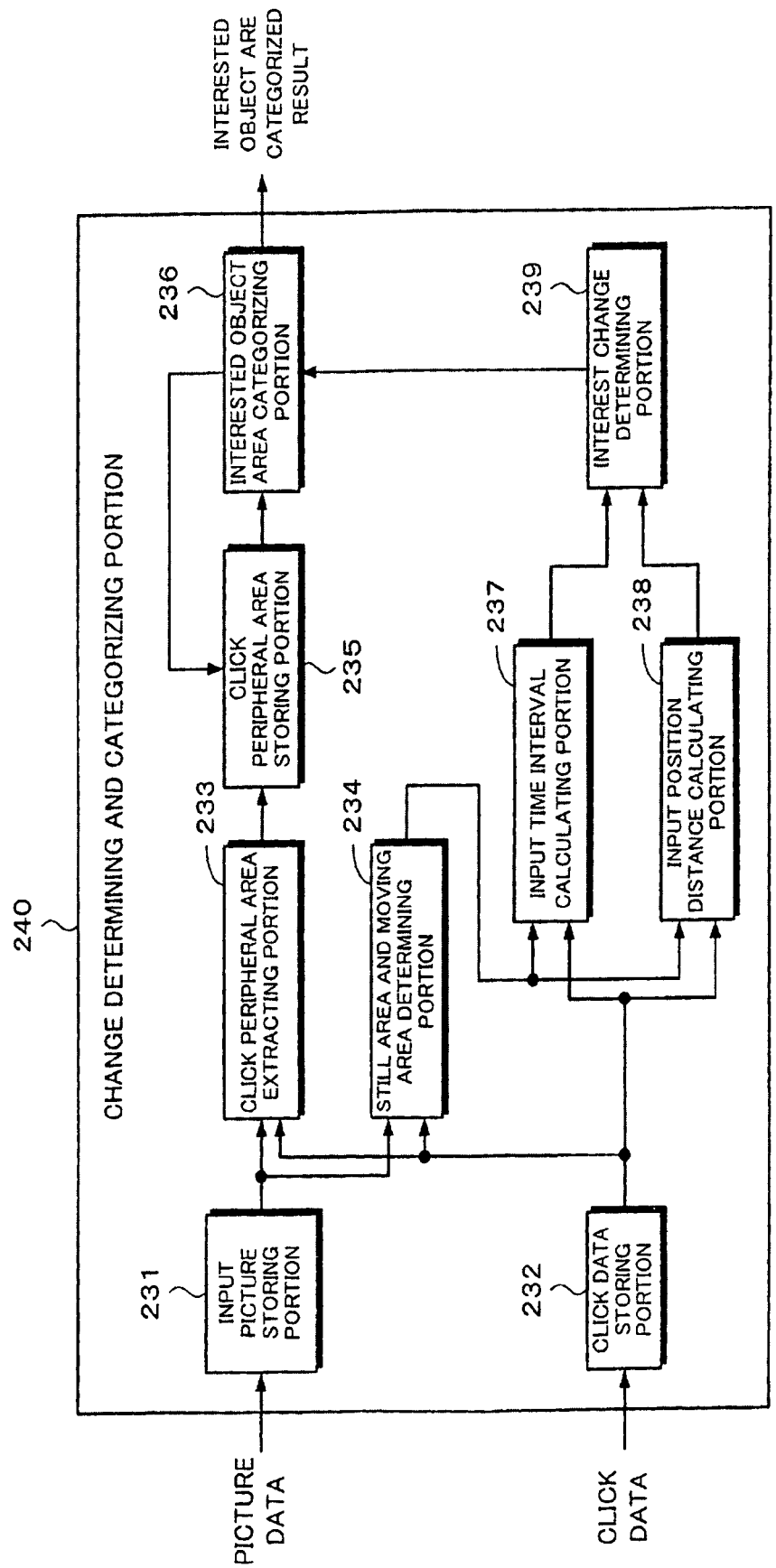
FIG. 49 is a block diagram showing an example of the structure of a change determining and categorizing portion 240 shown in FIG. 48.

FIG. 49 shows an example of the structure of the change determining and categorizing portion 240 shown in FIG. 48.

An input picture storing portion 231 temporarily stores picture data that is output by the picture inputting portion 11. When necessary, the input picture storing portion 231 supplies the picture data to a click peripheral area extracting portion 233 and a still area and moving area determining portion 234.

A click data obtaining portion 230 temporarily stores click data transmitted from the receiving apparatus 2 through the transmission path 3 and supplies the stored click data to the click peripheral area extracting portion 233, the still area and moving area determining portion 234, an input time interval calculating portion 237, and an input position distance calculating portion 238.

In this embodiment, the input picture storing portion 231 may be disposed in common with the picture memory 201 shown in FIG. 37. In addition, a click data storing portion 232 may be disposed in common with the click data memory 202 shown in FIG. 37.

The click peripheral area extracting portion 233 extracts a picture area corresponding to click data supplied from the click data storing portion 232 from the picture data supplied from the input picture storing portion 231 (the picture area is for example a local small block around the click position; hereinafter, the picture area may be referred to as click peripheral area). Data of the click peripheral area extracted by the click peripheral area extracting portion 233 is sent to a click peripheral area storing portion 235. After the data is stored to the click peripheral area storing portion 235, the data is sent to an interested object area categorizing portion 236.

In addition, the still area and moving area determining portion 234 performs a still area and moving area determination using the difference between frames in the same manner as the embodiment shown in FIG. 37 corresponding to the picture data supplied from the input picture storing portion 231 and the click data supplied from the click data storing portion 232.

The click peripheral area extracting process and the still area and moving area determining process can be accomplished by the same processes described with reference to FIG. 38. Thus, the detailed description of those processes is omitted. In the embodiment shown in FIG. 49, a result of which click data is determined as a still click or a moving click is output as a still area and moving area determination in the same manner as the above-described embodiment. In addition, for example, a result of which a click peripheral area is determined as a still area or a moving area may be output. According to the embodiment shown in FIG. 49, for simplicity, as a result of a still area and moving area determination, the case of which a still click or a moving click is output will be described.

The still area and moving area determined. result of the still area and moving area determining portion 234 is sent to the input time interval calculating portion 237 and the input position distance calculating portion 238.

When the still area and moving area determined result represents that click data is a still click, the input time interval calculating portion 237 calculates the time interval between the input time of the immediately preceding still click and the input time of the current still click. In this case, the time interval is calculated regardless of whether or not for example a moving click takes place between the input time of the immediately preceding still click and the input time of the current still click. Data of the time interval calculated by the input time interval calculating portion 237 is sent to an interest change determining portion 239.

When the still area and moving area determined result represents that click data is a still click, the input position distance calculating portion 238 calculates the spatial distance between the input click position (coordinate position) of the immediately preceding still click and the input click position (coordinate position) of the current still click. In this case, the spatial distance is calculated regardless of whether or not there is an input position of for example a moving click between the input position of the current still click and the input position of the immediately preceding still click. The data of the spatial distance calculated by the input position distance calculating portion 238 is sent to the interest change determining portion 239.

When the still area and moving area determined result represents that click data is a still click, the interest change determining portion 239 determines whether or not an interested object of the user has changed corresponding to the time interval calculated by the input time interval calculating portion 237 and the spatial distance calculated by the position distance calculating portion 238. In other words, the interest change determining portion 239 performs a predetermined weighting process for the time interval and the spatial distance, determines whether or not the weighted time interval exceeds a predetermined threshold value (time), and determines whether or not the weighted spatial distance exceeds a predetermined threshold value (distance). When the weighted time interval exceeds the predetermined threshold value and/or the weighted spatial distance exceeds the predetermined threshold value, the interest change determining portion 239 determines that the interested object of the user has changed. The interest change determining portion 239 transmits the interested object change determined result to the interested object area categorizing portion 236.

When the determined result of the interest change determining portion 239 represents that the interested object of the user has not changed, the interested object area categorizing portion 236 determines that the click peripheral area of the current still click is contained in the same picture area as an interested object area corresponding to the click peripheral area of the immediately preceding (past) still click, categorizes the click peripheral area of the current still click as the same interested object area as the click peripheral area of the immediately preceding still click (for example, assigns the same category number to the click peripheral area of the current still click), and outputs the categorized result. In other words, when an interested object area is categorized for each object, the same object number is assigned in the same manner as the above-described embodiment.

In contrast, when the determined result of the interest change determining portion 239 represents that the interested object of the user has changed, the interested object area categorizing portion 236 determines that the click peripheral area of the current still click is not contained in the interested object area corresponding to the click peripheral area of the immediately preceding (past) still click, outputs the stored data of the click peripheral picture of the current still click, and resets the data that has been stored in the click peripheral area storing portion 235. Thereafter, the interested object area categorizing portion 236 categorizes the click peripheral area of the current still click as an interested object area that is different from the click peripheral area of the immediately preceding still click (for example, assigns a different category number to the click peripheral area of the current still click). In other words, when an interested object area is categorized form each object, a new different object number is assigned in the same manner as the above-described case.

When the still area and moving area determined result represents that click data is a moving click, likewise, the input time interval calculating portion 237 calculates the time interval between the input time of the immediately preceding moving click and the input time of the current moving click. In this case, the time interval is calculated regardless of whether or not for example a still click takes place between the input time of the current moving click and the input time of the immediately preceding moving click. The data of the time interval calculated by the input time interval calculating portion 237 is sent to the interest change determining portion 239.

In contrast, when the determined result of the still area and moving area determined result represents that click data is a moving click, likewise, the in position distance calculating portion 238 calculates the spatial distance between the input click position of the immediately preceding moving click and the input click position of the current moving click. In this case the spatial distance is calculated regardless of whether or not for example there is an input position of a still click between the input position of the current moving click and the input position of the immediately preceding moving click. The data of the spatial distance calculated by the input position distance calculating portion 238 is sent to the interest change determining portion 239.

In addition, the interest change determining portion 239 determines whether or not the interested object of the user has changed corresponding to the time interval calculated by the input time interval calculating portion 237 and the spatial distance calculated by the position distance calculating portion 238 in the case that the still area and moving area determined result represents that the click data is a moving click. In other words, the interest change determining portion 239 performs a predetermined weighting process for the time interval and the spatial distance, determines whether or not the weighted time interval exceeds a predetermined threshold value (time), and determines whether or not the weighted spatial distance exceeds a predetermined threshold value (distance). When the weighted time interval exceeds the predetermined threshold value and/or the weighted spatial distance exceeds the predetermined threshold value, the interest change determining portion 239 determines that the interested object of the user has, changed. The interested object change determined result of the interest change determining portion 239 is sent to the interested object area categorizing portion 236.

When the determined result of the interest change determining portion 239 represents that the interested object of the user has not changed, the interested object area categorizing portion 236 determines that the click peripheral area of the current moving click is contained in the same picture area as the interested object area corresponding to the click peripheral area of the immediately preceding (past) moving click, categorizes the click peripheral area of the current moving click as the same interested object area as the click peripheral area of the immediately preceding (old) moving click (namely, assign the same category number to the click peripheral area of the current moving click), and outputs the categorized result. In other words, when an interested object area is categorized for each object, the same object number is assigned.

In contrast, when the determined result of the interest change determining portion 239 represents that the interested object of the user has changed, the interested object area categorizing portion 236 determines that the click peripheral area of the current moving click is not contained in the interested object area corresponding to the click peripheral area of the immediately preceding (past) moving click, outputs the stored data of the click peripheral picture of the current moving click, and resets the data that has been stored in the click peripheral area storing portion 235. Thereafter, the interested object area categorizing portion 236 categorizes the click peripheral area of the current moving click as an interested object area that is different from the click peripheral area of the immediately preceding moving click (namely, assigns a different category number to the click peripheral area of the current moving click). In other words, when an interested object area is categorized for each object, a new different object number is assigned.

Figure 50A:
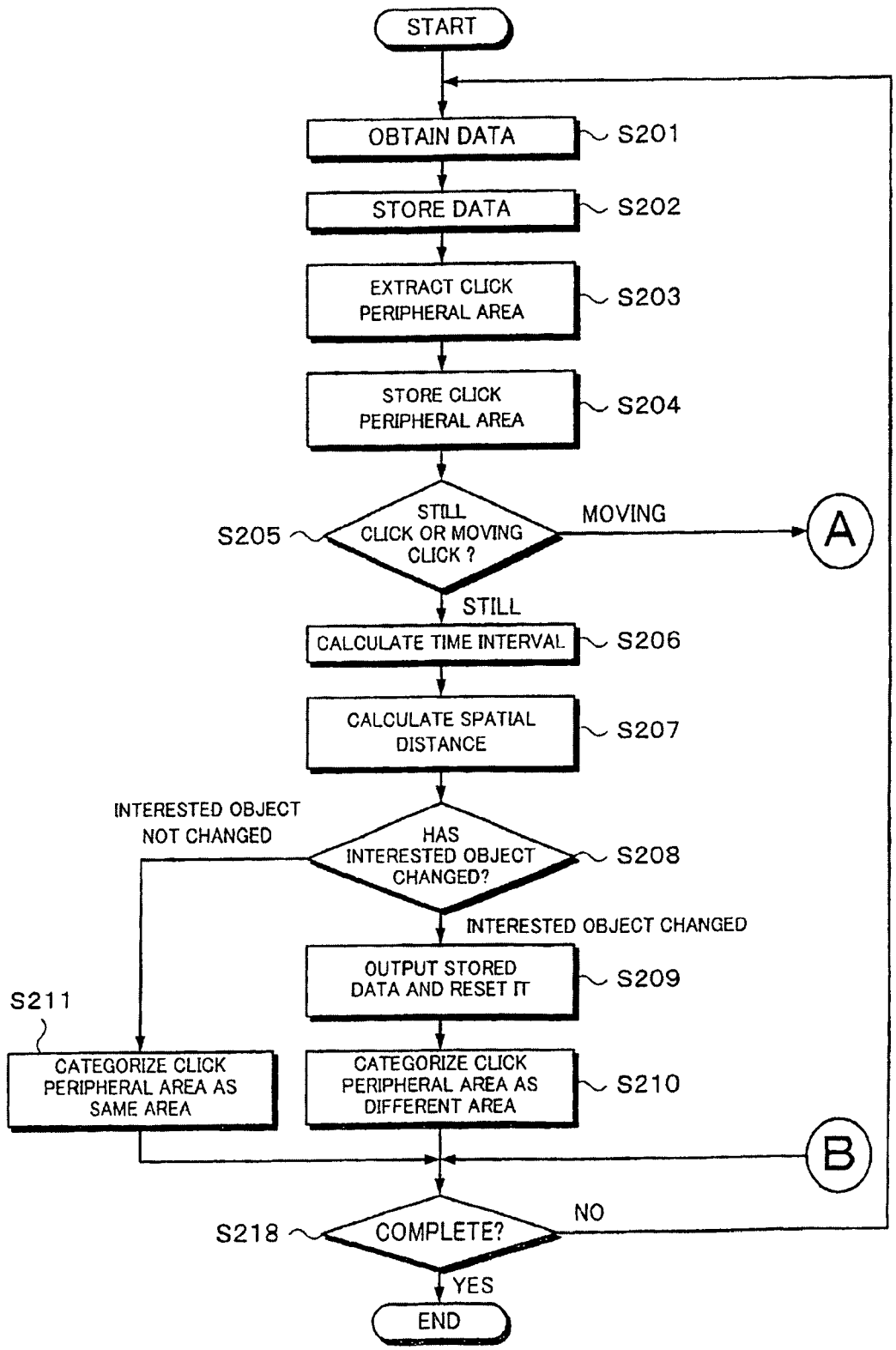
FIG. 50 is a flow chart for explaining the interested object area changing process and the interested object area categorizing process of the change determining and categorizing portion 240.
Figure 50B:
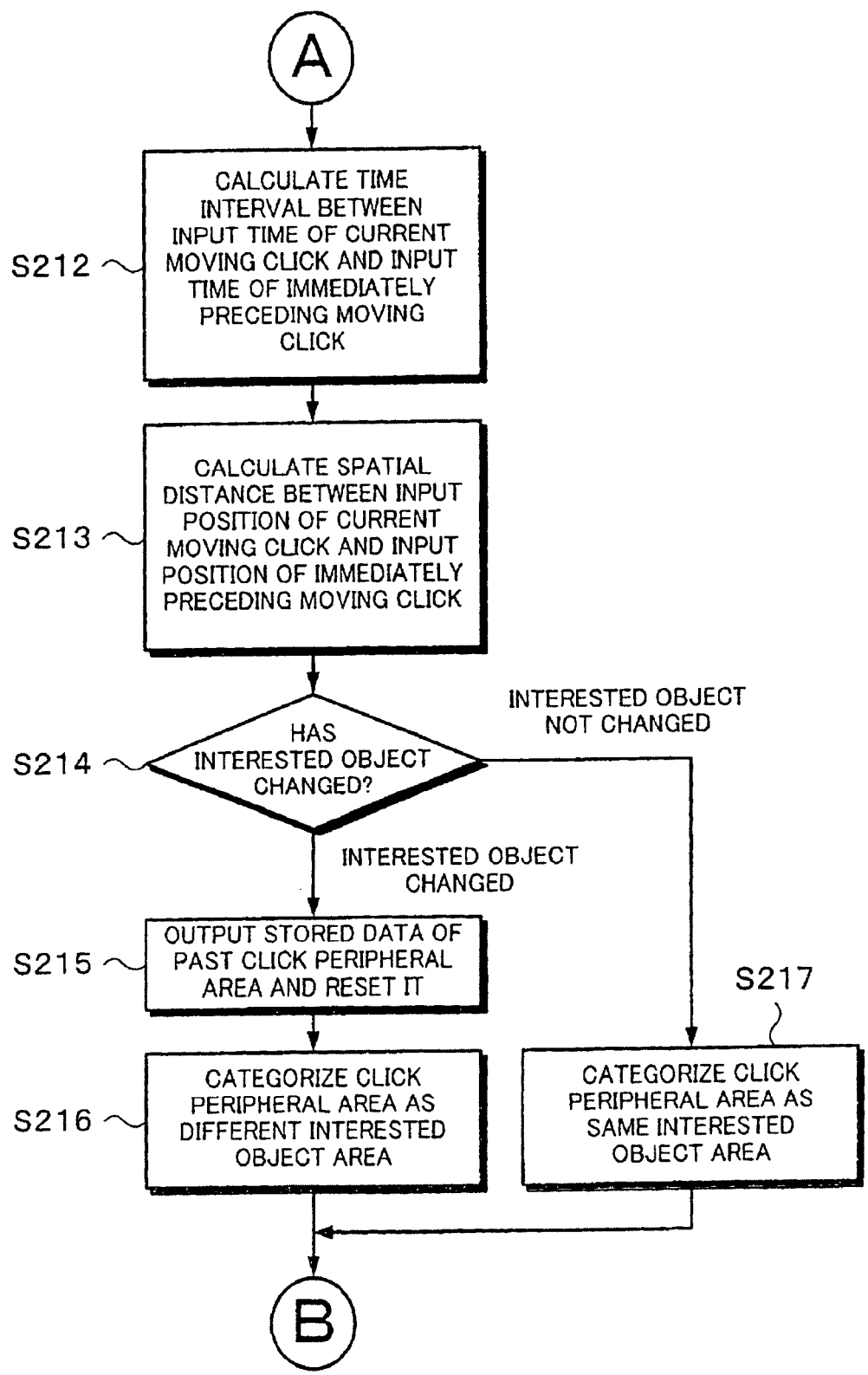

Next, with reference to a flow chart shown in FIG. 50, the process of the change determining and categorizing portion 240 shown in FIG. 49 will be described.

At step S201, the change determining and categorizing portion 240 receives picture data from the picture inputting portion 11 and click data that has been input by the user of the receiving apparatus 2.

Thereafter, at step S202, the picture data that is supplied from the picture inputting portion 11 is stored to the input picture storing portion 231. The click data obtained by the click data obtaining portion 230 is stored to the click data storing portion 232.

Thereafter, at step S203, the click peripheral area extracting portion 233 extracts a picture area (click peripheral area) corresponding to the click data from the picture that has been stored and read from the input picture storing portion 231. At step S204, the click peripheral area storing portion 235 stores data of the click peripheral area that has been extracted.

Thereafter, at step S205, the still area and moving area determining portion 234 performs a still area and moving area determination using the difference between frames in the above-described manner.

At step S205, when the determined result at step S205 represents that click data is a still click, the flow advances to step S206. In contrast, when the determined result at step S205 represents that click data is a moving click, the flow advances to step S212.

When the determined result at step S205 represents that click data is a still click, the flow advances to step S206. At step S206, the input time interval calculating portion 237 calculates the time interval between the input time of the immediately preceding still click and the input time of the current still click. The time interval is calculated regardless of whether or not there is for example a moving click between the input time of the current still click and the input time of the immediately preceding still click.

Thereafter, at step S207, the input position distance calculating portion 238 calculates the spatial distance between the input click position (coordinate position) of the immediately preceding still click and the input click position (coordinate position) of the current still click. In this case, the spatial distance is calculated regardless of whether or not there is for example an input position of a moving click between the input position of the current still click and the input position of the immediately preceding still click.

At step S208, the interest change determining portion 239 determines whether or not the interested object of the user has changed corresponding to the time interval calculated at step S206 and the spatial distance calculated at step S207. In other words, as was described above, the interest change determining portion 239 performs a predetermined weighting process for the time interval and the spatial distance, determines whether or not the weighted time interval exceeds a predetermined threshold value (time), and determines whether or not the weighted spatial distance exceeds a predetermined threshold value (distance). When the weighted time interval exceeds the predetermined threshold value and/or the weighted spatial distance exceeds the predetermined threshold value, the interest change determining portion 239 determines that the interested object of the user has changed. When the determined result at step S208 represents that the interested object has changed, the flow advances to step S209.

When the determined result at step S209 represents that the interested object has not changed, the flow advances to step S211.

When the determined result at step S208 represents that the interested object of the user has not changed, the flow advances to step S211. At step S211, the interested object area categorizing portion 236 determines that the click peripheral area of the current still click is contained in the picture area that is the same as the interested object area corresponding to the click peripheral area of the immediately preceding (old) still click and categorizes the click peripheral area of the current still click as the same interested object area as the click peripheral area of the immediately preceding still click (namely, assigns the same category number to the click peripheral area of the current still click). In other words, when an interested object area is categorized for each object, the same object number is assigned in the same manner as the above-described embodiment. After step 211, the flow advances to step S218.

In contrast, when the determined result at step S208 represents that the interested object of the user has changed, the flow advances to step S209. At step S209, the interested object area categorizing portion 236 determines that the click peripheral area of the current still click is not contained in the interested object area corresponding to the click peripheral area of the immediately preceding (old) still click, outputs the stored data of the click peripheral picture of the current still click, and resets the stored data. Thereafter, at step S210, the interested object area categorizing portion 236 categorizes the click peripheral area of the current still click as a different interested object area from the click peripheral area of the immediately preceding still click (for example, assigns a different category number to the click peripheral area of the current still click). In other words, when an interested object area is categorized for each object, a new different object number is assigned in the same manner as the above-described embodiment. After step S211, the flow advances to step S218.

In contrast, when the determined result at step S205 represents click data is a moving click, the flow advances to step S212. At step S212, the interest change determining portion 239 calculates the time interval between the input time of the immediately preceding moving click and the input time of the current moving click. In this case, the time interval is calculated regardless of whether or not there is for example a still click between the input time of the current moving click and the input time of the immediately preceding moving click.

Thereafter, at step S213, the interest change determining portion 239 calculates the spatial distance between the input click position of the immediately preceding moving click and the input click position of the current moving click. In this case, the special distance is calculated regardless of whether or not there is for example an input position of a still click between the input position of the current moving click and the input position of the immediately preceding moving click.

Thereafter, at step S214, the interest change determining portion 239 determines whether or not the interested object of the user has changed corresponding to the time interval calculated at step S212 and the spatial distance calculated at step S213. In other words, the interest change determining portion 239 performs a predetermined weighting process for the time interval and the special distance, determines whether or not the weighted time interval exceeds a predetermined threshold value (time), and determines whether or not the weighted spatial distance exceeds a predetermined threshold value (distance). When the weighted time interval exceeds the predetermined threshold value and/or the weighted spatial distance exceeds the predetermined threshold value, the interest change determining portion 239 determines that the interested object of the user has changed. When the determined result at step S214 represents that the interested object has changed, the flow advances to step S215. When, the determined result at step S214 represents that the interested object has not changed, the flow advances to step S217.

When the determined result at step S214 represents that the interested object of the user has not changed the flow advances to step S217. At step S217, as was described above, the interested object area categorizing portion 236 determines that the click peripheral area of the current moving click is contained in the same picture area as the interested object area corresponding to the click peripheral area of the immediately preceding (past) moving click and categorizes the click peripheral area of the current moving click as an interested object area corresponding to the click peripheral area of the immediately preceding moving click (for example, assigns the same category number to the click peripheral area of the current moving click). In other words, when an interested object area is categorized for each object, the same object number is assigned in the same manner as the above-described embodiment. After step S217, the flow advances to step S218.

In contrast, when the determined result at step S214 represents that the interested object of the user has changed, the flow advances to step S215. At step S215, the interested object area categorizing portion 236 determines that the click peripheral area of the current moving click is not contained in an interested object area corresponding to the click peripheral area of the immediately preceding (past) moving click, outputs the stored data of the click peripheral picture of the current moving click, and resets the stored data. Thereafter, at step S216, the interested object area categorizing portion 236 categorizes the click peripheral area of the current moving click as an interested object area that is different from the click peripheral area of the immediately preceding moving click (for example, assigns a different category number to the click peripheral area of the current moving click). In other words, when an interested object area is categorized for each object, a new different object number is assigned in the same manner as the above-described embodiment. After step S216, the flow advances to step S218.

After steps S210, S211, S216, and S217, the flow advances to step S218. At step S218, the change determining and categorizing portion 240 determines whether or not all the process has been completed. When the determined result at step S218 is No, the flow returns to step S201. When the determined result at step S218 is Yes, the change determining and categorizing portion 240 completes the process shown in FIG. 50.

Figure 51:
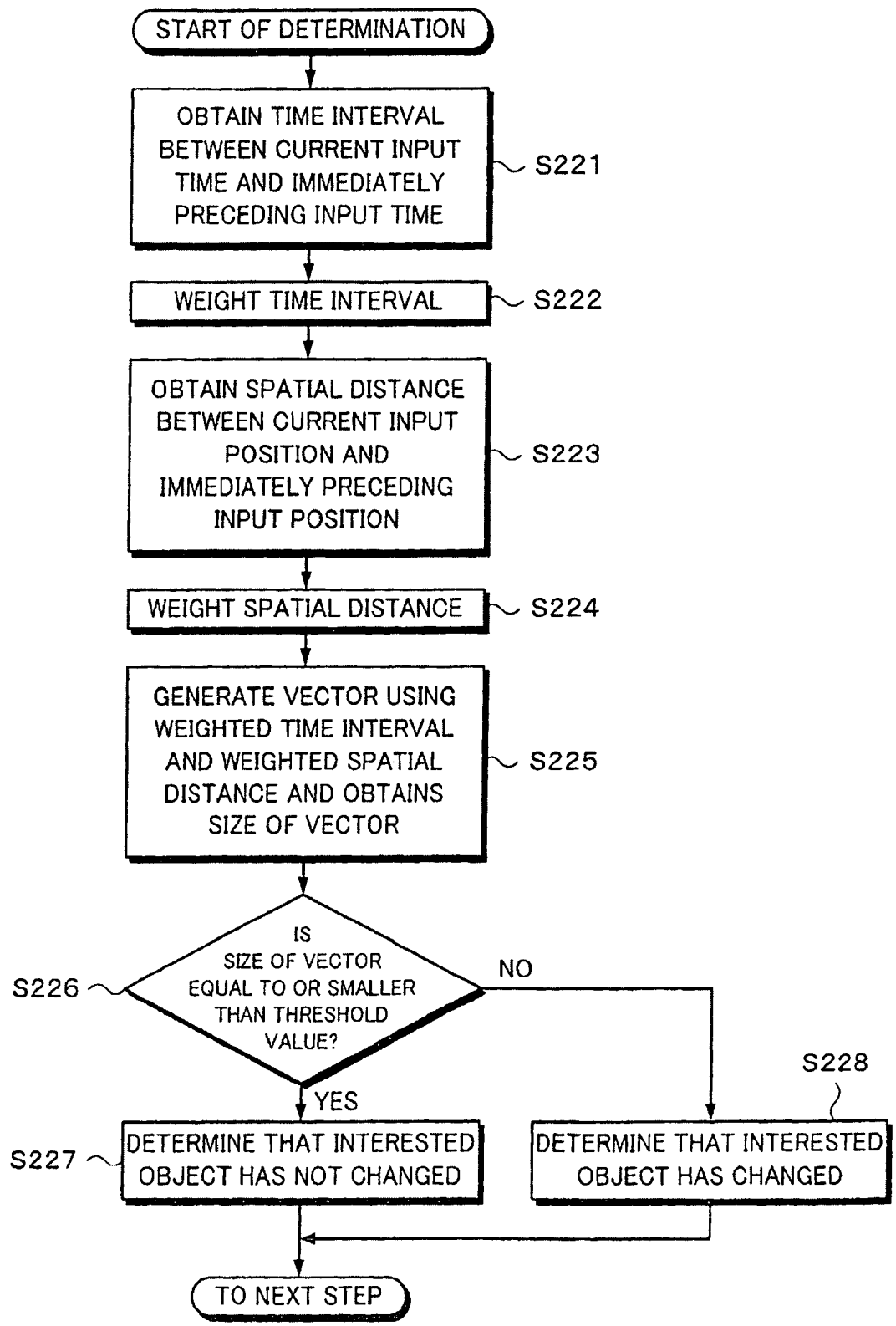
FIG. 51 is a flow chart for explaining the interest change determining process.

Next, with reference to a flow chart shown in FIG. 51, the interested object change determining process at steps S208 and S214 shown in FIG. 50 will be described in detail.

At step S221, the interest change determining portion 239 obtains information of the time interval. Thereafter, at step S222, the interest change determining portion 239 performs a predetermined weighting process for the time interval. At step S223, the interest change determining portion 239 obtains information of the spatial distance. Thereafter, at step S224, the interest change determining portion 239 performs a predetermined weighting process for the spatial distance. The order of step S221 and step S222 may be changed. Likewise, the order of step S223 and S224 may be changed. The weighting process for the time interval may be performed by compressing the time unit (for example, a compression of ms/10). The weighting process for the spatial distance may be performed by compressing the pixel, pitch in the horizontal direction and the vertical direction.

Thereafter, the flow advances to step S225. At step S225, the interest change determining portion 239 generates a three-dimensional vector using the weighted time interval (t) and the weighted spatial distance in the horizontal and vertical directions (x coordinate and y coordinate) and obtains the size of the three-dimensional vector. The size of the three-dimensional vector is obtained by calculating the Euclidean distance between the current input point and the immediately preceding input point in the three-dimensional space of which the time axis (t) is added to the x coordinate axis and y coordinate axis of the input position of click data. After step S225, the flow advances to step S226.

At step S226, the interest change determining portion 239 determines whether or not the size of the three-dimensional vector obtained at step S225 exceeds a predetermined threshold value. When the determined result at step S226 represents that the size of the three-dimensional vector does not exceed the predetermined threshold value, the flow-advances to step S227. At step S227, the interest change determining portion 239 determines that the interested object of the user of the receiving apparatus 2 has not changed. When the size of the three-dimensional vector exceeds the predetermined threshold value, the flow advances to step S228. At step S228, the interest change determining portion 239 determines that the interested object of the user has changed.

In the above-described manner, the change determining and categorizing portion 240 accomplishes the user's interested object change determination and the categorization thereof corresponding to click data transmitted form the receiving apparatus 2.

In addition, when an interested object area of the user of the receiving apparatus 2 is categorized, the categorized interested object area can be optimally processed. In other words, an information amount assigned to each interested object area of the user may be varied. For example, a large information amount may be assigned to a particular interested object area of the user. Alternatively, data of an interested object area of the user may be transmitted with priority.

In addition, a picture area that is read (output) for an interested object area 236 from the click peripheral area storing portion 235 can be transmitted so that the spatial resolution is improved as was described above.

In this case, even if the user of the receiving apparatus 2 mistakenly clicks a non-interested object area, it can be prevented from being incorrectly determined.

According to the embodiment, even if one object that has a significance as an interested object area is spatially or temporally separated from another object, they can be categorized as one object. In addition, an area that has a particular significance other than an object such as a substance may be extracted.

In addition, the embodiment described with reference to FIGS. 37 to 46 and the embodiment described with reference to FIGS. 49 to 51 may be combined. In this case, at steps S206 and S207, a continuous click is determined for a still click for a continuous click in the above-described manner. Likewise, at steps S212 and S213, a continuous click is determined for a moving click for a continuous click in the above-described manner.

Figure 52:
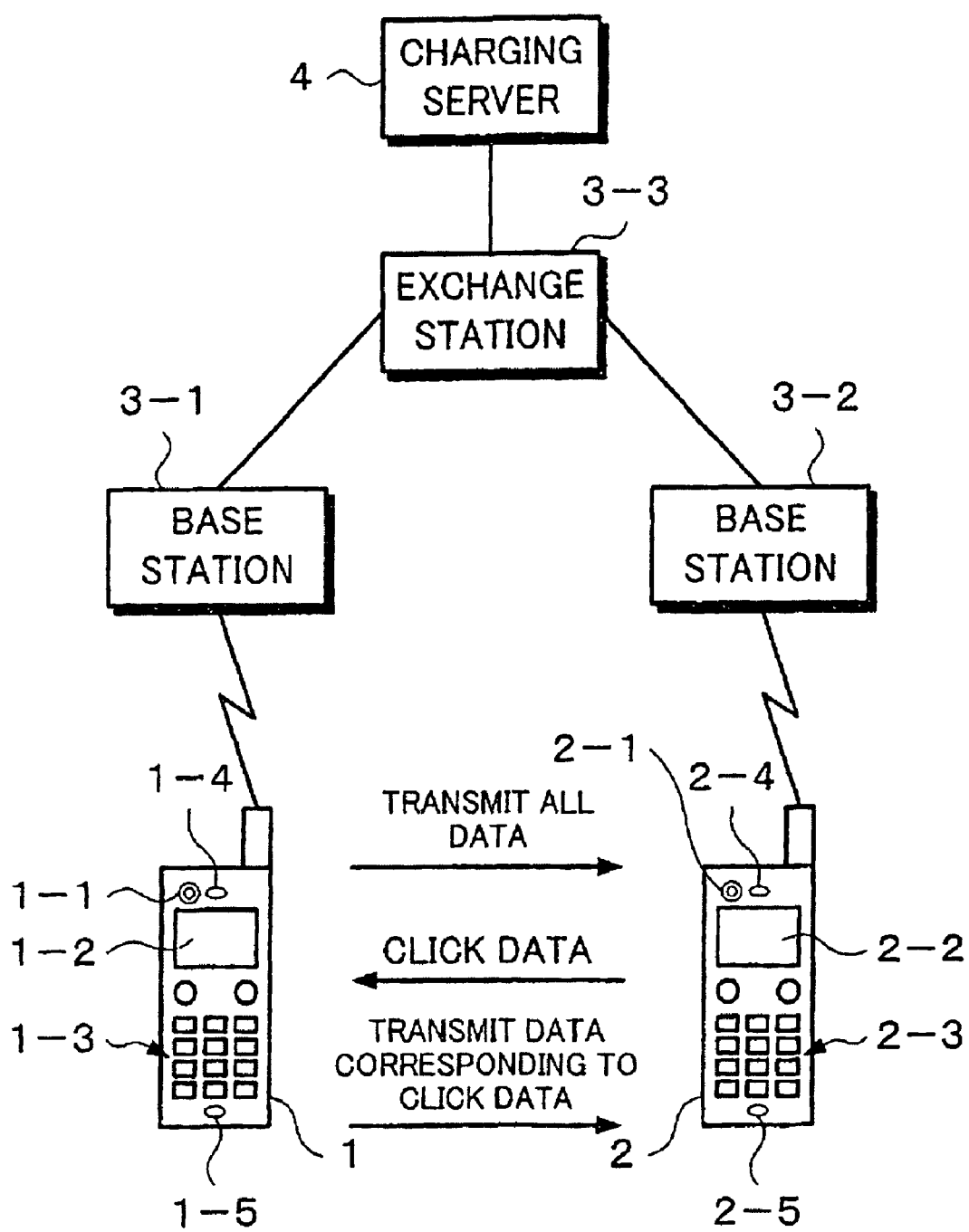
FIG. 52 is a schematic diagram showing a detailed example of a third structure of the transmitting system shown in FIG. 1.

Next, FIG. 52 shows an example of a third structure of the picture transmitting system shown in FIG. 1. In FIG. 52, similar portions to those in FIG. 28 are denoted by similar reference numerals and their description is omitted. In other words, the structure of the picture transmitting system shown in FIG. 52 is basically the same as the structure of the picture transmitting system shown in FIG. 28 except that the exchange station 3-3 has a charging server 4.

Although a service for transmitting click data (or control information) from the receiving apparatus 2 to the transmitting apparatus 1 and providing a picture having an improved spatial resolution corresponding to click data from the transmitting apparatus 1 to the receiving apparatus 2 (hereinafter, this service may be referred to as click service) may be a free server, the service may be a non-free service. When the click service is a non-free service, the charging server 4 performs a charging process for collecting a service fee for the click service from the user.

Figure 53:
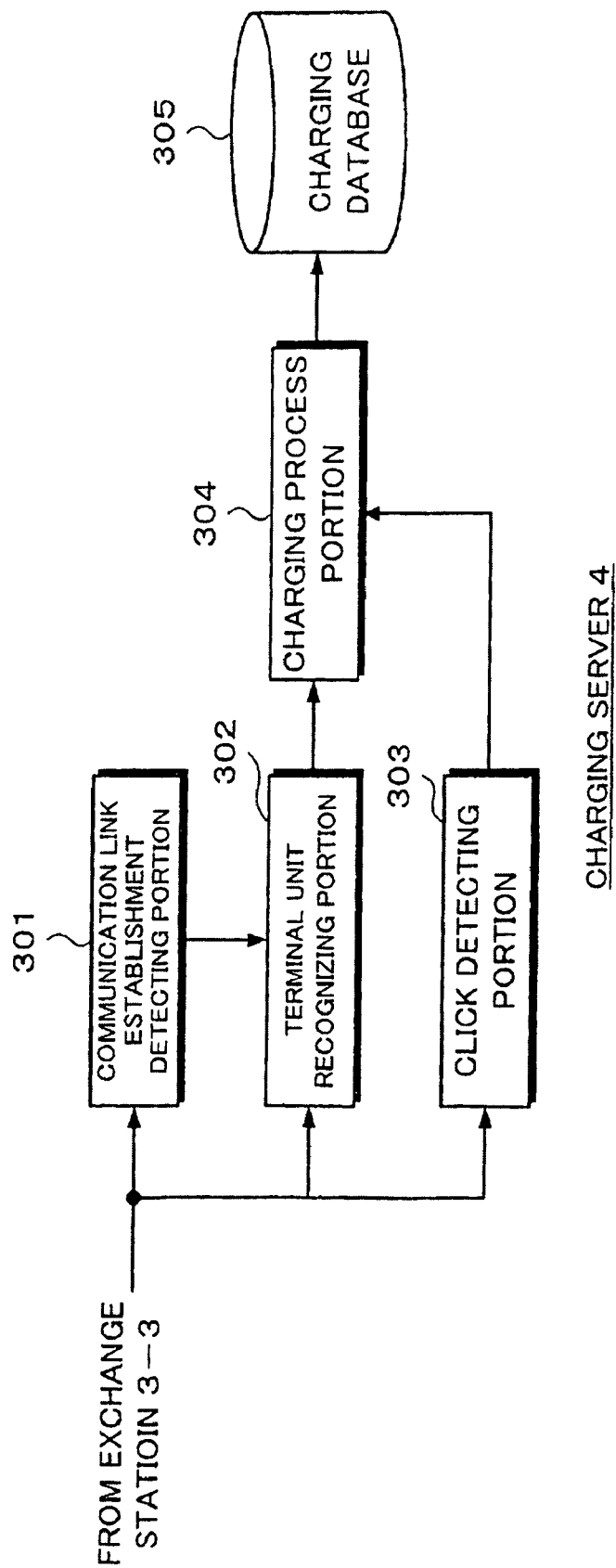
FIG. 53 is a block diagram showing an example of the structure of a charging server 4 shown in FIG. 52.

In other words, FIG. 53 shows an example of the structure of the charging server 4 shown in FIG. 52.

Predetermined information is supplied from the exchange station 3-3 to a communication link establishment detecting portion 301. The communication link establishment detecting portion 301 references the information supplied from the exchange station 3-3. As a result, the communication link establishment detecting portion 301 detects whether or not a communication link has been established between a terminal unit 1 as a transmitting apparatus and a terminal unit 2 as a receiving apparatus and supplies the resultant data to a terminal unit recognizing portion 302.

When the terminal unit recognizing portion 302 receives information that represents that a communication link has been established between the terminal units such as the transmitting apparatus 1 and the receiving apparatus 2 (hereinafter, this information may be referred to as communication link establishment information), the terminal unit recognizing portion 302 references information supplied from the exchange station 3-3. As a result, the terminal unit recognizing portion 302 recognizes the terminal units that have been communication linked. In addition the terminal unit recognizing portion 302 recognizes IDs assigned to the terminal units (hereinafter, the IDs may be referred to as terminal unit IDs) and supplies the recognized terminal unit IDs to a click detecting portion 303.

The click detecting portion 303 monitors data received through the exchange station 3-3, detects click data transmitted from the terminal unit with, a terminal unit ID received from the terminal unit recognizing portion 302, and supplies the detected result and the terminal unit ID to a charging process portion 304.

In this case, for example, the receiving apparatus 2 transmits click data along with the local terminal unit ID. The click detecting portion 303 compares the terminal unit ID added to the click data received through the exchange station 3-3 and the terminal unit ID supplied from the terminal unit recognizing portion 302, recognizes the click data transmitted from the terminal unit that has been communication linked, and detects the click data.

Hereinafter, a set of a click data detected result of the click detecting portion 303 and a terminal unit ID is referred to as click detection information.

When the charging process portion 304 receives the click detection information from the click detecting portion 303, the charging process portion 304 updates the stored content of a charging database 305. In addition, the charging process portion 304 performs the charging process corresponding to the stored content of the charging database 305, for example, periodically (for example, once per month).

The charging database 305 stores information necessary for the charging process.

Figure 54:
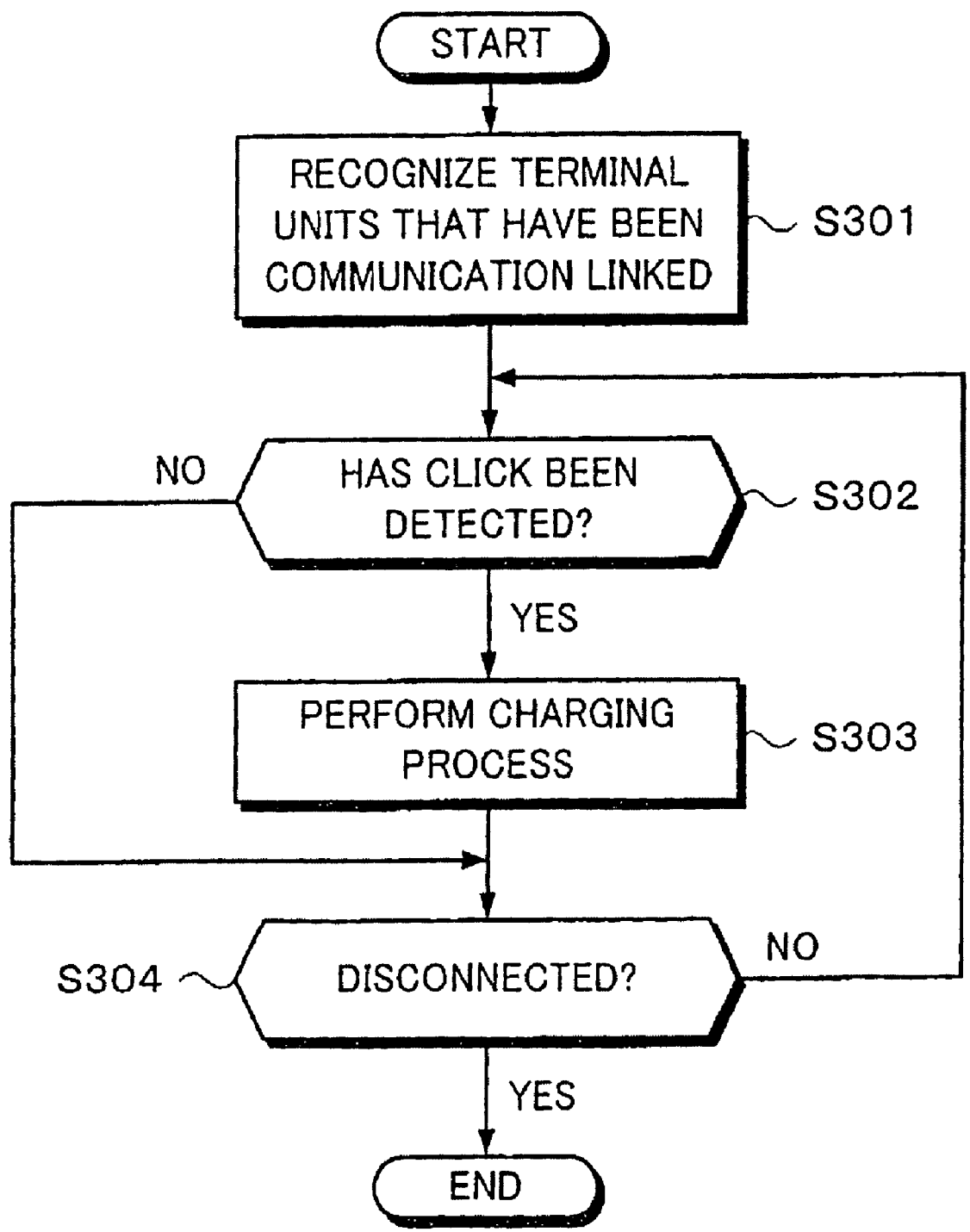
FIG. 54 is a flow chart for explaining the process of the charging server 4 shown in FIG. 53.

Next, with reference to a flow chart shown in FIG. 54, the process of the charging server 4 shown in FIG. 53 will be described.

The communication link establishment detecting portion 301 monitors whether or not a communication link between terminal units has been established corresponding to information supplied from the exchange station 3-3. When the communication link establishment detecting portion 301 detects that the communication link between the transmitting apparatus 1 and the receiving apparatus 2 has been established, the communication link establishment detecting portion 301 supplies communication link establishment information to the terminal unit recognizing portion 302.

When the terminal unit recognizing portion 302 receives the communication link establishment information from the communication link establishment detecting portion 301, at step S301, the terminal unit recognizing portion 302 references the information supplied from the exchange station 3-3. As a result, the terminal unit recognizing portion 302 recognizes the terminal unit IDs of the terminal units (for example, the transmitting apparatus 1 and the receiving apparatus 2) that have been communication linked and supplies the terminal unit IDs to the click detecting portion 303.

When the click detecting portion 303 receives the terminal unit IDs from the terminal unit recognizing portion 302, the click detecting portion 303 starts detecting click data that contains the terminal unit IDs.

Thereafter, the flow advances to step S302. At step S302, the charging process portion 304 determines whether or not click data has been detected from a terminal unit that has been communication linked. When the determined result at step S302 represents that click data has not been detected from a terminal unit that has been communication linked (namely, when the click detection information has not been supplied from the click detecting portion 303 to the charging process portion 304), the flow advances to step S304, skipping step S303.

In contrast, when the determined result at step S302 represents that click data has been detected from a terminal unit that has been communication linked (namely, the click detection information has been supplied from the click detecting portion 303 to the charging process portion 304), the flow advances to step S303. At step S303, the charging process portion 304 updates the stored content of the charging database 305.

In other words, the charging database 305 stores information about clicks such as the number of clicks and click time (hereinafter, this information may be referred to as click information) along with communication time at which a terminal unit originates a call and starts a communication. The charging database 305 correlatively stores the click information and the terminal unit ID of the terminal unit. At step S303, the charging process portion 304 updates the click information corresponding to the terminal unit ID contained in the click detection information corresponding to the click detection information.

After step S303, the flow advances to step S304. At step S304, the terminal unit recognizing portion 302 determines whether or not the communication link corresponding to the communication link establishment information supplied from the communication link establishment detecting portion 301 has been disconnected.

In other words, the communication link establishment detecting portion 301 monitors not only the establishment of a communication link between terminal units, but the disconnection thereof. When a communication link has been disconnected, the communication link establishment detecting portion 301 supplies the resultant information as communication link disconnection information to the terminal unit recognizing portion 302. At step S304, the terminal unit recognizing portion 302 determines whether or not the communication link has been disconnected corresponding to the communication link disconnection information.

When the determined result at step S304 represents that the communication link has not been disconnected, the flow returns to step S302. At step S302, the charging server 4 repeats the similar process.

In contrast, when the determined result at step S304 represents that the communication link has been disconnected, the terminal unit recognizing portion 302 controls the click detecting portion 303 to complete the monitoring of the click data of the terminal unit that has been communication linked. Thereafter, the charging server 4 completes the process.

Thereafter, the charging process portion 304 periodically references the charging database 305, performs the charging process, calculates the communication fee and the click service fee, and transfers the fee from a bank account or the like of the user.

As a click service fee, a unit fee per click may be designated. Corresponding to the number of clicks, the click service fee may be calculated. Alternatively, as a click service fee, a unit fee per hour may be designated. Corresponding to the click time, the click service fee may be calculated. Alternatively, corresponding to the number of clicks and the click time, the click service fee may be calculated.

The above-described processes can be performed by hardware or software. When those processes are performed by software, a program that composes the software is installed to a computer, a general purpose computer, or the like that is disposed in the transmitting apparatus 1, the receiving apparatus 2, and so forth as dedicated hardware apparatuses.

Figure 55:
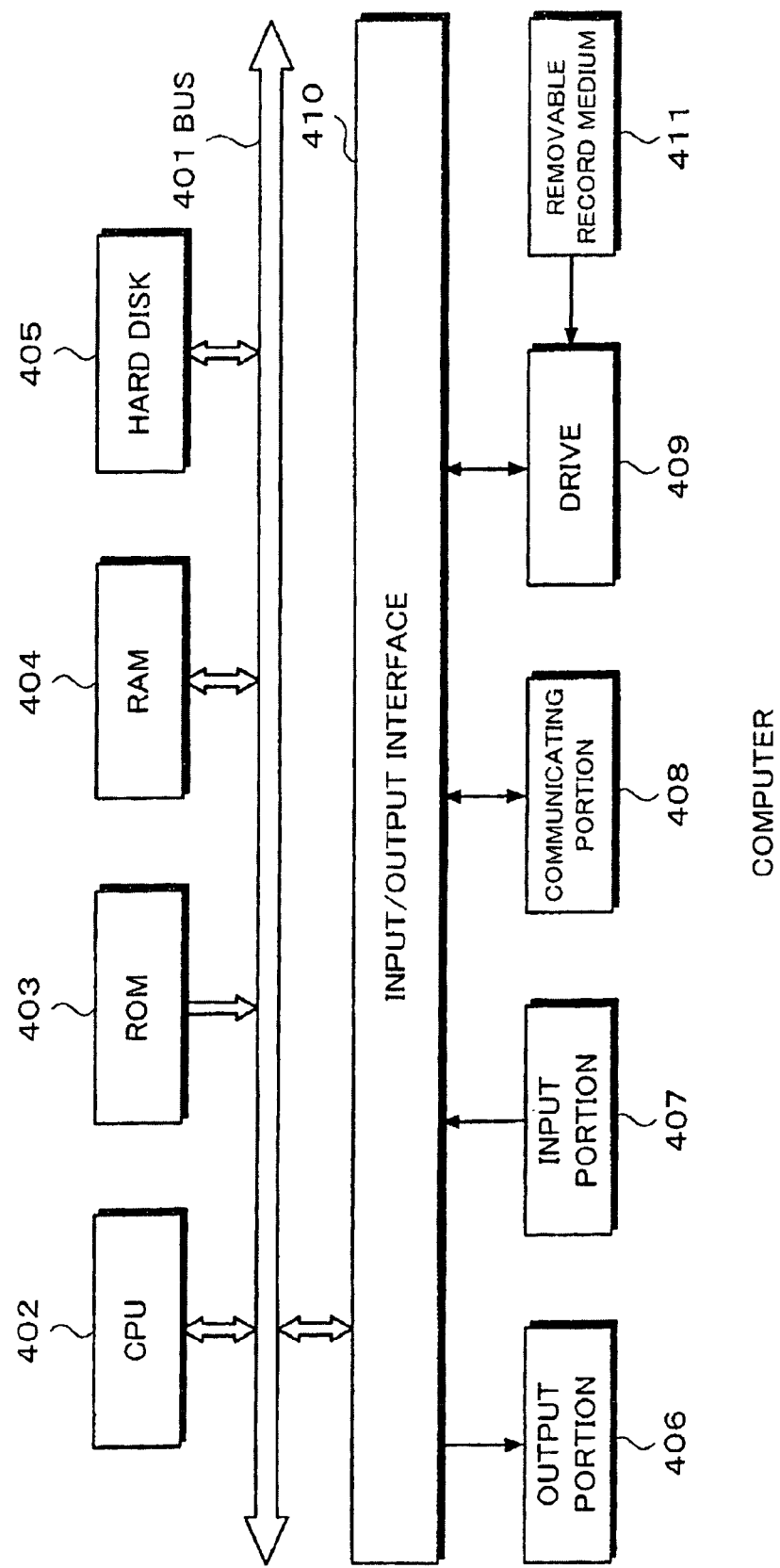
FIG. 55 is a block diagram showing an example of the structure of a computer according to an embodiment of the present invention.

Thus, FIG. 55 shows an example of the structure of a computer in which the program for executing the above-described processes has been installed.

The program can be prerecorded to a hard disk 405 or a ROM 403 as a record medium that is built in the computer.

Alternatively, the program can be temporally or permanently stored (recorded) on a removable record medium such as a floppy disk, a CD-ROM (Compact Disc Read Only Memory), an MO (Magneto optical) disc, a DVD (Digital Versatile Disc), a magnetic disc, or a semiconductor memory. The removable record medium 411 can be provided as a so-called package software.

The program can be installed from the above-described removable record medium 411 to the computer. Alternatively, the program can be wirelessly transferred from a download site to the computer through a digital satellite broadcast satellite. Further alternatively, the program can be transferred to the computer through a network such as LAN (Local Area Network) or the Internet. In the computer, the program is received by a communicating portion 408 and installed to the hard disk 405.

The computer contains a CPU (Central Processing Unit) 402. An input/output interface 410 is connected to the CPU 402 through a bus 401. When a command is input by the user with an input portion 407 such as a keyboard, a mouse, a microphone, and so forth to the CPU 402 through the input/output-interface 410, the program stored in a ROM (Read Only Memory) 403 is executed. Alternatively, the CPU 402 loads the program stored in the hard disk 405 to a RAM (Random Access Memory) 404 and executes the program with the RAM 404. Further alternatively, the CPU 402 loads the program transferred from a satellite or a network and received by the communicating portion 408, and installed to the hard disk 405 or read from the removable record medium 411 attached to a drive 409 and installed to the hard disk 405 to the RAM 404 and executes the program with the RAM 404.

Thus, the CPU 402 performs the processes corresponding to the flow charts shown in FIGS. 4, 6, 10, 14, 21 to 24, 27, 30, 34, 36, 38, 39, 41, 43 to 45, 50, 51, and 54. Alternatively, the CPU 402 performs the processes shown in the block diagrams of FIGS. 3, 5, 7, 8, 11 to 13, 17, 25, 29, 31, 33, 35, 37, 47 to 49, and 53. When necessary, the CPU 402 outputs the processed results from an output portion 406 composed of an LCD (Liquid Crystal Display), a speaker, and so forth through the input/output interface 410. Alternatively, the CPU 402 transmits the processed results from the communicating portion 408 or recorded to the hard disk 405.

In the specification, process steps of the program that causes the computer to perform individual processes may not be always performed in the order of the flow charts. Alternatively, process steps may be executed in parallel or discretely (for example, a parallel process or an object process may be performed).

The program may be processed by one computer. Alternatively, the program may be distributed by a plurality of computers. Further alternatively, the program may be transferred to a remote computer and executed therewith.

According to the embodiment of the present invention, the transmitting apparatus 1 performs hierarchical encoding. Depending on hierarchical data that is transmitted, the temporal resolution and the spatial resolution of a picture that is displayed by the receiving apparatus 2 are changed. Alternatively, the temporal resolution and the spatial resolution of a picture displayed by the receiving apparatus 2 may be changed depending on discrete cosine transform coefficients or quantized steps of a picture that are transmitted.

Alternatively, the temporal resolution and the spatial resolution can be changed depending on an encoding method of the transmitting apparatus 1. In other words, when a picture is displayed with a regular temporal resolution, (the encoding portion 31) of the transmitting apparatus 1 chain encodes the contour of an object thereof and obtains the average value of pixel values (color) that compose an object as a representative value. The receiving apparatus 2 displays the area of the object with the color as the representative value. When a picture with an improved spatial resolution is displayed at the sacrifice of a temporal resolution, as was described above, the hierarchical encoding can be used.

According to the embodiment, the spatial resolution is improved at the sacrifice of the temporal resolution of a picture. In contrast, the temporal resolution may be improved at the sacrifice of the spatial resolution. Information representing the selection of the sacrificed (improved) resolution can be contained in control information such as click data and transmitted from the receiving apparatus 2 to the transmitting apparatus 1.

According to the embodiment of the present invention, the temporal resolution and the spatial resolution are handled. However, according to the present invention, the resolution in the level direction (hereinafter, this resolution may be referred to as level resolution) may be handled. In other words, when the number of bits assigned to data is increased or decreased the temporal resolution and the spatial resolution can be improved or deteriorated. In this case, as the temporal resolution and the spatial resolution of a picture are changed, the tone thereof is changed. The level resolution can be changed by changing the above-described quantizing steps.

In addition, according to the embodiment, the spatial resolution of a partial area (priority range) of a picture 3 is improved at the sacrifice of the temporal resolution. Alternatively, the spatial resolution of the entire picture may be improved.

Alternatively, the spatial resolution of a particular part of a picture can be improved at the sacrifice of the spatial resolution of the rest of the picture rather than the sacrifice of the temporal resolution (namely, the temporal resolution is maintained).

In addition, according to the embodiment, a picture is processed in such a manner that it is separated into a background picture and an object. Alternatively, a picture may be processed without separating it.

In addition, the present invention can be applied to not only picture data, but audio data. In the case of audio data, for example, sampling frequency corresponds to the temporal resolution, whereas the number of bits assigned to audio data corresponds to the level resolution.

In addition, the process of the change determining and categorizing portion 240 shown in FIG. 49 may be applied to the case that a feature amount of a sound (for example, a pitch, a desired part of a human voice, or each musical instrument) is extracted.

In addition, the processes of the object extracting portions 14 and 1014 and the change determining and categorizing portion 240 can be applied to so-called object encoding. In other words, with the processes of the object extracting portions 14 and 1014 and the change determining and categorizing portion 240, since an object can be extracted, the extracted object can be encoded along with information that represents the contour or the area thereof corresponding to object encoding process that obtains information that represents the motion of the object. The encoded data can be transmitted or recorded.

The receiving apparatus 2 can perform the similar process to the process of the object extracting portion 1014 using click data so as to extract an object. In this case, when an object extracted by the receiving apparatus 2 is stored, an object database can be formed.

According to the first transmitting apparatus, the first transmitting method, the first record medium, and the first signal of the present invention, control information transmitted from a receiving apparatus is received. Corresponding to the control information, the resolutions in at least two directions of the temporal direction, the spatial direction, and the level direction are controlled. Data of which the resolutions in at least two directions have been controlled corresponding to the control information is transmitted to the receiving apparatus. Thus, for example, the resolution in the spatial direction of a picture displayed by the receiving apparatus can be more improved.

According to the receiving apparatus, the receiving method, the second record medium, and the second signal of the present invention, control information is transmitted to a transmitting apparatus that controls the resolutions in at least two directions of the temporal direction, the spatial direction, and the level direction corresponding to the control information. In addition, data of which the resolutions in at least two directions have been controlled corresponding to the control information is transmitted from the transmitting apparatus, received, and output. Thus, for example, the spatial resolution of a picture that is output can be more improved.

According to the transmitting and receiving apparatus, the transmitting and receiving method, the third record medium, and the third signal, a transmitting apparatus receives control information transmitted from a receiving apparatus. Corresponding to the control information, the resolutions in at least two directions of the temporal direction, the spatial direction, and the level direction are controlled. Data of which the resolutions in at least two directions have been controlled corresponding to the control information is transmitted to the receiving apparatus. In addition, the receiving apparatus transmits control signal to the transmitting apparatus. Data of which the resolutions in at least two directions have been controlled corresponding to the control information is transmitted from the transmitting apparatus, received, and output. Thus, for example, the resolution in the spatial direction of a picture displayed by the receiving apparatus can be more improved.

According to the second transmitting apparatus, the second transmitting method, the fourth record medium, and the fourth signal of the present invention, control signal transmitted from a receiving apparatus is received. Corresponding to the control information, data is categorized. Corresponding to the categorized result of the data, data is transmitted to the receiving apparatus. Thus, for example, an area of a picture that the user is considering can be transmitted to the receiving apparatus regardless of whether the area is moving or still.

DESCRIPTION OF REFERENCE NUMERALS

1 TERMINAL UNIT (TRANSMITTING APPARATUS)
2 TERMINAL UNIT (RECEIVING APPARATUS
3-1, 3-2 RADIO BASE STATION
4 CHARGING SERVER
13 BACKGROUND PICTURE EXTRACTING PORTION
14 OBJECT EXTRACTING PORTION
22 COMBINING PROCESS PORTION
31 ENCODING PORTION
34 DATA AMOUNT CALCULATING PORTION
41B, 41F DIFFERENCE CALCULATING PORTION
42B, 42F HIERARCHICALLY ENCODING PORTION
44B, 44F LOCAL DECODER
51 RECEIVING PORTION
62B, 62F STORING PORTION
71 BACKGROUND PICTURE WRITING PORTION
73 BACKGROUND PICTURE MEMORY
75 OBJECT MEMORY
77 COMBINING PORTION
142 CPU
146 DISPLAYING PORTION
201 PICTURE MEMORY
203 STILL AREA AND MOVING AREA DETERMINING PORTION
210 MOVING OBJECT CONNECTING PROCESS PORTION
211 STILL OBJECT CONNECTING PROCESS PORTION
214 OBJECT EXTRACTED RESULT MEMORY
231 INPUT PICTURE STORING PORTION
234 STILL AREA AND MOVING AREA DETERMINING PORTION
236 INTERESTED OBJECT AREA CATEGORIZING PORTION
237 INPUT TIME INTERVAL CALCULATING PORTION
238 INPUT POSITION DISTANCE CALCULATING PORTION
239 INTEREST CHANGE DETERMINING PORTION
301 COMMUNICATION LINK ESTABLISHMENT DETECTING PORTION
303 CLICK DETECTING PORTION
304 CHARGING PROCESS PORTION
402 CPU
408 COMMUNICATING PORTION
411 REMOVABLE RECORD MEDIUM
1013 BACKGROUND PICTURE EXTRACTING PORTION
1014 OBJECT EXTRACTING PORTION
1022 COMBINING PROCESS PORTION
1024 CLICK DATA INPUTTING PORTION
1025 CLICK DATA TRANSMITTING PORTION

The invention claimed is:

1. A transmitting apparatus for transmitting data to a receiving apparatus, comprising:
   receiving means for receiving control information transmitted from the receiving apparatus;
   controlling means for controlling the resolutions in at least two directions of a temporal direction, a spatial direction, and a level direction of the data transmitted to the receiving apparatus corresponding to the control information;
   transmitting means for transmitting the data of which the resolutions in at least two directions have been controlled corresponding to the control information to the receiving apparatus; said receiving apparatus outputting the data transmitted from said transmitting means;
   analyzing means for analyzing the preferences of the user of the receiving apparatus,
   wherein said controlling means controls the resolutions of the data corresponding to the analyzed result of said analyzing means; and
   wherein said controlling means contains a considered point of the data that is output to the receiving apparatus, and
   wherein said analyzing means analyzes the preferences of the user corresponding to the considered point;
   said analyzing means including categorizing means for categorizing the data corresponding to a considered area that contains said considered point;
   wherein said analyzing means analyzes the preference of the user corresponding to the analyzed result of said categorizing means; and
   wherein said data is picture data,
   and said analyzing means further includes:
   still area and moving area determining means for determining whether the considered area of the picture data is a still area or a moving area; and
   continuity determining means for determining whether the considered point is continuous in the temporal and spatial directions of the considered point, and
   wherein said categorizing means categorizes the picture data corresponding to the determined results of the still area and moving area determining means and said continuity means.

2. The transmitting apparatus as set forth in claim 1, further comprising:
   considered point storing means for storing a considered point that is contained in the considered area that is still and that is continuous in the temporal and spatial directions and a considered point that is contained in the considered area that is moving and that is continuous in the temporal and spatial directions; and
   category identifier adding means for obtaining a category identifier added to a considered point stored to the said considered point storing means and adding the category identifier to the considered point.

3. The transmitting apparatus as set forth in claim 2, wherein in the case that the current considered point is in the considered area that is still and that is continuous in the temporal and spatial directions, when an immediately preceding considered point stored in said considered point storing means is contained in the considered area that is still and that is continuous in the temporal and spatial directions, said category identifier adding means obtains a category identifier added to the current considered point corresponding to the relation of the spatial positions between the current considered point and the area that contains the immediately preceding considered point.

4. The transmitting apparatus as set forth in claim 3, wherein in the case that the current considered point is in the considered area that is moving and that is continuous in the temporal and spatial directions, when an immediately preceding considered point stored in said considered point storing means is contained in the considered area that is moving and the is continuous in the temporal and spatial directions, said category identifier adding means obtains a category identifier added to the current considered point corresponding to the similarity of a predetermined feature amount of the considered area that contains the current considered point and that of the considered area that contains the immediately preceding considered point.

5. The transmitting apparatus as set forth in claim 2, wherein said categorizing means categorizes a predetermined area of the picture data as an object corresponding to the preference of the user corresponding to the density of considered points stored in said considered point storing means.

6. The transmitting apparatus as set forth in claim 5, wherein said categorizing means categorizes a predetermined area of the picture data as an object corresponding to the preference of the user corresponding to the density of considered points assigned the same category identifier, stored in said considered point storing means, and contained in the considered area that is still.

7. The transmitting apparatus as set forth in claim 5, wherein said categorizing means categorizes a predetermined area of the picture data as an object corresponding to the preference of the user corresponding to the density of considered points stored in said considered point storing means, contained in the considered area that is moving, assigned the same category identifier, and motion compensated.

8. The transmitting apparatus as set forth in claim 5, wherein said controlling means improves the resolutions of the area categorized as the object.

9. The transmitting apparatus as set forth in claim 1, wherein said continuity determining means determines whether or not the current considered point is continuous in the temporal and spatial directions corresponding to the time difference between the current considered point and a past considered point.

10. The transmitting apparatus as set forth in claim 1, wherein said still area and moving area determining means determines whether a considered area that contains the current considered point is still or moving corresponding to the difference between the considered area that contains the considered point of the current frame and the considered area that contains the considered point of a past frame.

11. The transmitting apparatus as set forth in claim 1, wherein said continuity determining means determines whether or not the current considered point is continuous corresponding to the distances in the temporal direction and the spatial direction between the current considered point and a past considered point at which the same still are and moving are determined result as the considered area that contains the current considered point is obtained.

12. The transmitting apparatus as set forth in claim 11, wherein said categorizing means categorizes the picture data corresponding to weighted values for the distances in the temporal direction and the spatial direction.

13. The transmitting apparatus as set forth in claim 12, further comprising:
picture data storing means for storing picture data in the considered area that contains a considered point that is continuous in the temporal direction and the spatial direction.

14. The transmitting apparatus as set forth in claim 13, wherein when the current considered point is not continuous in the temporal direction and the spatial direction, after the content of said picture data storing means is read, the content is erased and the picture data is the considered area that contains the current considered point is stored to said picture data storing means.

15. The transmitting apparatus as set forth in claim 14, wherein said controlling means improves the resolutions of the picture data that is read from said picture data storing means.

16. The transmitting apparatus as set forth in claim 1, wherein the control information is used for a charging process.

17. A transmitting apparatus for transmitting picture data to a receiving apparatus comprising:
receiving means for receiving control information transmitted from the receiving apparatus;
categorizing means for categorizing the picture data corresponding to the control information;
transmitting means for transmitting for display at the receiving apparatus picture data corresponding to the categorized result of the picture data;
wherein the control information contains a considered point of the picture data displayed by the receiving apparatus,
still area and moving area determining means for determining whether or not the considered area of the picture data is still or moving; and
continuity determining means for determining whether or not the considered point is continuous in a temporal direction and a spatial direction,
wherein said categorizing means categorizes the picture data corresponding to a considered area that contains the considered point of the picture data, and
wherein said categorizing means categorizes the picture data corresponding to the determined results of said still area and moving area determining means and said continuity determining means.

18. The transmitting apparatus as set forth in claim 17, further comprising:
considered point storing means for storing a considered point that is contained in the considered area that is still and that is continuous in the temporal direction and the spatial direction and a considered point that is contained in the considered area that is moving and that is continuous in the temporal direction and the spatial direction; and
category identifier adding means for obtaining a category identifier added to a considered point stored in said considered point storing means and adding the category identifier to the considered point.

19. The transmitting apparatus as set forth in claim 18, wherein in the case that the current considered point is in the considered area that is still and that is continuous in the temporal and spatial directions, when an immediately preceding considered point stored in said considered point storing means is contained in the considered area that is still and that is continuous in the temporal and spatial directions, said category identifier adding means obtains a category identifier added to the current considered point corresponding to the relation of the spatial positions between the current considered point and the area that contains the immediately preceding considered point.

20. The transmitting apparatus as set forth in claim 18, wherein in the case that the current considered point is in the considered area that is moving and that is continuous in the temporal and spatial directions, when an immediately preceding considered point stored in said considered point storing means is contained in the considered area that is moving and that is continuous in the temporal and spatial directions, said category identifier adding means obtains a category identifier added to the current considered point corresponding to the similarity of a predetermined feature amount of the considered area that contains the current considered point and that of the considered area that contains the immediately preceding considered point.

21. The transmitting apparatus as set forth in claim 18, wherein said categorizing means categorizes a predetermined area of the picture data as one object corresponding to the density of considered points stored in said considered point storing means.

22. The transmitting apparatus as set forth in claim 21, wherein said categorizing means categorizes a predetermined area of the picture data as one object corresponding to the density of considered points assigned the same category identifier, stored in said considered point storing means, and contained in the considered area that is still.

23. The transmitting apparatus as set forth in claim 21, wherein said categorizing means categorizes a predetermined area of the picture data as one object corresponding to the density of considered points stored in said considered point storing means, contained in the considered area that is moving, assigned the same category identifier, and motion compensated.

24. The transmitting apparatus as set forth in claim 21, wherein said controlling means improves the resolutions of the area categorized as the object.

25. The transmitting apparatus as set forth in claim 17, wherein said still area and moving area determining means determines whether a considered area that contains the current considered point is still or moving corresponding to the difference between the considered area that contains the considered point of the current frame and the considered area that contains the considered point of a past frame.

26. The transmitting apparatus as set forth in claim 17, wherein said continuity determining means determines whether or not the current considered point is continuous in the temporal and spatial directions corresponding to the time difference between the current considered point and a past considered point.

27. The transmitting apparatus as set forth in claim 17, wherein said continuity determining means determines whether or not the current considered point is continuous corresponding to the distances in the temporal direction and the spatial direction between the current considered point and a past considered point at which the same still area moving area determined result as the considered area that contains the current considered point is obtained.

28. The transmitting apparatus as set forth in claim 27, wherein said categorizing means categorizes the picture data corresponding to weighted values for the distances in the temporal direction and the spatial direction.

29. The transmitting apparatus as set forth in claim 27, further comprising:
picture data storing means for storing picture data in the considered area that contains a considered point that is continuous in the temporal direction and the spatial direction.

30. The transmitting apparatus as set forth in claim 29, wherein when the current considered point is not continuous in the temporal direction and the spatial direction, after the content of said picture data storing means is read, the content is erased and the picture data in the considered area that contains the current considered point is stored to said picture data storing means.

31. The transmitting apparatus as set forth in claim 30, wherein said controlling means improves the resolutions of the picture data that is read from said picture data storing means.

32. The transmitting apparatus as set forth in claim 17, wherein the control information is used for a charging process.

33. A transmitting apparatus for transmitting data to a receiving apparatus, comprising:
a receiving unit configured to receive control information transmitted from the receiving apparatus;
a controlling unit configured to control the resolutions in at least two directions of a temporal direction, a spatial direction, and a level direction of the data transmitted to the receiving apparatus corresponding to the control information;
a transmitting unit configured to transmit the data of which the resolutions in at least two directions have been controlled corresponding to the control information to the receiving apparatus; said receiving apparatus outputting the data transmitted from said transmitting unit;
an analyzing unit configured to analyze the preferences of the user of the receiving apparatus,
wherein said controlling unit controls the resolutions of the data corresponding to the analyzed result of said analyzing unit; and
wherein said controlling unit contains a considered point of the data that is output to the receiving apparatus, and
wherein said analyzing unit analyzes the preferences of the user corresponding to the considered point;
said analyzing unit including categorizing unit configured to categorize the data corresponding to a considered area that contains said considered point;
wherein said analyzing unit analyzes the preference of the user corresponding to the analyzed result of said categorizing unit; and
wherein said data is picture data,
and said analyzing unit further includes:
a still area and moving area determining unit configured to determine whether the considered area of the picture data is a still area or a moving area; and
a continuity determining unit configured to determine whether the considered point is continuous in the temporal and spatial directions of the considered point, and
wherein said categorizing unit categorizes the picture data corresponding to the determined results of the still area and moving area determining unit and said continuity unit.

34. The transmitting apparatus as set forth in claim 33, further comprising:
a considered point storing unit configured to store a considered point that is contained in the considered area that is still and that is continuous in the temporal and spatial directions and a considered point that is contained in the considered area that is moving and that is continuous in the temporal and spatial directions; and a category identifier adding unit configured to obtain a category identifier added to a considered point stored to the said considered point storing unit and adding the category identifier to the considered point.

35. The transmitting apparatus as set forth in claim 34, wherein in the case that the current considered point is in the considered area that is still and that is continuous in the temporal and spatial directions, when an immediately preceding considered point stored in said considered point storing unit is contained in the considered area that is still and that is continuous in the temporal and spatial directions, said category identifier adding unit obtains a category identifier added to the current considered point corresponding to the relation of the spatial positions between the current considered point and the area that contains the immediately preceding considered point.

36. The transmitting apparatus as set forth in claim 35, wherein in the case that the current considered point is in the considered area that is moving and that is continuous in the temporal and spatial directions, when an immediately preceding considered point stored in said considered point storing unit is contained in the considered area that is moving and the is continuous in the temporal and spatial directions, said category identifier adding unit obtains a category identifier added to the current considered point corresponding to the similarity of a predetermined feature amount of the considered area that contains the current considered point and that of the considered area that contains the immediately preceding considered point.

37. The transmitting apparatus as set forth in claim 34, wherein said categorizing unit categorizes a predetermined area of the picture data as an object corresponding to the preference of the user corresponding to the density of considered points stored in said considered point storing unit.

38. The transmitting apparatus as set forth in claim 37, wherein said categorizing unit categorizes a predetermined area of the picture data as an object corresponding to the preference of the user corresponding to the density of considered points assigned the same category identifier, stored in said considered point storing unit, and contained in the considered area that is still.

39. The transmitting apparatus as set forth in claim 37, wherein said categorizing unit categorizes a predetermined area of the picture data as an object corresponding to the preference of the user corresponding to the density of considered points stored in said considered point storing unit, contained in the considered area that is moving, assigned the same category identifier, and motion compensated.

40. The transmitting apparatus as set forth in claim 37, wherein said controlling unit improves the resolutions of the area categorized as the object.

41. The transmitting apparatus as set forth in claim 33, wherein said still area and moving area determining unit determines whether a considered area that contains the current considered point is still or moving corresponding to the difference between the considered area that contains the considered point of the current frame and the considered area that contains the considered point of a past frame.

42. The transmitting apparatus as set forth in claim 33, wherein said continuity determining unit determines whether or not the current considered point is continuous in the temporal and spatial directions corresponding to the time difference between the current considered point and a past considered point.

43. The transmitting apparatus as set forth in claim 33, wherein said continuity determining unit determines whether or not the current considered point is continuous corresponding to the distances in the temporal direction and the spatial direction between the current considered point and a past considered point at which the same still are and moving are determined result as the considered area that contains the current considered point is obtained.

44. The transmitting apparatus as set forth in claim 43, wherein said categorizing unit categorizes the picture data corresponding to weighted values for the distances in the temporal direction and the spatial direction.

45. The transmitting apparatus as set forth in claim 44, further comprising:
a picture data storing unit configured to store picture data in the considered area that contains a considered point that is continuous in the temporal direction and the spatial direction.

46. The transmitting apparatus as set forth in claim 45, wherein when the current considered point is not continuous in the temporal direction and the spatial direction, after the content of said picture data storing unit is read, the content is erased and the picture data is the considered area that contains the current considered point is stored to said picture data storing unit.

47. The transmitting apparatus as set forth in claim 46, wherein said controlling unit improves the resolutions of the picture data that is read from said picture data storing unit.

48. The transmitting apparatus as set forth in claim 33, wherein the control information is used for a charging process.

49. A transmitting apparatus for transmitting picture data to a receiving apparatus comprising:
a receiving unit configured to receive control information transmitted from the receiving apparatus;
a categorizing unit configured to categorize the picture data corresponding to the control information;
a transmitting unit configured to transmit for display at the receiving apparatus picture data corresponding to the categorized result of the picture data;
wherein the control information contains a considered point of the picture data displayed by the receiving apparatus,
a still area and moving area determining unit configured to determine whether or not the considered area of the picture data is still or moving; and
a continuity determining unit configured to determine whether or not the considered point is continuous in a temporal direction and a spatial direction,
wherein said categorizing unit categorizes the picture data corresponding to a considered area that contains the considered point of the picture data, and
wherein said categorizing unit categorizes the picture data corresponding to the determined results of said still area and moving area determining unit and said continuity determining unit.

50. The transmitting apparatus as set forth in claim 49, further comprising:
a considered point storing unit configured to store a considered point that is contained in the considered area that is still and that is continuous in the temporal direction and the spatial direction and a considered point that is contained in the considered area that is moving and that is continuous in the temporal direction and the spatial direction; and
a category identifier adding unit configured to obtain a category identifier added to a considered point stored in said considered point storing unit and adding the category identifier to the considered point.

51. The transmitting apparatus as set forth in claim 50, wherein in the case that the current considered point is in the considered area that is still and that is continuous in the temporal and spatial directions, when an immediately preceding considered point stored in said considered point storing unit is contained in the considered area that is still and that is continuous in the temporal and spatial directions, said category identifier adding unit obtains a category identifier added to the current considered point corresponding to the relation of the spatial positions between the current considered point and the area that contains the immediately preceding considered point.

52. The transmitting apparatus as set forth in claim 50, wherein in the case that the current considered point is in the considered area that is moving and that is continuous in the temporal and spatial directions, when an immediately preceding considered point stored in said considered point storing unit is contained in the considered area that is moving and that is continuous in the temporal and spatial directions, said category identifier adding unit obtains a category identifier added to the current considered point corresponding to the similarity of a predetermined feature amount of the considered area that contains the current considered point and that of the considered area that contains the immediately preceding considered point.

53. The transmitting apparatus as set forth in claim 50, wherein said categorizing unit categorizes a predetermined area of the picture data as one object corresponding to the density of considered points stored in said considered point storing unit.

54. The transmitting apparatus as set forth in claim 53, wherein said categorizing unit categorizes a predetermined area of the picture data as one object corresponding to the density of considered points assigned the same category identifier, stored in said considered point storing unit, and contained in the considered area that is still.

55. The transmitting apparatus as set forth in claim 53, wherein said categorizing unit categorizes a predetermined area of the picture data as one object corresponding to the density of considered points stored in said considered point storing unit, contained in the considered area that is moving, assigned the same category identifier, and motion compensated.

56. The transmitting apparatus as set forth in claim 53, wherein said controlling unit improves the resolutions of the area categorized as the object.

57. The transmitting apparatus as set forth in claim 49, wherein said still area and moving area determining unit determines whether a considered area that contains the current considered point is still or moving corresponding to the difference between the considered area that contains the considered point of the current frame and the considered area that contains the considered point of a past frame.

58. The transmitting apparatus as set forth in claim 49, wherein said continuity determining unit determines whether or not the current considered point is continuous in the temporal and spatial directions corresponding to the time difference between the current considered point and a past considered point.

59. The transmitting apparatus as set forth in claim 49, wherein said continuity determining unit determines whether or not the current considered point is continuous corresponding to the distances in the temporal direction and the spatial direction between the current considered point and a past considered point at which the same still area moving area determined result as the considered area that contains the current considered point is obtained.

60. The transmitting apparatus as set forth in claim 59, wherein said categorizing unit categorizes the picture data corresponding to weighted values for the distances in the temporal direction and the spatial direction.

61. The transmitting apparatus as set forth in claim 59, further comprising:
  a picture data storing unit configured to store picture data in the considered area that contains a considered point that is continuous in the temporal direction and the spatial direction.

62. The transmitting apparatus as set forth in claim 61, wherein when the current considered point is not continuous in the temporal direction and the spatial direction, after the content of said picture data storing unit is read, the content is erased and the picture data in the considered area that contains the current considered point is stored to said picture data storing unit.

63. The transmitting apparatus as set forth in claim 62, wherein said controlling unit improves the resolutions of the picture data that is read from said picture data storing unit.

64. The transmitting apparatus as set forth in claim 49, wherein the control information is used for a charging process.

* * * * *